United States Patent
Manfredi et al.

(10) Patent No.: US 12,480,435 B2
(45) Date of Patent: Nov. 25, 2025

(54) SYSTEMS, APPARATUS, AND METHODS FOR INDUCING ENHANCED RADICAL IGNITION IN INTERNAL COMBUSTION ENGINES USING A RADICAL CHEMICALS GENERATOR

(71) Applicant: Radical Combustion Technologies, LLC, Vienna, VA (US)

(72) Inventors: Michael J. Manfredi, Vienna, VA (US); Daniel B. Olsen, Fort Collins, CO (US); Randall R. Raymer, Howard, OH (US); Michael P. Whelan, Naperville, IL (US)

(73) Assignee: Radical Combustion Technologies, LLC, Vienna, VA (US)

( * ) Notice: Subject to any disclaimer, the term of this patent is extended or adjusted under 35 U.S.C. 154(b) by 0 days.

(21) Appl. No.: 18/313,603

(22) Filed: May 8, 2023

(65) Prior Publication Data
US 2024/0044282 A1    Feb. 8, 2024

Related U.S. Application Data

(60) Division of application No. 17/962,660, filed on Oct. 10, 2022, now abandoned, which is a division of
(Continued)

(51) Int. Cl.
*F02B 19/12* (2006.01)
*F02B 19/18* (2006.01)

(52) U.S. Cl.
CPC .............. *F02B 19/12* (2013.01); *F02B 19/18* (2013.01)

(58) Field of Classification Search
CPC ...... F02B 19/12; F02B 19/18; F02B 19/1004; F02B 19/1009; F02B 19/1023;
(Continued)

(56) References Cited

U.S. PATENT DOCUMENTS 3,820,523 A  6/1974 Showalter et al.
4,404,931 A  9/1983 Smith et al.
(Continued)

FOREIGN PATENT DOCUMENTS

CA  2049400 C  3/1995
CA  3168145 A1  7/2021
(Continued)

OTHER PUBLICATIONS

International preliminary report on patentability for PCT Application No. PCT/US2023/063248 mailed Sep. 6, 2024, 15 pages.
(Continued)

*Primary Examiner* — Xiao En Mo
(74) *Attorney, Agent, or Firm* — COOLEY LLP

(57) ABSTRACT

Systems, devices, and methods described herein provide one or more radical chemicals generators (RCGs) and/or mini-chambers (M-Cs) that can be used to provide enhanced radical ignition (ERI) in an internal combustion engine. RCGs as described herein can include quenching systems (QSs) that can be configured to quench a flame of combustion products to produce a jet of partial combustion products containing radical species (RS). The jet of partial combustion products can be injected to a main combustion chamber (MCC) of an engine to induce ERI. ERI can proceed under leaner fuel conditions and lower temperatures compared to those needed for conventional thermally induced, fuel oxidation chain initiation reaction processes.

30 Claims, 64 Drawing Sheets
(4 of 64 Drawing Sheet(s) Filed in Color)

Related U.S. Application Data application No. 17/680,074, filed on Feb. 24, 2022, now Pat. No. 11,466,608, which is a continuation-in-part of application No. PCT/US2021/013624, filed on Jan. 15, 2021.

(60) Provisional application No. 62/961,515, filed on Jan. 15, 2020.

(58) Field of Classification Search
CPC .............. F02B 19/1095; F02B 23/0672; F02B 23/0687; F02B 19/108
See application file for complete search history.

(56) References Cited

U.S. PATENT DOCUMENTS

| | | | |
|---|---|---|---|
| 4,594,976 A | 6/1986 | Gonzalez | |
| 4,711,208 A | 12/1987 | Sander et al. | |
| 4,738,227 A | 4/1988 | Kamo et al. | |
| 4,765,293 A | 8/1988 | Gonzalez | |
| 4,798,770 A | 1/1989 | Donomoto et al. | |
| 4,862,865 A | 9/1989 | Dahlen et al. | |
| 5,146,883 A | 9/1992 | Reipert et al. | |
| 5,186,137 A | 2/1993 | Salzmann | |
| 5,211,145 A | 5/1993 | Ichikawa et al. | |
| 5,307,772 A | 5/1994 | Rao et al. | |
| 5,322,042 A | 6/1994 | di Priolo et al. | |
| 5,417,059 A | 5/1995 | Hartel et al. | |
| 5,611,307 A | 3/1997 | Watson | |
| 5,662,082 A | 9/1997 | Black et al. | |
| 5,778,849 A | 7/1998 | Regueiro | |
| 5,855,192 A | 1/1999 | McCowan et al. | |
| 5,862,788 A | 1/1999 | Pouring et al. | |
| 5,915,351 A | 6/1999 | Regueiro | |
| 6,178,942 B1 | 1/2001 | di Priolo et al. | |
| 7,055,491 B2 | 6/2006 | Linderyd et al. | |
| 7,451,942 B2 | 11/2008 | Borissov | |
| 7,493,886 B2 | 2/2009 | Blank | |
| 7,832,372 B2 | 11/2010 | Blank | |
| 8,567,369 B2 | 10/2013 | Johnson | |
| 8,844,498 B2 | 9/2014 | Patterson | |
| 8,857,405 B2 | 10/2014 | Attard | |
| 8,875,678 B2 | 11/2014 | Johnson | |
| 9,010,293 B2 | 4/2015 | Blank | |
| 9,353,674 B2 | 5/2016 | Bunce et al. | |
| 9,567,896 B2 | 2/2017 | Pouring et al. | |
| 9,567,939 B2 | 2/2017 | Pouring et al. | |
| 9,631,591 B2 | 4/2017 | Patterson | |
| 9,638,093 B2 | 5/2017 | Blank | |
| 9,670,827 B2 | 6/2017 | Taliaferro | |
| 9,677,459 B2 | 6/2017 | Mcclendon et al. | |
| 10,941,727 B2 | 3/2021 | Suzuki et al. | |
| 10,961,899 B2 | 3/2021 | Suzuki | |
| 11,466,608 B2 | 10/2022 | Manfredi et al. | |
| 2003/0196547 A1 | 10/2003 | Bischofberger et al. | |
| 2006/0144362 A1 | 7/2006 | Robinet et al. | |
| 2010/0043430 A1 | 2/2010 | Dehart | |
| 2010/0077986 A1 | 4/2010 | Chen | |
| 2010/0257848 A1 | 10/2010 | Birkby | |
| 2011/0088655 A1 | 4/2011 | Ancimer et al. | |
| 2011/0108012 A1 | 5/2011 | Bryant et al. | |
| 2012/0082841 A1 | 4/2012 | Kadoshima et al. | |
| 2012/0103302 A1 | 5/2012 | Attard | |
| 2012/0118262 A1 | 5/2012 | Johnson | |
| 2014/0026846 A1 | 1/2014 | Johnson | |
| 2014/0209057 A1 | 7/2014 | Pouring et al. | |
| 2015/0068489 A1 | 3/2015 | Bunce et al. | |
| 2015/0198070 A1 | 7/2015 | Record et al. | |
| 2015/0204233 A1 | 7/2015 | Nanba et al. | |
| 2015/0247445 A1 | 9/2015 | Blank | |
| 2016/0025035 A1 | 1/2016 | Kadoshima et al. | |
| 2016/0053670 A1 | 2/2016 | Tozzi et al. | |
| 2016/0053671 A1 | 2/2016 | Sotiropoulou et al. | |
| 2016/0053673 A1* | 2/2016 | Sotiropoulou | F02B 19/12 123/260 |
| 2016/0169185 A1 | 6/2016 | Iwasaki et al. | |
| 2016/0230645 A1 | 8/2016 | Schock et al. | |
| 2017/0138251 A1 | 5/2017 | Watanabe et al. | |
| 2017/0145900 A1 | 5/2017 | Singh | |
| 2017/0218878 A1 | 8/2017 | Hussain | |
| 2017/0284334 A1 | 10/2017 | Lineton et al. | |
| 2017/0314456 A1 | 11/2017 | Blaxill et al. | |
| 2018/0094603 A1 | 4/2018 | Taguchi et al. | |
| 2018/0128166 A1 | 5/2018 | Lineton | |
| 2019/0032544 A1* | 1/2019 | Vattaneo | F02B 19/1061 |
| 2019/0195120 A1 | 6/2019 | Suzuki | |
| 2021/0131336 A1 | 5/2021 | Raymer et al. | |
| 2022/0112834 A1 | 4/2022 | Cambal | |
| 2022/0178300 A1 | 6/2022 | Manfredi et al. | |
| 2023/0042331 A1 | 2/2023 | Manfredi et al. | |

FOREIGN PATENT DOCUMENTS

| | | |
|---|---|---|
| DE | 202019105016 U1 | 9/2019 |
| EP | 3181855 A1 | 6/2017 |
| WO | WO-0058610 A1 | 10/2000 |
| WO | WO-2004106728 A1 | 12/2004 |
| WO | WO-2019040432 A1 | 2/2019 |
| WO | WO-2020014636 A1 | 1/2020 |
| WO | WO-2021146550 A1 | 7/2021 |
| WO | WO-2024076879 A2 | 4/2024 |

OTHER PUBLICATIONS

Office Action for European Application No. 21705716.5 mailed Apr. 23, 2024, 4 pages.

International Search Report and Written Opinion for International Application No. PCT/US2021/013624 dated Apr. 1, 2021, 10 pages.

International Search Report and Written Opinion for PCT Application No. PCT/US2023/063248 dated Jul. 28, 2023, 22 pages.

International Search Report and Written Opinion mailed on Nov. 6, 2019, for International Application No. PCT/US2019/041646, 11 pages.

Invitation to Pay Additional Fees for International Application No. PCT/US2023/063248 dated Jun. 7, 2023, 18 pages.

Notice of Allowance for U.S. Appl. No. 17/962,660 mailed Feb. 6, 2023, 7 pages.

Olsen et al., "Prechamber NOx formation in low BMEP 2-stroke cycle natural gas engines," Applied Thermal Engineering, vol. 29, Issue 4, 2009, pp. 687-694.

Walker, "Free Radicals in Combustion Chemistry," Science Progress, vol. 74, No. 2 (294), 1990, pp. 163-187.

Office Action for Mexican Application No. MX/a/2022/008696 mailed Sep. 4, 2025, with English translation, 14 pages.

* cited by examiner

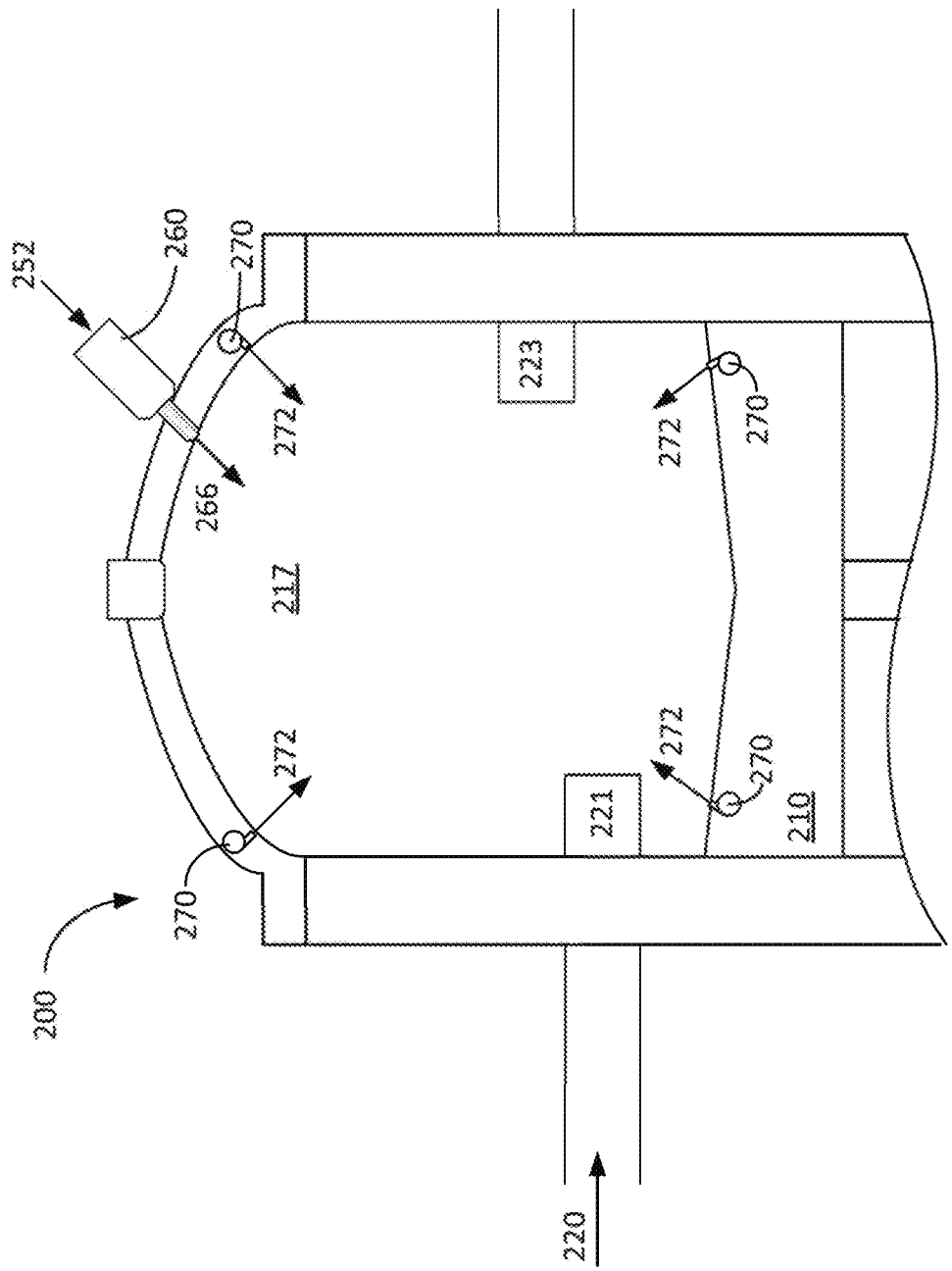

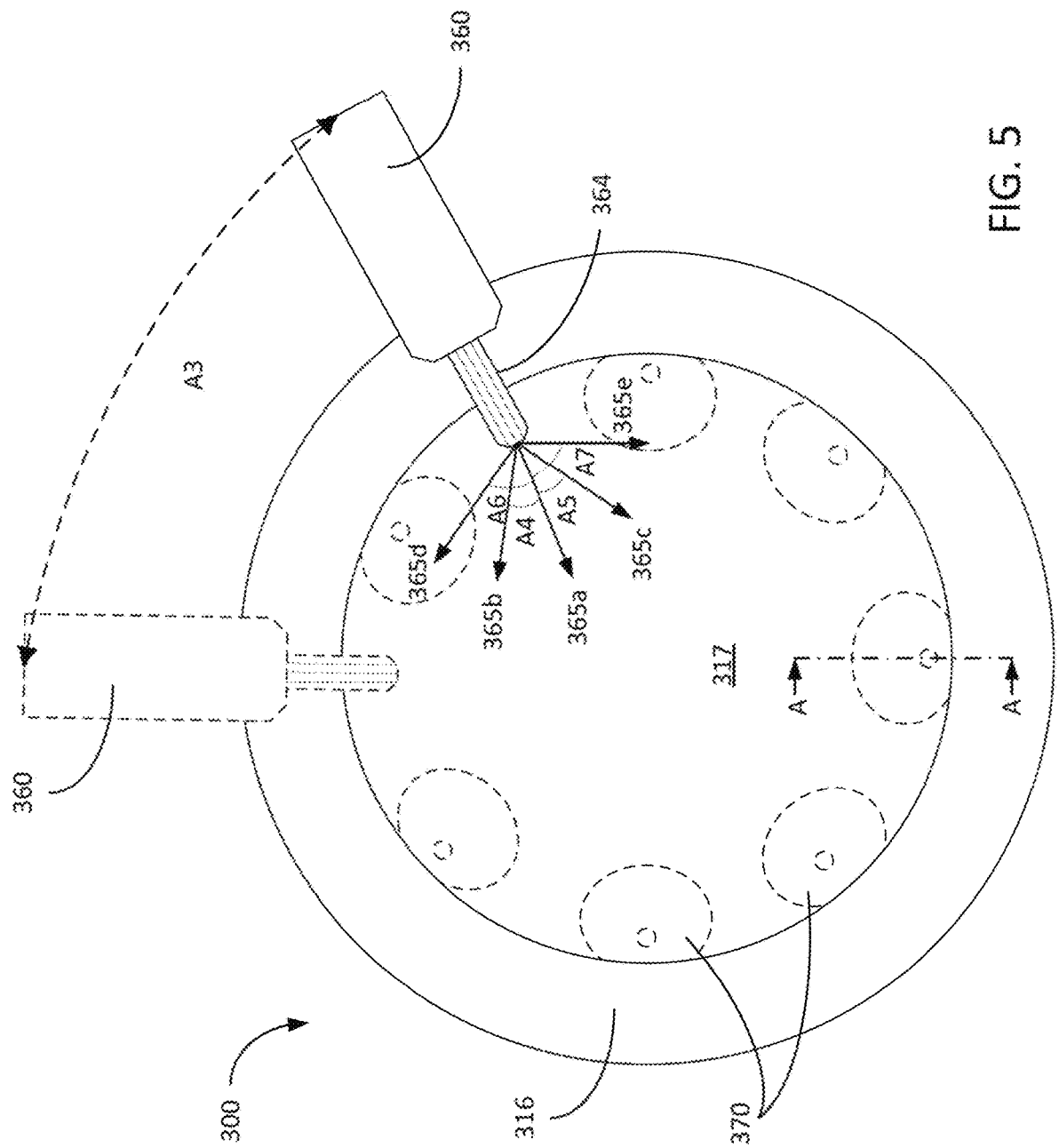

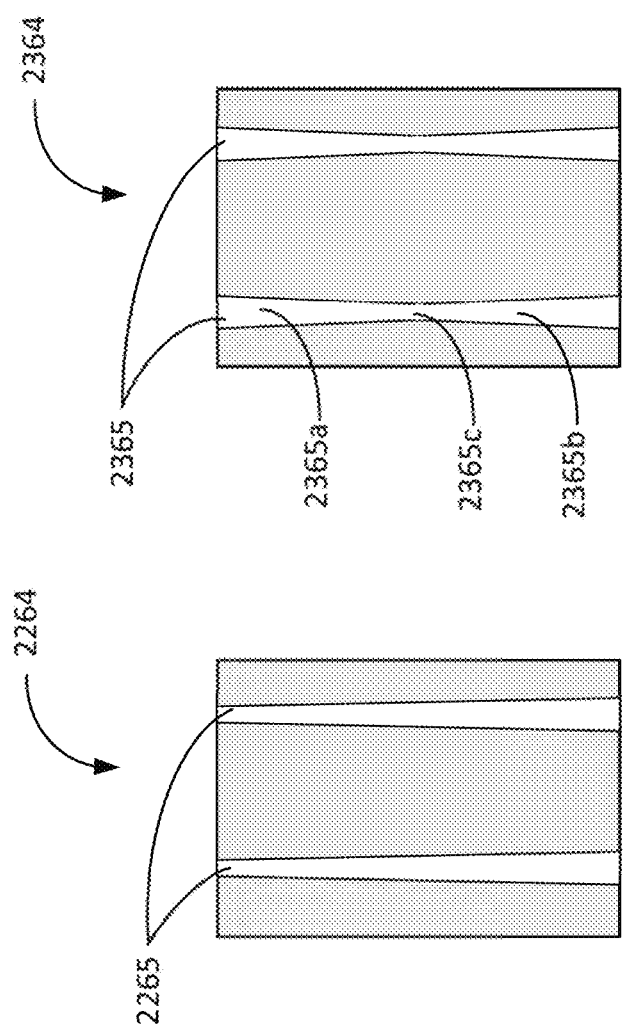

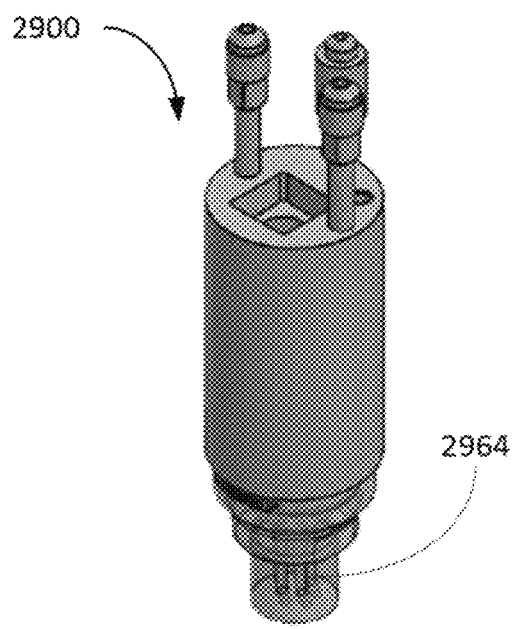
FIG. 25A
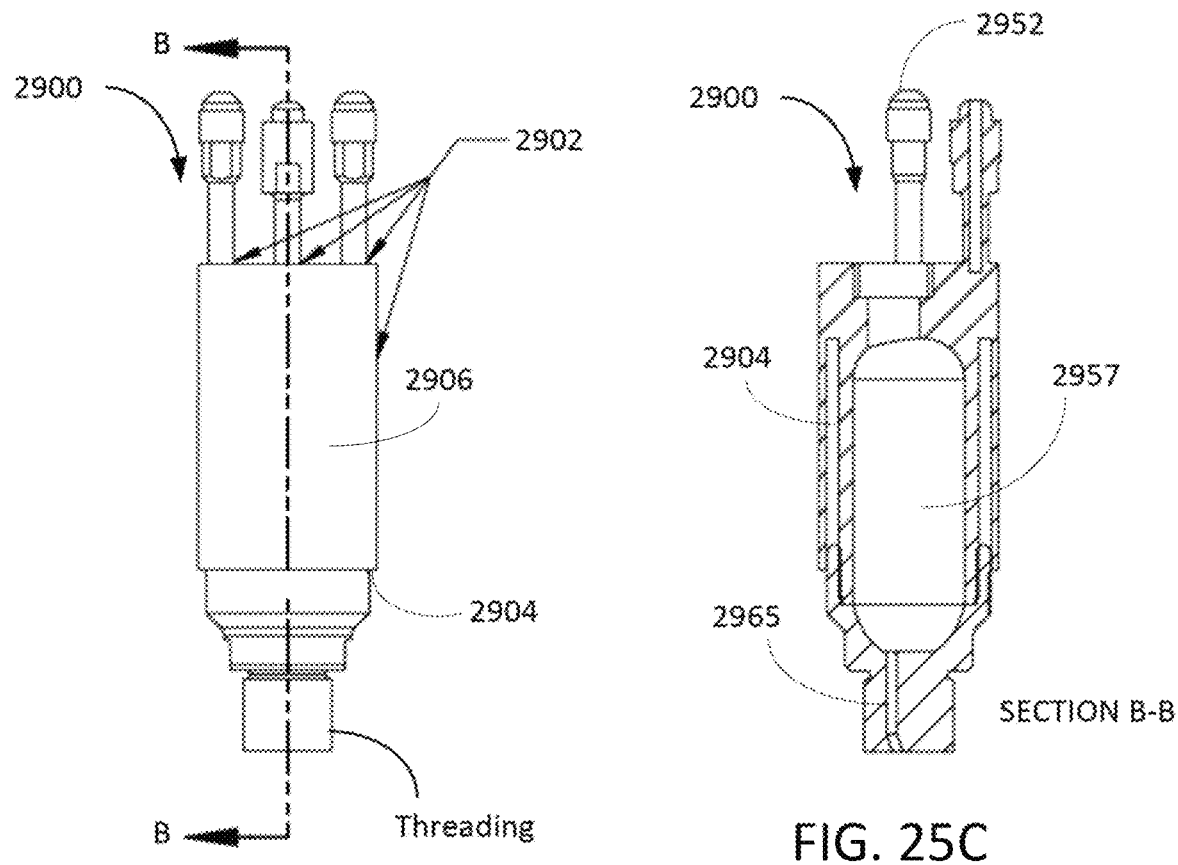
FIG. 25B
FIG. 25C

SYSTEMS, APPARATUS, AND METHODS FOR INDUCING ENHANCED RADICAL IGNITION IN INTERNAL COMBUSTION ENGINES USING A RADICAL CHEMICALS GENERATOR

CROSS-REFERENCE TO RELATED APPLICATIONS

This application is a divisional of U.S. patent application Ser. No. 17/962,660, filed Oct. 10, 2022, now abandoned, which is a divisional of U.S. patent application Ser. No. 17/680,074, filed Feb. 24, 2022, now U.S. Pat. No. 11,466,608, titled "SYSTEMS, APPARATUS, AND METHODS FOR INDUCING ENHANCED RADICAL IGNITION INTERNAL COMBUSTION ENGINES USING A RADICAL CHEMICALS GENERATOR," which is a continuation-in-part of International (PCT) Patent Application No. PCT/US2021/013624, filed Jan. 15, 2021, titled "SYSTEMS, APPARATUS, AND METHODS FOR INDUCING ENHANCED RADICAL IGNITION IN INTERNAL COMBUSTION ENGINES USING A RADICAL CHEMICALS GENERATOR," which claims priority to U.S. Provisional Patent Application No. 62/961,515, filed Jan. 15, 2020, titled "SYSTEMS, APPARATUS, AND METHODS FOR INDUCING ENHANCED RADICAL IGNITION IN INTERNAL COMBUSTION ENGINES USING A RADICAL CHEMICALS GENERATOR," the disclosure of each of which is incorporated by reference herein.

TECHNICAL FIELD

The present disclosure relates generally to systems, apparatus, and methods for improving combustion of internal combustion engines. More specifically, the present disclosure relates to using a radical chemicals generator ("RCG") to induce enhanced radical ignition ("ERI") in internal combustion engines.

BACKGROUND

Existing internal combustion engines or legacy engines have relied heavily on low and medium speed 2-cycle and 4-cycle natural gas fueled engines with integral compressors for compressing and transporting natural gas through pipelines or with shafts that extend to a separate compressor, generator, and/or propulsion device. These legacy engines are the mainstay of the natural gas transmission infrastructure in the contiguous United States. Approximately 75% of the horsepower in the 'midstream' natural gas segment derives from these legacy engines. These engines also have broader applications, including, for example, for driving shafts to provide mechanical energy to compressors, electric generators, or propulsion devices. Legacy engines, however, suffer from certain disadvantages. For example, such legacy engines have lower combustion stability, higher pollutant emissions (e.g., nitrogen oxides (NOx), carbon monoxide (CO), methane ($CH_4$), carbon dioxide ($CO_2$) and other Greenhouse Gas (GHG) emissions) and greater fuel consumption, etc. e.g. Many of these engines have undergone significant modifications to attain federal and/or individual state emissions limits. There remains a need for improved engine design to achieve improved combustion stability, lower emissions, and/or higher fuel efficiency.

SUMMARY

Systems, apparatus, and methods described herein can overcome some of the disadvantages associated with existing internal combustion engines. In particular, systems, apparatus, and methods described herein relate to improving the combustion efficiency and stability of internal combustion engines by inducing enhanced radical ignition ("ERI") using an RCG. The RCG can operate on various liquid and gaseous fuels used for combustion in a main combustion chamber ("MCC") of the engine or can operate using an alternate or dual source of fuel including hydrogen. In some embodiments, systems, apparatus, and methods described herein can be augmented with the use of mini-chambers ("M-Cs") positioned in a head or piston bowl face of an engine, which can further augment the storage and generation of combustion-enhancing radical chemical species.

In some embodiments, the RCG can produce a quenched hot jet of partial combustion products containing a high concentration of highly reactive radicals and intermediate species or molecules (herein referred to as radical species (RS)) that can be used for initiating combustion in the MCC. Examples of such RS include, among others, the hydroxyl radical (OH), hydroperoxyl radical or perhydroxyl radical (HO2), formaldehyde (CH2O), hydrogen peroxide (H2O2), methyl (CH3), methylidyne (CH), monotomic oxygen (O), and monotomic hydrogen (H). Such RS can each have reactive unbalances in their electronic structure that make them suitable for enhancing combustion.

Internal combustion engines have been broadly used in a number of industries and applications. Such use has subjected internal combustion engines to various regulatory requirements including those relating to emissions. Existing internal combustion engines equipped with existing emissions reduction technologies may fail to meet certain emission standards. Such existing emission-reduction technology can degrade engine operational stability, reliability, and efficiency. Systems, devices, and methods described herein provide engines that are equipped with RCG(s) and/or M-C(s) that can meet emission standards while improving combustion and operating stability, engine reliability, and thermal efficiency. The ERI process, as described herein, can improve ignitability and extend lean-combustion limits, which can further reduce emissions and fuel consumption. In some embodiments, RCG(s), as described herein, can take advantage of existing engine systems, e.g., by fitting an RCG into the same engine location/configuration as a previously installed PCC or spark plug(s).

In some embodiments, one or more RCGs can be integrated into an existing internal combustion engine. In other embodiments, one or more RCGs can be incorporated into a new internal combustion engine design. RCG-equipped internal combustion engines as described herein can reduce emissions while improving engine stability, reliability, and efficiency.

In some embodiments, an apparatus such as a radical chemicals generator includes: a housing defining a radical chemicals generator volume; a fuel delivery control device coupled to a passageway extending into the radical chemicals generator volume, the fuel delivery control device configured to control delivery of a portion of fuel into the radical chemicals generator volume via the passageway; a spark device configured to ignite a mixture of air and the portion of fuel in the radical chemicals generator volume to produce a flame of combustion products; and a quenching system configured to: quench the flame of combustion products to produce a jet of partial combustion products containing radical species; and inject the jet of partial combustion products into a main combustion chamber of an engine containing a fuel-air charge to induce ignition of the fuel-air charge without use of a separate ignition source.

In some embodiments, a system includes a radical chemicals generator and an engine, where the engine can include a plurality of M-Cs disposed about a main combustion chamber of the engine.

In some embodiments, a method includes: delivering a portion of air into a MCC of an engine during an intake and gas exchange phase (e.g., compression phase, exhaust and intake stroke phases) of a combustion cycle, the engine including (1) a piston configured to reciprocate within a cylinder during the combustion cycle and (2) a radical chemicals generator (RCG); delivering a first portion of fuel into the MCC during an intake and gas exchange phase of the combustion cycle, such that the first portion of fuel mixes with the portion of air to produce a fuel-air charge; delivering a second portion of fuel into a volume of the RCG (RCGv) during the gas exchange phase; igniting the second portion of fuel mixed with gases within the RCGv to produce a flame of combustion products; quenching, via a quenching system (QS) of the RCG, the flame of combustion products to produce a jet of partial combustion products containing radical species (RS); and injecting the jet of partial combustion products into the MCC to induce ignition of the fuel-air charge in the MCC without using a separate ignition source.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4A-4D illustrate an operation of the two-stroke internal combustion engine during an ignition cycle, according to embodiments.

FIG. 5 is a schematic diagram of a top view of an example internal combustion engine, according to embodiments, with portions of the internal combustion engine omitted for illustration purposes.

FIGS. 9A-9E are schematic diagrams of different arrangements of QS of example RCGs, according to embodiments.

FIGS. 25A-25C illustrate different views of an example screw-in RCG, according to embodiments.

DETAILED DESCRIPTION

Systems, apparatus, and methods are described herein for improving performance of internal combustion engines. Such systems, apparatus, and methods can improve performance using one or more of RCGs and/or M-Cs.

Overview

In some embodiments, systems, apparatuses, and methods described herein can be applied to internal combustion engines, including, for example, two-cycle engines or four-cycle engines. For example, systems, apparatuses, and methods described herein can be used with uniflow engines, two-stroke diesel or oil engines, four-stroke diesel or oil engines, etc. Such internal combustion engines can have high operating speeds ranging from as low as 90 revolutions per minute (RPM) up to approximately 2,500 RPM. In addition, systems, apparatus, and methods described herein can be used with non-boosted or boosted engines, such as, for example, naturally aspirated engines, piston scavenged engine, forced induction engine, etc.

In some embodiments, systems, apparatus, and methods described herein can use traditional fabrication means and/or additive manufacturing to produce complex design geometries used in the RCGs and M-C. In some embodiments, engine heads, engine pistons, and the like can be modified (e.g., retrofitted) to include one or more components as described herein. For example, one or more RCGs can be designed to fit in the same space as existing PCCs or spark plugs. In an embodiment, an existing engine with a PCC can be retrofitted to include a RCG, as described herein, by removing the PCC and installing the RCG into the same location (e.g., port or opening) as the PCC. Additive manufacturing (e.g., using various stainless steel, nickel alloys such as Inconel® alloys or other suitable metals) can be used to generate the complex QS geometries that are used to quench a flame and produce ERI.

In some embodiments, thermal barrier coatings and catalytic coatings can be incorporated separately or in combination into an RCG and/or M-C (e.g., a passive M-C in the head and/or piston face of an engine) with an orifice designed to promote heat retention, create reactive partially oxidized species, and/or improve oxidation and RS generation.

Figure 1:
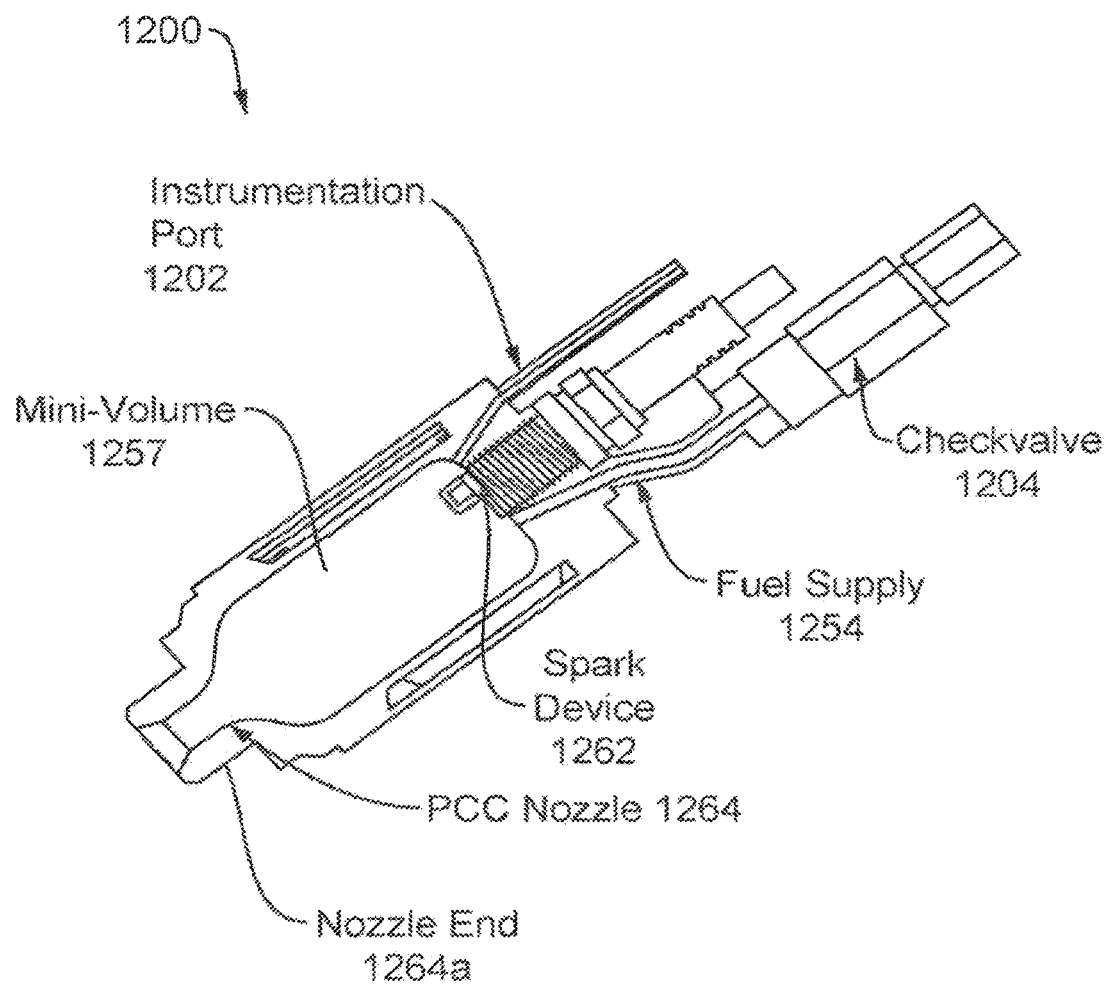
FIG. 1 is a cross-sectional view of a screw-in precombustion chamber ("PCC"), according to embodiments.

Existing PCCs are used to produce a flame-torch to ignite a MCC fuel-air charge in an internal combustion engine to improve ignition and combustion reliability, engine stability (e.g., as measured by lower engine peak combustion pressure standard deviation ("STDEV")), and/or reduce emissions (e.g., of NOx, CO, other greenhouse gases ("GHG"), etc.), as compared with spark plug ignition only or "open chamber" combustion. FIG. 1 depicts an example screw-in PCC 1200. The example screw-in PCC 1200 can be designed for a legacy, stationary, large-bore, slow-speed, natural-gas-fueled internal combustion engine. The legacy engine can be an integral engine that includes a shaft drive. The shaft drive can be connected to any end-use devices, including compressors, generators, or vessel propulsion devices. The compressor can be directly driven off of the crankshaft and is built as part of the engine, or a separable engine where a separate compressor (e.g., third-party compressor) can be used with the engine.

The PCC 1200 can include a pressure housing containing a mini-volume 1257, a spark device 1262, and a fuel-delivery control device including a fuel supply 1254 and a check valve 1204. The fuel supply 1254 can be directly or indirectly mounted to the housing of the PCC 1200, which can be surrounded at least in part by a cooling jacket. The PCC mini-volume 1257 can be connected to a MCC of an internal combustion engine via one or more nozzles or passageways (e.g., orifices) 1264. The PCC 1200 can be mounted on a head of the internal combustion engine by a screw-in threaded nozzle-end 1264a. Alternatively, a PCC can be mounted in a flange-type configuration that can be incorporated into a head design, which shares cooling fluid circulation with the head. Examples of PCCs are described in Daniel B. Olsen et al., "Prechamber NOx formation in low BMEP 2-stroke cycle natural gas engines," Applied Thermal Engineering, Vol. 29, Issue 4, 2009, pgs. 687-694, incorporated herein by reference.

PCCs 1200, 2700 when compared to traditional spark plugs, can provide higher ignition energy and ensure a more reliable (e.g., lower variability) ignition and combustion, which is particularly effective in engines that run on lean fuel-air mixtures and can be difficult to ignite. In some embodiments, a PCC (e.g., PCC 1200, 2700) can provide approximately 20,000 times the energy of a traditional spark plug, e.g., approximately 940 joules (J) vs. approximately 0.05 J.

PCC-type engines and other types of existing engines, however, can suffer from certain drawbacks, including tendency of misfires, the production of unwanted emissions, uneven or undistributed combustion, etc. Systems, devices, and methods described herein aim to address these shortcomings in existing engines through the use of a RCG.

In some embodiments, an RCG as described herein can be installed at a location where a PCC is mounted to an internal combustion engine, at a spark plug opening, a threaded pressure port, an air start port, or other existing ports of an internal combustion engine, or at a new port dedicated to a PCC. In other embodiments, an RCG as described herein can be installed in a new port of an engine head. In some embodiments, multiple RCGs can be installed into an engine head, as described with reference to FIG. 5. The location where an RCG can be installed can depend on the engine type. When installing into existing ports of an engine, suitable ports among the existing ports can be selected, e.g., depending on their location with respect to the MCC and their ability to allow for even distribution of the radical jets, as further described herein, into the MCC.

In some embodiments, existing internal combustion engines outfitted with a PCC (e.g., a PCC 1200) can be adapted using components (e.g., in a kit) as described herein to induce ERI ignition. For example, a kit including one or more of an RCG, M-C, and/or tools and other components for facilitating adaptation of an internal combustion engine can be used to add an RCG or M-C for enabling ERI. In some embodiments, existing openings in a head of an internal combustion engine can be used to secure and connect an RCG to the MCC. For example, RCGs as described herein can be designed to attach to openings in an engine head that were previously used to attach a PCC. Using such existing openings and connections (e.g., fuel lines, water lines or in-head cooling, fuel check valves, spark plug leads, etc.) can reduce costs to adapt existing engines to ERI-configured engines.

Figure 2:
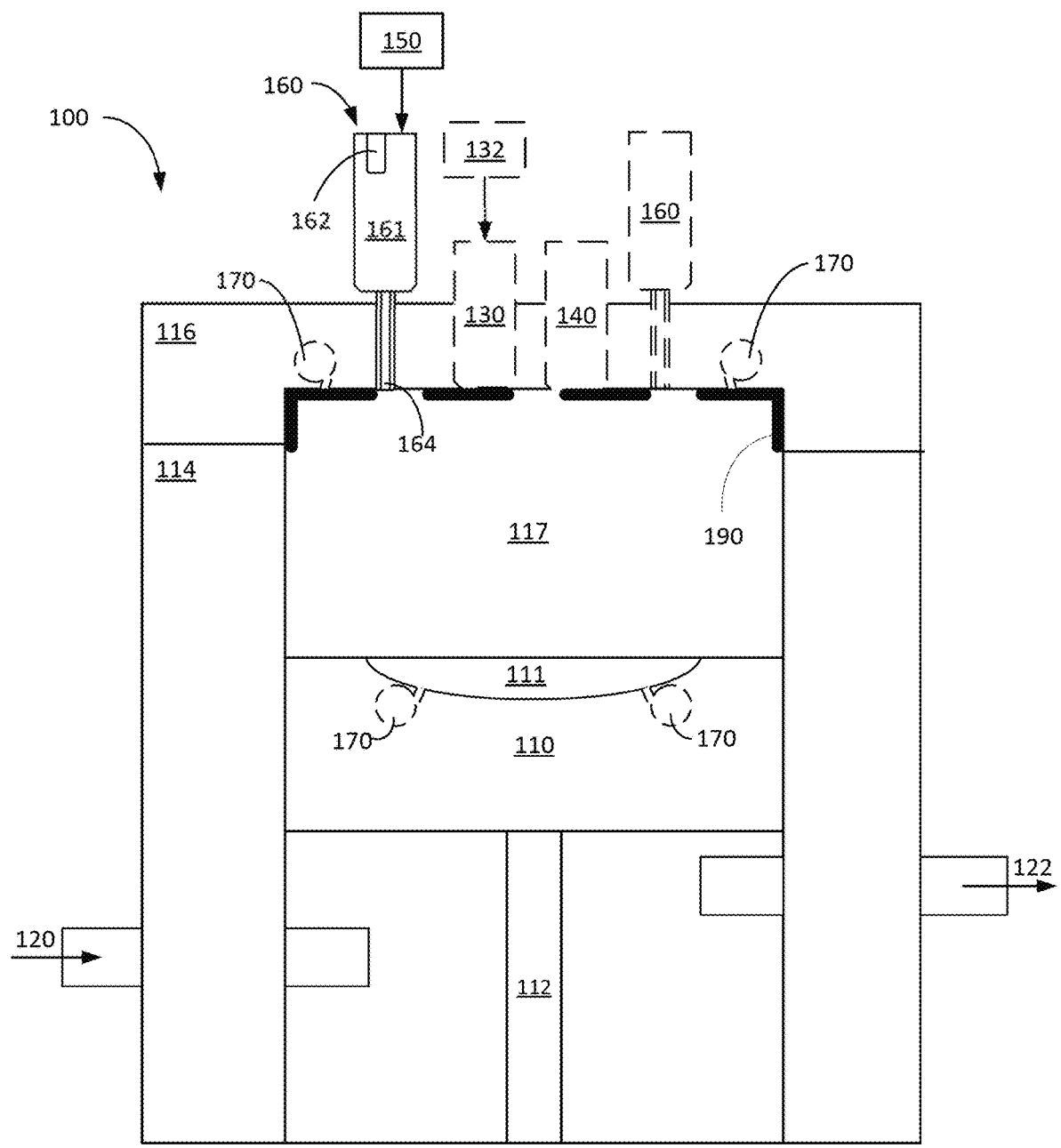
FIG. 2 is a schematic diagram of an example internal combustion engine cylinder, according to embodiments.

FIG. 2 is a schematic illustration of an example internal combustion engine 100. The engine 100 can be, for example, a fluid-cooled, direct-injected, natural gas-fueled, lean-burning, engine. The engine 100 includes a main combustion chamber (MCC) 117, a reciprocating piston 110, a head 116, a cylinder 114, a fuel valve body 130, an air inlet 120, an exhaust outlet 122, and an RCG 160. Optionally, the engine 100 can include one or more M-Cs 170 located in the head 116 and/or piston 170. The engine 100 can include additional cylinders (similar to cylinder 114), chambers (similar to MCC 117), pistons (similar to piston 110), and/or other components similar to those depicted in FIG. 1.

MCC 117 can be defined by cylinder 114, head 116, and piston 110. Air or a mixture of air and fuel can be supplied to MCC 117 via air inlet 120, and exhaust can be discharged from MCC 117 via exhaust outlet 122. Fuel from a fuel source or fuel supply 132 can optionally be supplied to chamber 117 via fuel valve body 130. Alternatively or additionally, a fuel-air charge can be supplied via the air inlet 120. The air inlet 120 can include one or more intake ports, and the exhaust outlet 122 can include one or more exhaust ports. Reciprocating piston 110 can be configured to reciprocate in cylinder 114. Reciprocating piston 110 can be driven by a crankshaft (not depicted) coupled by a rod 112. Reciprocating piston 110 can have any configuration including a crown 111, or alternatively a dish shape.

In some embodiments, engine 100 can include a cooling system (not depicted) that circulates water or another suitable coolant through a coolant jacket and/or passageway, e.g., disposed in or around one or more components of the engine 100 such as the head 116, RCG 160, etc.

In some embodiments, reciprocating piston 110 can be cooled by engine oil being diverted into an internal region of the piston 110, and the crown 111 can be cooled from the oil circulation being fed to piston 110. Such cooling can be controlled via engine design, e.g., by adjusting the dimensions of orifices or passageways (and/or installing new orifices) for circulating the engine oil. Accordingly, the temperature of the piston crown 111 can be controlled by adjusting the flow of engine oil. Depending on the adjustments to the flow of the engine oil, additional design changes may also be needed to the piston skirt (and/or other components of the engine), to increase longevity of components by providing proper clearances for the adjustments that are made.

In some embodiments, engine 100 can include a coating 190 disposed within the MCC 117, e.g., along a portion of head 116. In some embodiments, the coating 190 can be a thermal barrier coating, e.g., a coating for increasing heat retention within the MCC 117. Examples of suitable coatings are further described in International PCT Application No. PCT/US19/41646, filed Jul. 12, 2019, titled "Systems, Apparatus, and Methods for Increasing Combustion Temperature of Fuel-Air Mixtures in Internal Combustion Engines," the disclosure of which is incorporated herein by reference. In some embodiments, the coating 190 can be a catalytic coating configured to improve oxidation and RS generation. Such materials can improve the generation of RS that enhance combustion.

In some embodiments, engine 100 can optionally include a spark igniter 140. Spark igniter 140 can be used to ignite a fuel-air charge in the MCC 117, for example, during start-up of a cold engine and/or other conditions requiring additional ignition or combustion enhancement.

The RCG 160 can be used to induce ERI in the MCC 117. The RCG 160 can be coupled to a fuel source or fuel supply 150, e.g., via a passageway, control valve, and/or check valve. The fuel supply 150 can be the fuel supply 132 (i.e., the same fuel supply to the MCC 117) or a separate fuel supply. The type of fuel can include one or more of natural gas, propane, gasoline, diesel, hydrogen or other suitable types of liquid and/or gaseous fuel. The RCG 160 can include an RCG igniter or ignition device 162 that is configured to ignite a mixture of fuel and air (fuel-air charge) in a chamber 161 of the RCG 160. The ignited RCG fuel-air charge can then be quenched by a QS 164 of the RCG 160, such that a hot jet of partial combustion products passes from the RCG chamber 161 to the MCC 117. This jet of partial combustion products can include RS, which can induce ERI, as further described herein.

The QS 164 can include one or more openings or orifices. The orifices can be configured to quench an ignited jet of combustion products from the RCG chamber 161 to produce an output jet rich in RS. In some embodiments, the orifices of the QS 164 can be angled, e.g., as they lead into the RCG chamber 161 and/or into the MCC 117. Angling of the orifices as they lead into the RCG chamber 161 can create a swirling of fuel-air mixture as it is forced through the orifices (e.g., by an upstroke of the piston 110) into the RCG chamber 161. Ignition of the fuel-air mixture turbulent swirl vortex created inside the RCG can be accomplished by an ignition device 162, a passive pre-chamber, an unfueled pre-chamber, or other such ways for creating ignition and combustion within a volume of the RCG. Further details of this swirling are provided with reference to FIG. 10. The ignition device 162 can be a spark plug, a laser ignition system, a plasma ignition system, or a pilot ignition system. A pilot ignition system can utilize an injector that delivers a relatively small quantity, for example, 0.5-2% by energy, of diesel fuel. With such systems, as the fuel enters the compressed, lean air/fuel mixture, the fuel atomizes and compression ignites, creating an ignition source from which a flame propagates through the lean air/fuel mixture. A laser ignition system can create a spark by focusing a pulsed, high energy laser beam to point within the air/fuel mixture. Once the laser energy per unit area reaches a threshold value near the focal point, the gas breaks down and a spark is created. A plasma ignition system can operate similar to a conventional spark ignitions system in that a spark is created by a differential voltage between two electrodes. In a plasma ignition system, spark is created in a shorter period of time and is constrained by a cavity with an orifice. The rapid increase in energy and pressure in the cavity results in a plasma jet that flows through the orifice and into the air/fuel mixture. In some embodiments, shrouded spark plugs, passive pre-chambers, or unfueled pre-chambers can be used to induce ignition instead of a traditional spark plug.

Figure 6A:
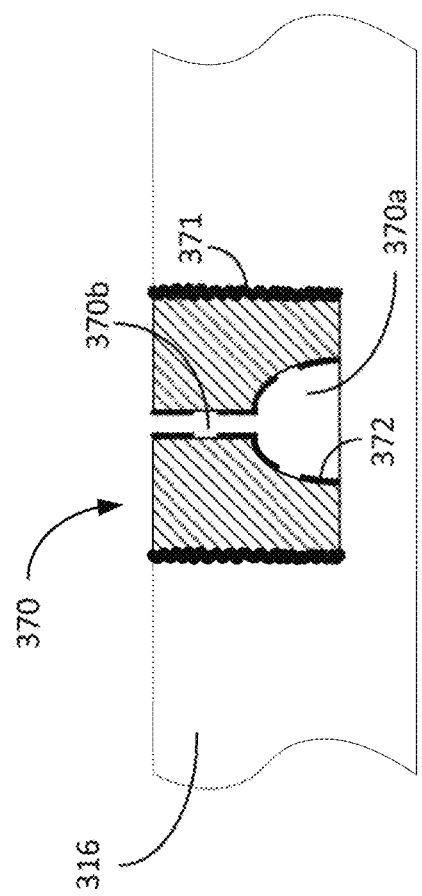
FIGS. 6A and 6B are cross-sectional views of M-Cs of example internal combustion engines, according to embodiments.
Figure 6B:
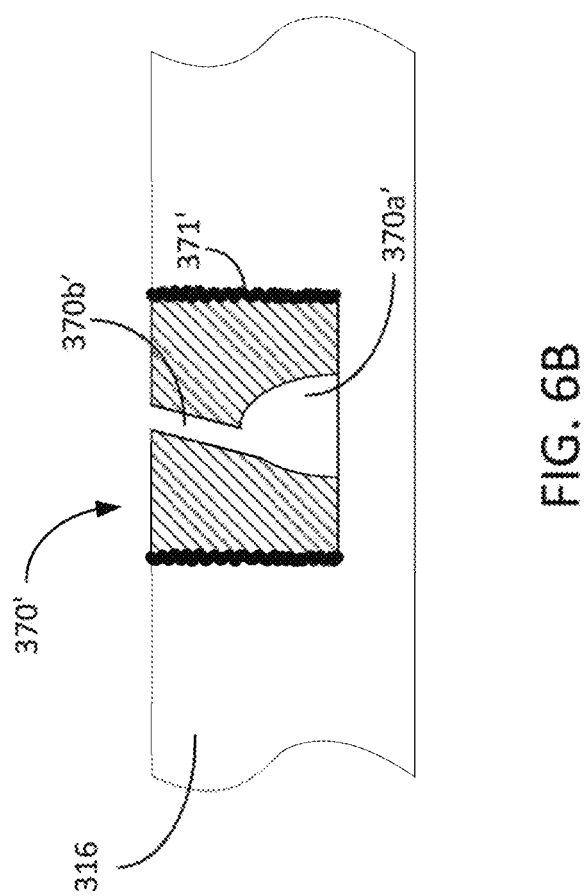

The M-Cs 170 can be connected to the MCC 117, e.g., via orifices. One or more M-Cs 170 can be arranged around a periphery of the piston 110 and/or periphery of the head 116. In some embodiments, the M-Cs 170 can be incorporated into the head 116 or piston 110 via 3-D printed screw-in plugs that including an orifice and a chamber. FIGS. 6A and 6B provide a more detailed view of such screw-in plugs. The M-Cs 170 can be arranged around a periphery of the piston 110 or head 116 so as to enhance (e.g., maximize) ERI, e.g., by seeding (e.g., providing) RS around a periphery of the MCC 117. With such a distribution of M-Cs 170, the combustion process can begin more around a periphery of the cylinder 114 and proceed inward toward a center of the MCC 117.

While RCG 160 and other RCGs described in the section below may be described with reference to engines or engine types with specific configurations, it can be appreciated that RCG 160 and/or other RCGs described herein can be adapted for other types of engines. In particular, RCGs as described in the present disclosure can be implemented in two-cycle or four-cycle engines, naturally aspirated engines, piston scavenged engines, forced induction engines, or various other types of engines. As described in the sections below, various parameters of the RCG's design may change depending on the type of engine it is installed in.

Enhanced Radical Ignition (ERI)

Initiation of combustion (IOC) in internal combustion engines has historically relied upon two primary traditional methods of ignition: spark/flame ignition and/or compression/diesel ignition. Both ignition methods produce a high-temperature source of thermal activation energy that penetrates into a MCC via high-temperature flame front(s) or stratified flame front(s) that progress sequentially to ignite and consume a fuel-air charge. Spark/flame ignition sources have difficulty reliably igniting non-uniform, lean fuel-air mixtures often encountered in large-bore natural gas engines. Due to poor fuel-air mixing, spark/flame ignition can produce misfires that degrade engine emissions, efficiency and stability. As such, traditional thermal-ignition methods and approaches have sought to increase the thermal energy of the ignition source but in doing so increase unwanted emissions (e.g., NOx and CO) associated with progressive burning with the characteristic high flame-front combustion temperatures. To counter this tendency, engines have been run with leaner air-fuel ratios to reduce unwanted emissions (e.g., NOx and CO). Ultra-lean operation can result in an increase in incomplete combustion causing more misfires, which increase CO (thereby reversing initial reductions) and other unwanted emissions (e.g., unburned hydrocarbons (UHCs), primarily methane in natural gas fueled engines).

Systems, devices, and methods described herein provide engines designed for ERI ignition. ERI, as further detailed herein, can reduce misfires by providing a high chemical activation energy ignition source, which requires less thermal energy to ignite the main charge than is required by spark/flame thermal-ignited engines. ERI can result in a more spatially distributed ignition and initiation of combustion that promotes a more complete burn of the MCC fuel-air charge and reduces the effects of the high-temperature flame front associated with spark/flame ignition. ERI extends the combustion lean-limit, thereby reducing engine knock and reducing unwanted emissions. RCG-equipped, ERI-configured engines can reduce NOx, UHC, and GHG emissions, while improving fuel economy and engine efficiency via near-elimination of a high-temperature flame-front and extension of the lean-operating limit.

In some embodiments described herein, the limitations of existing internal combustion engines (e.g., including those that use PCCs) and advantages of ERI-configured engines have been evaluated using high performance computational (HPC) simulation (SIM). Suitable HPC models used for such evaluations include, for example, chemical kinetics (CK) and computational fluid dynamics (CFD) SIMs. Such SIMs can be performed inside the RCGs, M-Cs, and MCCs, and can provide precise predictors of resultant engine operating performance throughout the engine's operating lifecycle and indicate specific emissions produced by such engines.

Unlike spark/flame and compression/diesel ignition processes that initiate combustion in an internal combustion engine by supplying a thermal activation energy required to initiate combustion of a fuel-air charge in a MCC, ERI initiates combustion through chemical mechanisms, i.e., by introducing partial combustion products that are rich in highly reactive RS. The RS, when sufficiently mixed with the fuel-air charge in the MCC, can initiate combustion reactions in the fuel-air charge with equal or shorter ignition delay than spark/flame ignition processes. The ERI-initiated combustion can be similar for different alkanes, alkenes, cyclic (cyclo-) compounds, etc., and therefore presents a fuel-agnostic approach for ignition and combustion.

ERI can result in flame front propagation in both 2-stroke and 4-stroke internal combustion engines that can lower NOx emissions and the lean limit of fuel-air mixtures and enhance overall combustion stability, such as, for example, lower engine coefficient of variation (COV) and STDEV of the peak firing pressures (PFP) in the cylinder. Engine STDEV can represent a statistical measure of combustion consistency, as provided as a measure of a specific data set and variance from the mean. While engine STDEV can be used to evaluate individual events within one or more cylinders, e.g., in 100 cycles of peak firing pressure, engine COV can represent a measure of overall engine performance that ties all cylinders of the engine together and evaluates the events within the cylinders in relation to each other. A COV of 6-8% can be desirable and indicative of overall combustion stability. ERI-initiated combustion stability enables more complete combustion (e.g., combustion of more of the fuel-air charge), resulting in reduced fuel consumption and costs, less maintenance, and decreases in carbon monoxide, methane, and formaldehyde emissions.

Radical Chemicals Generator (RCG)

Systems, devices, and methods described herein use an RCG device to improve performance of internal combustion engines, e.g., by inducing ERI. Further details of examples of RCGs are described in this section.

Figure 7:
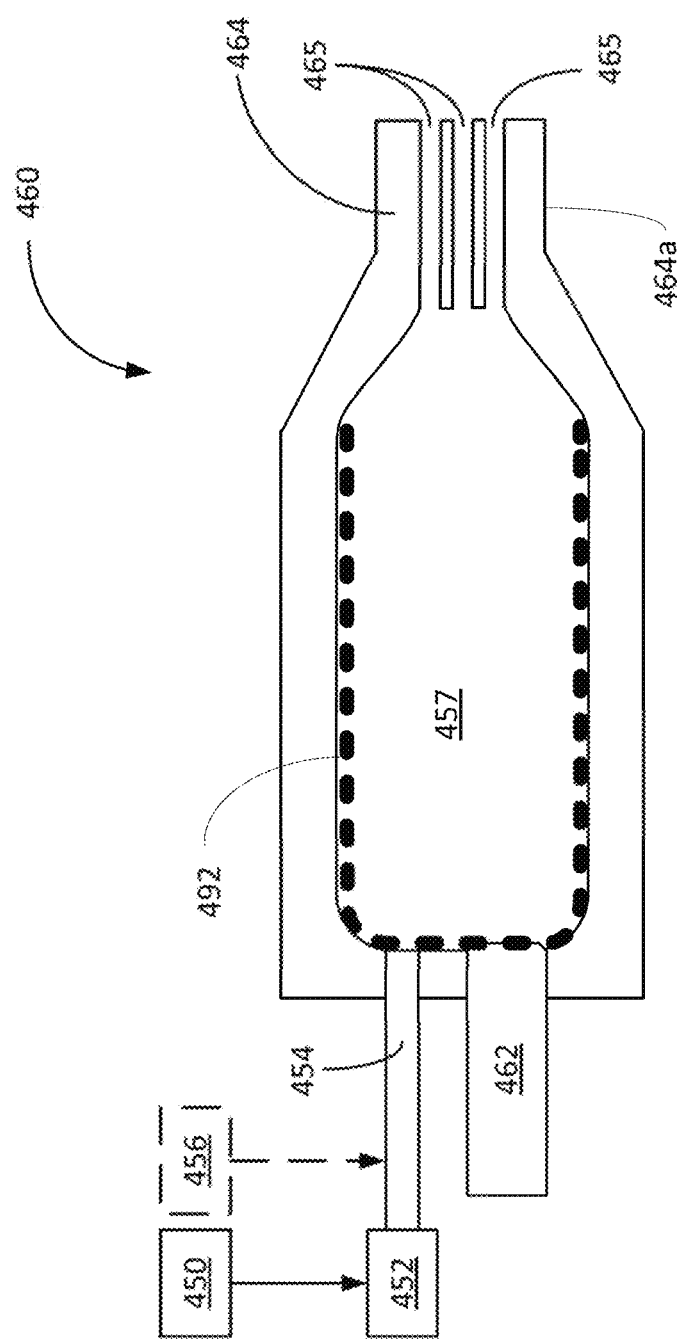
FIG. 7 is a schematic diagram of an example RCG, according to embodiments.

In some embodiments, an RCG device can include a housing defining a radical chemicals generator volume (RCGv), a spark or ignition device, and a fuel-delivery control device that can be directly or indirectly mounted to the housing. FIG. 7 depicts an example RCG 460, according to some embodiments. The RCG 460 can have a housing that defines an RCGv or chamber 457, a spark device 462, and a fuel-delivery control device 452 (e.g., an electronic check valve or a mechanical fuel metering device or valve), which is coupled via a passageway 454 to the housing of the RCG 460. The RCG includes a QS 464, which can be configured to couple to ahead of an internal combustion engine (e.g., head 116, 216). For example, the QS 464 can have an attachment mechanism 464a that enables the QS 464 to attach to the head. In some embodiments, the attachment mechanism 464a can be a threaded surface that can screw into a threaded port or opening on the head for receiving the QS 464. The threaded port on the head can be, for example, a pre-existing opening in the head that was previously used to receive one or more other components of the internal combustion engine (e.g., a PCC, a spark plug, etc.) that may no longer be required with the addition of the RCG 460 to the engine.

Figure 24:
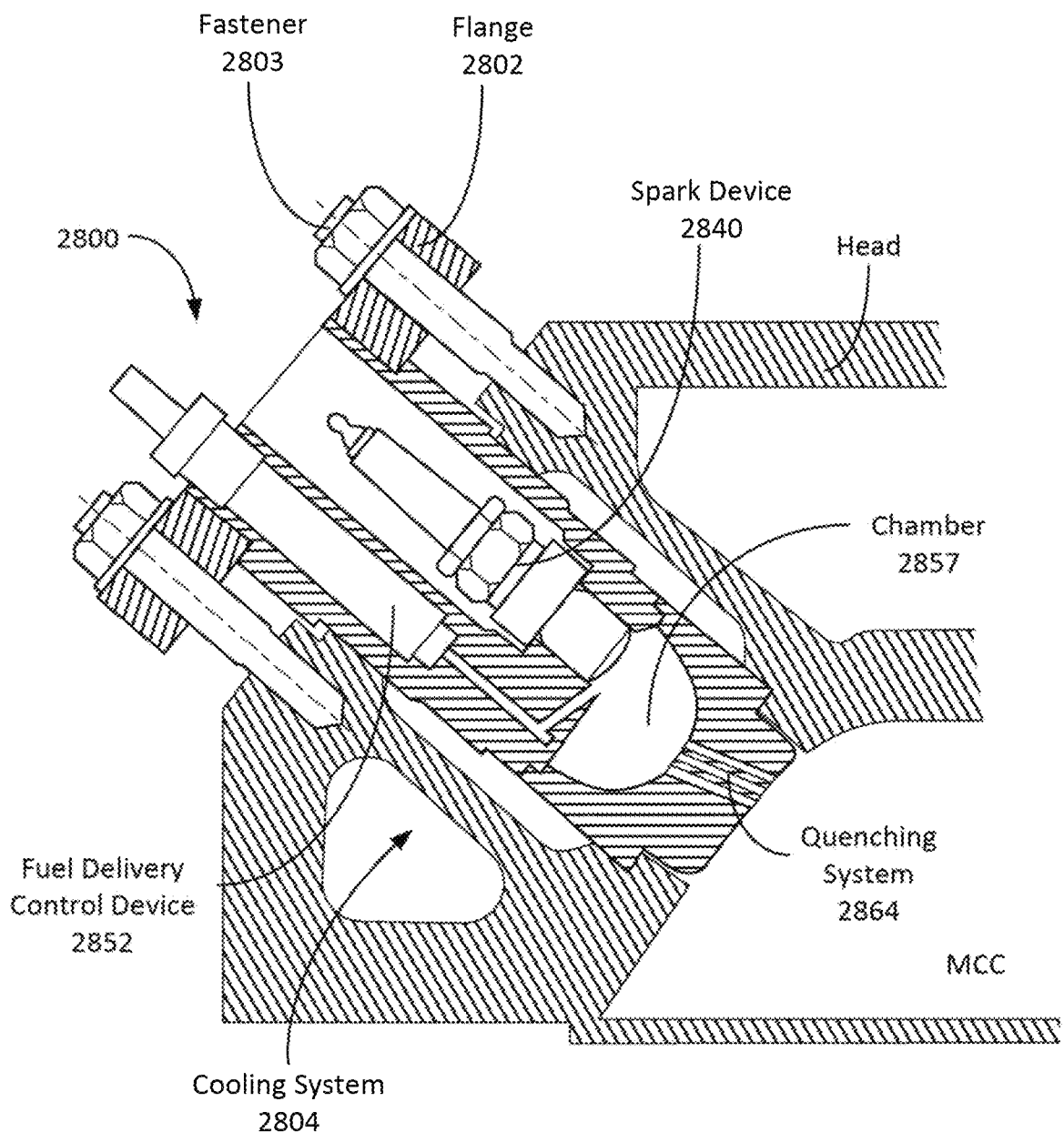
FIG. 24 is cross-sectional view of an example flange-mounted RCG, according to embodiments.

In some embodiments, the RCG attachment mechanism 464a can include one or more flanges for mounting the RCG to the head. FIG. 24 depicts a flange-mounted RCG 2800. The flange mounted RCG 2800 can include components that are structurally and/or functionally similar to the RCG 460, such as, for example, a fuel-delivery control device 2852, a spark device 2840, a RCGv or chamber 2857, and a QS 2864. As depicted in FIG. 24, the QS 2864 can include a plurality of orifices or passageways that are angled relative a longitudinal axis of the RCG 2800. Further details of a QS are described below with reference to FIG. 7. The RCG 2800 can be mounted via one or more flanges 2802 and/or fasteners 2803 (e.g., a screw, bolt, or other suitable fastening device) to a head of an engine.

Referring back to FIG. 7, a fuel source 450 can be coupled to the RCG 460, e.g., via passageway 454. The fuel source 450 can be structurally and/or functionally similar to fuel source 150 described above. The fuel-delivery control device 452, which may be, for example, a mechanical or electronic check valve, can control the rate and/or amount of fuel delivered into the RCGv 457 during each combustion cycle. The mixture of fuel-air charge in the RCGv 457 (e.g., from fuel delivered by fuel source 450 and/or fuel or air forced into the RCG from a MCC during a combustion cycle) can be ignited using the spark device 462 to produce burning combustion products inside the RCGv. These combustion products, as described below, can be quenched by the nozzle 464 to produce RS. In some embodiments, the RCG 460 can optionally be coupled to an air source 456 that delivers pressurized air into the RCGv 457. The pressurized air can increase air-fuel ratio within the RCGv 457 to aid in combustion within the RCGv 457.

The QS 464 can include one or more orifices or passageways 465, e.g., such as one or more orifices or passageways 465 that form part of a nozzle. The passageways 465 of the QS 464 are configured to interrupt a combustion process that occurs in the RCGv by quenching the flame of burning combustion products from the RCGv before it enters a MCC of an internal combustion engine (e.g., MCC 117, 217). The quenching occurs as the combustion products from the RCGv expand and pass through the QS passageways 464 and produces a hot jet of partial combustion products. The QS 464 can be designed with a quenching distance (e.g., distance from the QS 464 exit into the MCC before the hot jet ignites the MCC fuel-air charge) that is several times the length of the QS 464, which can position the ignition and initiation of the combustion event at multiple locations throughout the MCC.

As described herein, the hot jet of partial combustion products can include a high concentration of RS. These RS can cause ignition and sustained combustion in the MCC without requiring an initial spark or flame. Such sparkless or flameless ignition is referred to herein as ERI.

Figure 8A:
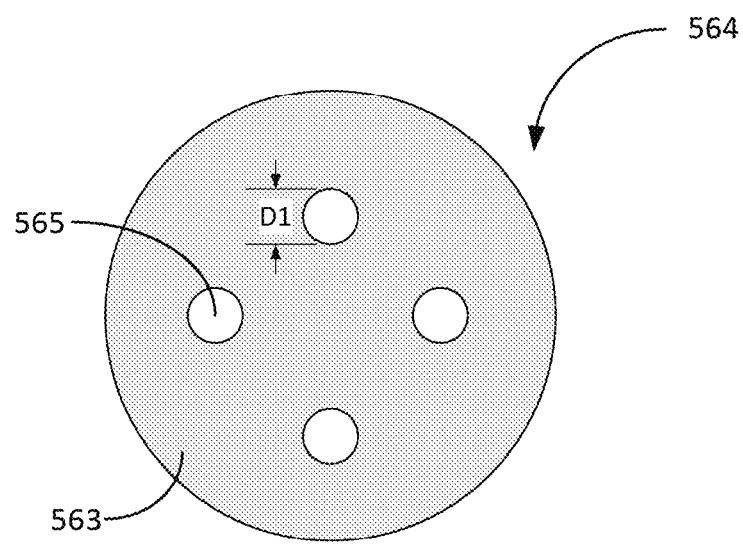
FIGS. 8A and 8B are schematic diagrams of different arrangements of RCG chamber and any number of orifices, openings, passageways, vents, or nozzles which together act as a quenching system (QS), according to embodiments.
Figure 8B:
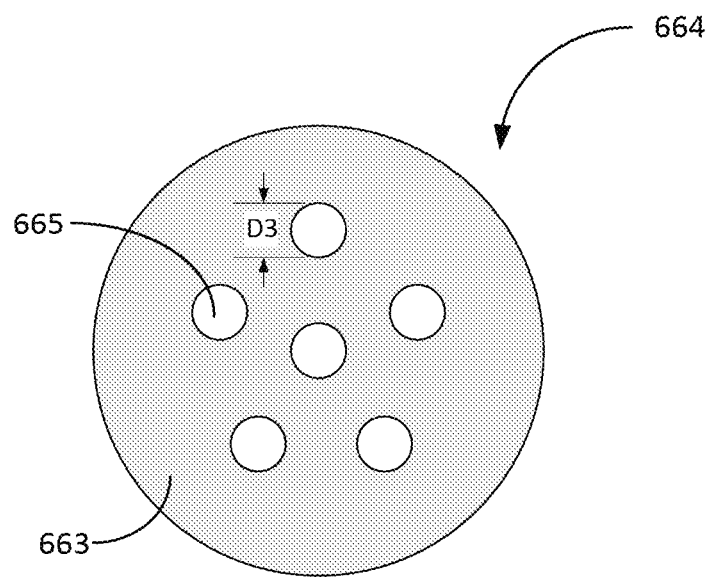
Figure 9C:
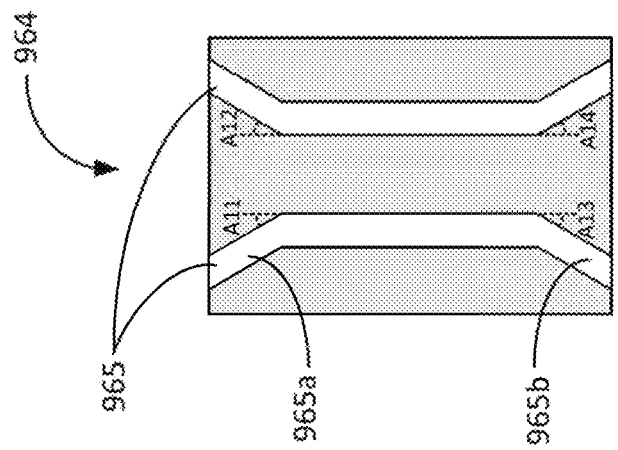
Figure 9B:
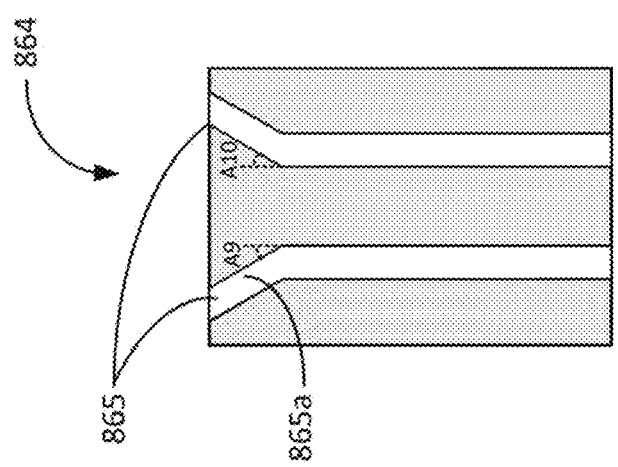
Figure 9A:
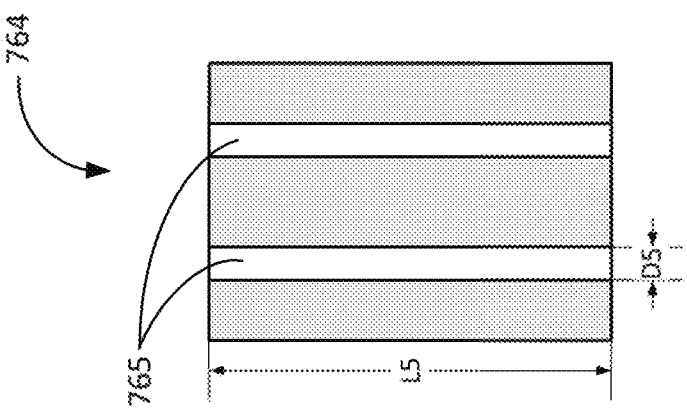

In some embodiments, the QS 464 can include between two and ten passageways 465, including all ranges and values therebetween. For example, as depicted in FIG. 8A, an RCG QS 564 can include four orifices or passageways 565, and as depicted in FIG. 8B, an RCG QS 646 can include size orifices or passageways 665. In FIG. 8A, the orifices 565 can be evenly distributed about a bottom face 563 of the nozzle 564, and each have a diameter D1. In FIG. 8B, the orifices 665 can be evenly distributed about a bottom face 663 of the QS 664, and each have a diameter D3. The diameters D1 and D3 can be selected based on a number of factors, including: (1) length of the orifices 565 and what would enable the QS to effectively quench the ignited fuel-air charge from the RCG chamber, (2) a total cross-sectional area of the QS face 563 and/or orifices 565, (3) a required velocity of the output jet (e.g., about 100-300 m/s or greater), (4) predetermined length to diameter (L/D) ratio suitable for quenching (e.g., L5/D5 as depicted in FIG. 9A), (5) the type of engine (e.g., size and/or configuration of engine), etc. In some embodiments, the diameters D1, D3, D5 of the orifices of QSs described herein can be between about 1 mm to about 10 mm, including all values and subranges in-between. For example, the diameter can be between about 2 mm and about 5 mm, or between about 3 mm and about 5 mm. In some embodiments, the L/D ratio of the orifices can be greater than about 3, greater than about 3.5, greater than about 4, greater than about 4.5, greater than about 5, greater than about 10, greater than 15, including all values and ranges in-between. In some embodiments, a larger number of orifices can be used, each with smaller cross-sectional area, to produce the same effect as a smaller number of orifices each with larger cross-sectional area.

While orifices with the same diameters are depicted in FIGS. 8A and 8B, it can be appreciated QS described herein can be designed with orifices with different diameters from one another and/or orifices with changing diameter (e.g., a tapered, concave/convex or stepped diameter). And while the orifices are depicted as being evenly distributed and circular in cross-sectional shape in FIGS. 8A and 8B, it can be appreciated that QS described herein can be designed with orifices that are not evenly distributed and/or circular in cross-sectional shape (e.g., have cross-sectional shapes that are square, rectangular, triangular, etc.).

In some embodiments, orifices or passageways of an RCG QS (e.g., such as any of the RCGs described herein, including, for example, RCG QS 164, 264, 364, 464, etc.) can extend parallel to one another and/or parallel to a longitudinal axis of the QS, e.g., as depicted in FIG. 9A with orifices 765 extending parallel to each other and parallel to a longitudinal axis of the QS 764. In other embodiments, orifices or passageways of an RCG QS can extend angled relative to one another and/or a longitudinal axis of the QS, as described with respect to FIGS. 4C and 5. In some embodiments, an orifice or passageway of an RCG QS can be angled at one or both ends. For example, as depicted in FIG. 9B, orifices 865 of a QS 864 can have a first end 865a that leads into the RCG chamber or mini-volume that is angled A9, A10 relative to a longitudinal axis of the QS 864. As another example, as depicted in FIG. 9C, orifices 965 of a QS 964 can have first and second ends 965a, 965b that are angled A11, A12, A13, A14 relative to a longitudinal axis of the QS 964. In some embodiments, the angles A9, A10, A11, A12, A13, A14 can be selected to be the same, while on other embodiments, one or more angles A9, A10, A11, A12, A13, and A14 can be different from others. In some embodiments, angles A9, A10, A11, A12, A13, and A14 can be greater than about 0 to about 75 degrees, including all values and subranges in-between. For example, angles A9, A10, A11, A12, A13, and A14 can be greater than about 0 to about 40 degrees, greater than 10 to about 40 degrees, greater than 15 to about 40 degrees, or greater than 20 to about 40 degrees.

While not depicted, it can be appreciated that other combinations of angling of the orifices relative to one another, including configurations where a subset of one or more orifices may be angled along a first length or bent at a first location while another subset of one or more orifices may be angled along a second length or bent at a second location different from the first length or first location, respectively, can be used in embodiments described herein.

As further examples of orifices of a RCG QS, FIGS. 9D and 9E depict orifices that can be convergent and/or divergent, e.g., to distribute the RS entering the MCC in a spray pattern and/or induce swirl of air being pushed into the RCGv. In some embodiments, convergent and/or divergent orifices can be used to produce supersonic jet velocities. FIG. 9D depicts a QS 2264 with orifices 2265 that are divergent. The orifices 2265 can have a first diameter at a first end, e.g., at the end of each orifice 2265 that opens into the RCGv, and a second diameter greater than the first diameter at the opposite end, e.g., at the end of the orifice 2265 that opens into the MCC. The divergent nature of the orifices can spray and/or fan out the jet of RS that is introduced into the MCC. Alternatively, orifices of a QS, as described herein, can be convergent, e.g., to induce swirl in air being pushed from the MCC into the RCGv. FIG. 9E depicts a QS 2364 with orifices 2365 that have a convergent portion and a divergent portion. Specifically, the orifices 2365 can have a first portion 2365a that converges from a first end of the orifices 2365 to a point 2365c (e.g., throat) and a second portion 2365b that diverges from the point 2365c to the opposite end of the orifices 2365. The first end of the orifices 2365 can have a first diameter, the opposite end of the orifices 2365 can have a second diameter, and the point 2365c can have a third diameter that is less than the first and second diameters. In some embodiments, the diameter of the orifices 2365 at its ends can be equal, while in other embodiments, the diameter of the orifice 2365 at the first end can be greater than or less than the diameter of the orifice 2365 at the opposite end. The convergent and divergent structure of the orifices 2365 can distribute the RS entering the MCC in a spray pattern and/or induce swirl of air being pushed into the RCGv.

While not depicted, it can be appreciated that other combinations of convergent and/or divergent orifices (as well as orifices that are angled to one another and/or convergent or divergent) can be used in embodiments described herein.

Figure 10:
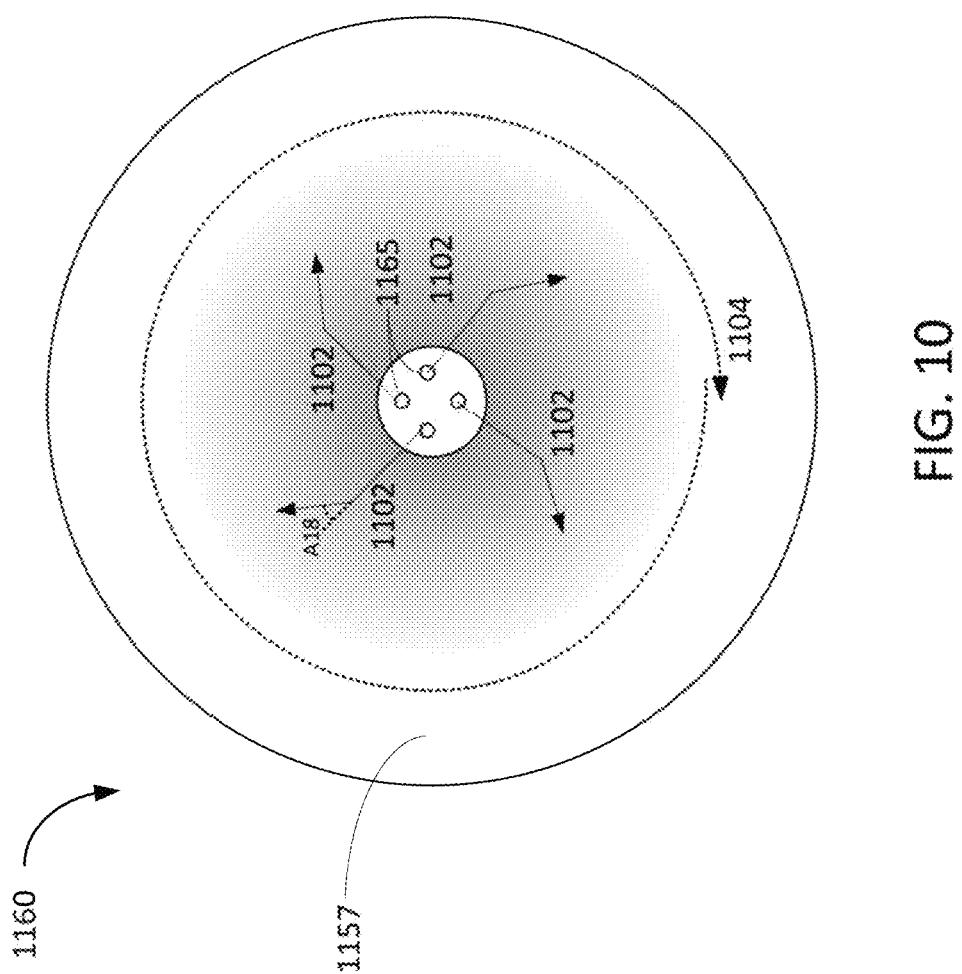
FIG. 10 is a schematic diagram of a side view of an example RCG, showing a flow pattern associated with movement of gases and fuel entering the RCG, according to embodiments.

The angling of the QS ends that lead into the RCGv (e.g., QS ends 865a, 965a, with angles A9, A10, A11, A12) can be designed to produce a swirling effect as air is pushed through that end of the QS into the RCGv. FIG. 10 schematically depicts the swirling effect produced by orifices 1165 of a nozzle of an RCG 1160. The RCG 1160 can have components that are structurally and/or functionally similar to those of other RCGs described herein (e.g., RCG 160, 260, 360, 460). As shown in FIG. 10, air exiting the QS orifices 1165 and into the RCGv 1157 can be directed toward a side of the RCGv 1157, which then causes the air to move along an angled path 1102 with an angle A18. The angled paths 1102 of the air then combine to produce a swirling or turbulent mixing 1104 of air that can lead to more mixing of the air with fuel within the RCGv 1157, which can result in a more homogeneous combustion process. The angling of the QS ends that lead into the MCC (e.g., QS ends 965b, 2265b, 2365b with angles A13, A14, A15, A17) can be designed to produce a spray effect (e.g., flow that is more distributed or fanned out) as the RS are injected into the MCC. Such spraying can enable more mixing of the RS with a fuel-air charge in the MCC and/or more evenly distribute the RS within the MCC. Moreover, the angling of the QS ends that lead in the MCC can direct the jet of RS more toward a center of the MCC vs. toward the piston face or crown.

FIGS. 14A-19D and 29A-30D depict examples of QS ends or sections 1500, 1600, 1700, 1800, 1900, 2000, 3200, and 3300 of RCGs, according to embodiments. RCG QSs described herein (e.g., RCG QS 164, 264, 364, 464, etc.) can include any one of the QS ends depicted in FIGS. 14A-19D and 29A-30D. RCGs with QS ends 1500, 1600, 1700, 1800, 1900, 2000, 3200, and 3300 can be designed for use with Cooper Bessemer 14" bore natural gas engines, but it can be appreciated that any one of such QS ends 1500, 1600, 1700, 1800, 1900, 2000, 3200, and 3300 can be adapted for use with other types of engines, including smaller and/or larger engines. For example, when used with larger engines, QS ends 1500, 1600, 1700, 1800, 1900, 2000, 3200, and 3300 can be adapted to have larger dimensions; however, certain dimensional ratios (e.g., L/D ratio of QS orifices) can be maintained to ensure quenching of a jet of RS.

FIGS. 14A-14D depict the example QS end 1500. QS end 1500 can have a QS 1564 with five QS openings 1565. The QS openings 1565 can extend in parallel along a length of the QS 1564.

FIGS. 15A-19D depict the example QS ends 1600, 1700, 1800, 1900, 2000. QS ends 1600, 1700, 1800, 1900, 2000 can have QS 1664, 1764, 1864, 1964, 2064 with a plurality of QS openings or orifices 1665, 1765, 1865, 1965, 2065. The QS openings 1665, 1765, 1865, 1965, 2065 can be arranged evenly about the QS 1664, 1764, 1864, 1964, 2064. For example, QS 1664, 1764, 1864, 1964 each have five openings (e.g., openings 1665, 1765, 1865, 1965, respectively) that are arranged evenly in a circular pattern about a center longitudinal axis of the QS 1664, 1764, 1864, 1964, and nozzle 2064 has nine openings 2065 that are arranged evenly about the QS 2064. Openings 1665, 1765, 1865, 1965, 2065 can have one or more ends that are angled relative to a longitudinal axis of their respective QS 1664, 1764, 1864, 1964, 2064. As described above, the angling of the ends that lead in the MCC can direct the jet of RS more toward a center of the MCC vs. toward the piston face or crown, and the angling of the ends that lead into the RCGv can produce a swirling effect.

Figure 18A:
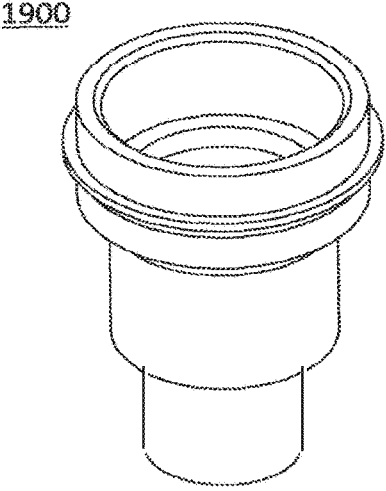
FIGS. 18A-18D illustrate an example QS section of an RCG, according to embodiments.
Figure 18B:
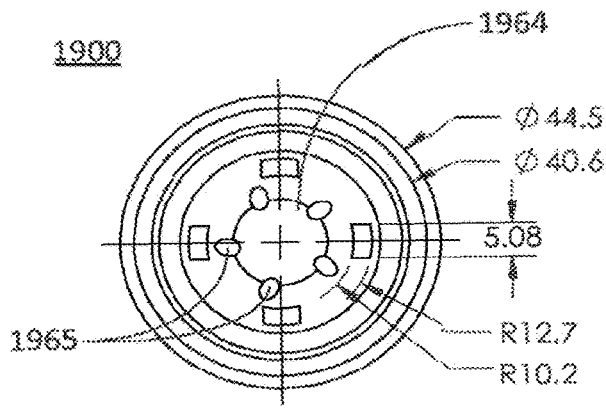
Figure 18C:
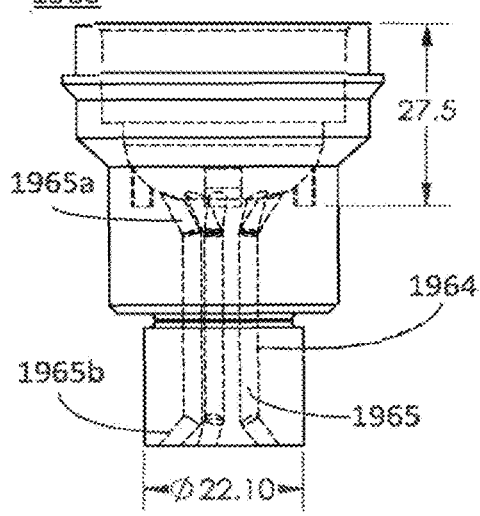
Figure 18D:
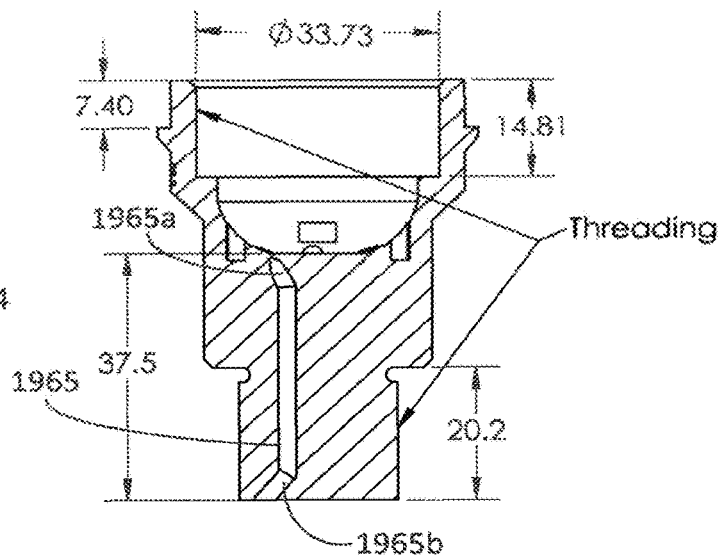
Figure 19A:
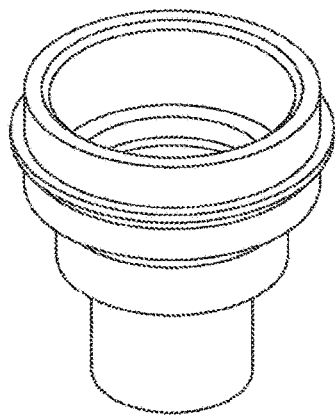
FIGS. 19A-19D illustrate an example QS section of an RCG, according to embodiments.
Figure 19B:
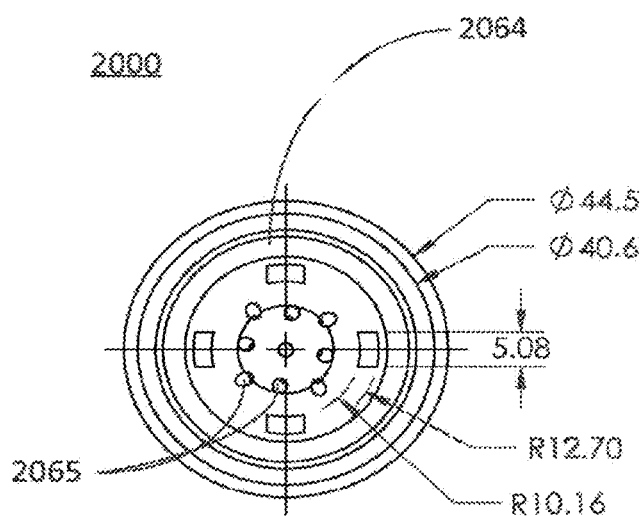
Figure 19C:
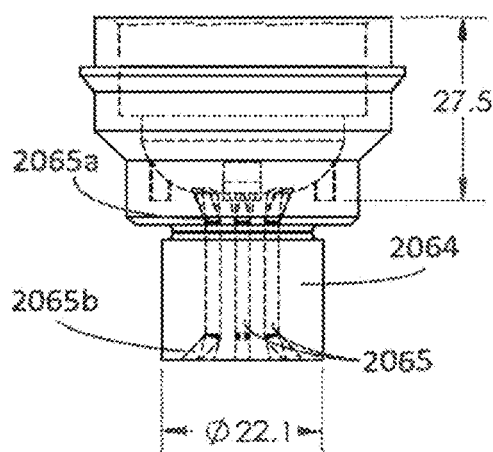
Figure 19D:
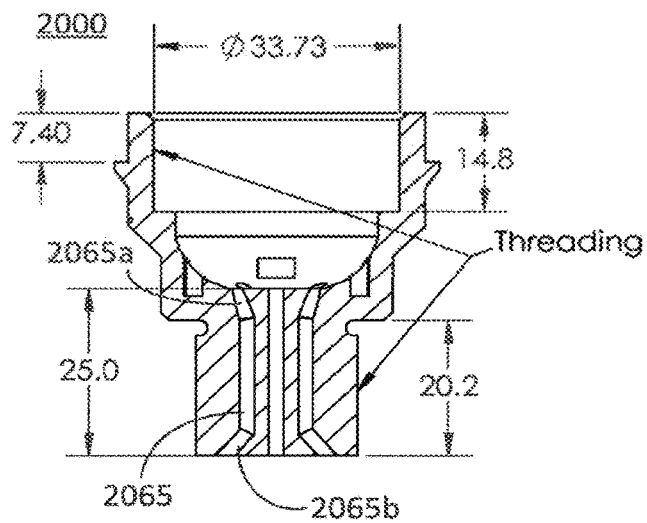

In some embodiments, the angles of the ends of the openings 1665, 1765, 1865, 1965, 2065 can range from about 0 to about 70 degrees, or about 0 to about 40 degrees, or any other subranges and value in-between, such as described above with respect to FIGS. 9A-9C. In some embodiments, the angles of the two ends of the openings can be different. For example, as depicted in FIGS. 18C and 18D, first ends 1965a (e.g., ends opposite main combustion chamber, or ends of QS openings exiting into or adjacent to the RCGv) of the openings 1965 can be set at a first angle (e.g., about 20 degrees), and second ends 1965b (e.g., ends of QS openings exiting into or adjacent to the main combustion chamber) of the openings 1965 can be set at a second angle different from the first angle (e.g., about 40 degrees). Additionally, or alternatively, the angles of the ends of different openings can vary within a single QS. For example, as depicted in FIG. 19B, ends 2065a of the openings 2065 vary across the different openings. In addition, as depicted in FIG. 19D, ends 2065a and 2065b of each opening can be set at different angles.

FIGS. 29A-29D depict different view of an example QS end 3200 including a QS 3264 having a plurality or openings or orifices 3265. The openings 3265 can include ends 3265a that open into a MCC of an engine when a RCG including the QS end 3200 is installed in the engine. The ends 3265a can be angled relative to a longitudinal axis of the QS 3264 (e.g., set at an angle of about 20 degrees) such that the openings 3265 are configured to direct a jet of RS toward a center of the MCC or across the MCC. The openings 3265 can also be configured to disperse or distribute the jet of RS within the MCC. As depicted the openings 3265 can have a length of about 37.5 mm and a diameter of about 2.5 mm. Accordingly, a L/D ratio of each opening 3265 can be about 15.

In other embodiments, the length and/or diameter of the openings 3265 can be different, e.g., when used with different engines and/or to achieve different performance metrics, as further described below with respect to FIGS. 31-33. For example, FIGS. 30A-30D depict different views of an example QS end 3300 including a QS 3364 having a plurality of openings or orifices 3365. QS end 3300 can be structurally and/or functionally similar to QS end 3200, but have openings 3365 that have a smaller length. For example, QS openings 3365 can have ends 3365a that are angled relative to a longitudinal axis of the QS 3364. As depicted, openings 3365 can have a length of about 25 mm and a diameter of about 2.5 mm, such that a L/D ratio of each opening 3265 is about 10.

In some embodiments, an RCG (e.g., such as any of the RCGs described herein, including, for example, RCG QS 164, 264, 364, 464, etc.) can be formed as a unitary structure that has a QS with similar configurations as that depicted for QS ends 1500, 1600, 1700, 1800, 1900, 2000, 3200, 3300. In some embodiments, 3D or additive manufacturing printing techniques can be used to form a unitary RCG with a combustion chamber and a QS having one or more openings. In some embodiments, different sections of a RCG can be coupled together (e.g., by screw fit and/or welding) to form a RCG having a unitary structure. For example, an QS end (e.g., QS ends 3200, 3300) can include threading along an inner surface for joining with a RCG main body and/or a suitable geometry (e.g., beveled geometry 3202, 3302) that mates with a portion of a RCG main body. The mating geometry of the QS end that fits into the RCG main body can enable a seal to be formed between the two portions such that gases within the RCGv cannot become trapped within spaces between the two portions. The QS end can be formed separately from a RCG main body, joined together (e.g., via screw fit), and then welded along on or more surfaces to maintain the attachment between the QS end and the RCG main body. In some embodiments, the QS ends can include a threaded portion along an outside of the QS that can be used to couple the RCG or QS end to a head of an engine, e.g., via a screw-in connection.

FIGS. 25A-25C depicts a RCG 2900 implemented as a unitary structure. RCG 2900 can include components that are structurally and/or functionally similar to other RCGs described herein. For example, RCG 2900 can include one or more ports, including a port for fuel delivery including a fuel delivery control device 2952. The RCG 2900 can include a RCGv 2957 and a QS 2964 including one or more orifices 2965. The ports or channels extending from the main body 2906 of the RCG 2900 can be welded to the main body at points 2902, and the QS 2964 end of the RCG 2900 can be seated onto the main body 2906 (e.g., threaded on until seated via threading along an outside surface of the QS end) and then welded together with the main body 2906.

The dimensions (e.g., lengths, widths, etc.) of QS ends 1500, 1600, 1700, 1800, 1900, 2000 and/or one or more components thereof can vary, e.g., as depicted in FIGS. 14A-19D. Such lengths can vary to suit different types of engines to ensure flame quenching. For example, the longitudinal length of QS openings 1565, 1665, 1765, 1865, 1965, 2065 can range between about 10 mm to about 75 mm, about 15 mm to about 50 mm, about 20 mm to about 40 mm, or about 30 mm to about 40 mm, inclusive of all subranges and values in-between. In some embodiments, the longitudinal length of QS openings 1565, 1665, 1765, 1865, 1965, 2065 can be at least about 10 mm, at least about 15 mm, at least about 20 mm, at least about 25 mm, at least about 30 mm, at least about 37.5 mm, at least about 40 mm, at least about 45 mm, at least about 50 mm, at least about 55 mm, at least about 60 mm, at least about 65 mm, at least about 70 mm, or at least about 75 mm. In such embodiments, the diameter of the longitudinal length of QS openings 1565, 1665, 1765, 1865, 1965, 2065 can be about 0.5 mm to about 10 mm, or about 2 mm to about 5 mm, such that a ratio of the length to the diameter of the QS openings 1565, 1665, 1765, 1865, 1965, 2065 is greater than about 3. In some embodiments, e.g., when used in Cooper Bessemer 14" bore natural gas engines, a longitudinal length of QS passages or openings 1565, 1665, 1765, 1865, 1965, 2065 can range between about 15 mm to about 40 mm, inclusive of all values and subranges in-between.

The lengths of QS ends 1500, 1600, 1700, 1800, 1900, 2000 and/or one or more components thereof can also vary depending whether an engine is a naturally aspirated engine, a piston scavenged engine, or a forced induction engine. For example, a length or length-to-diameter ratio of one or more orifices or passageways of the QS ends 1500, 1600, 1700, 1800, 1900, 2000 in a forced induction engine may be designed to be longer than in a naturally aspirated engine. In particular, in an engine that has higher boost, more air would enter into the RCG volume and necessitate more fuel to be delivered to the RCG volume to maintain a predetermined fuel-air ration (e.g., 1:1). When this charge is then ignited within the RCG volume, it produces greater energy and therefore can be delivered through longer orifices (or orifices with larger length-to-diameter ratios) into the MCC. The longer orifices can ensure that the ignited fuel-air charge is sufficiently quenched and that the quenched jet entering the MCC does not travel at too fast a velocity (which may not induce ignition in the MCC). As boost decreases and less fuel is in the RCG volume, e.g., in a naturally aspirated engine, less energy is produced and therefore longer orifices (or orifices with larger length-to-diameter ratios) may be undesirable as such orifices may over-quench or stall the momentum of the RS jet. As such, given the same diameter of the QS passages or openings (e.g., about 2-5 mm, or about 2.5 mm), the longitudinal length of the QS passages or openings used with a naturally aspirated engine can be selected to be lower (e.g., about 10 mm to about 20 mm, or 15 mm), versus that used with a forced induction engine (e.g., about 25 mm to about 40 mm).

In some embodiments, e.g., when used in Cooper Bessemer 14" bore natural gas engines, a length of a lower end of the QS ends 1500, 1600, 1700, 1800, 1900, 2000 with threading, e.g., for securing into an engine head, can be about 10 mm, about 15 mm, about 18 mm, about 20 mm, about 22 mm, about 25 mm, about 30 mm, and all values and ranges in-between. It can be appreciated that any one of such QS ends 1500, 1600, 1700, 1800, 1900, 2000, 3200, and 3300 can be adapted for use with other types of engines, including smaller and/or larger engines. For example, when used with larger engines, QS ends 1500, 1600, 1700, 1800, 1900, 2000, 3200, and 3300 can be adapted to have larger dimensions (e.g., longer longitudinal lengths, threaded sections, orifice diameters, etc.); however, certain dimensional ratios (e.g., L/D ratio of QS orifices) can be maintained to ensure quenching of a jet of RS.

Figure 35:
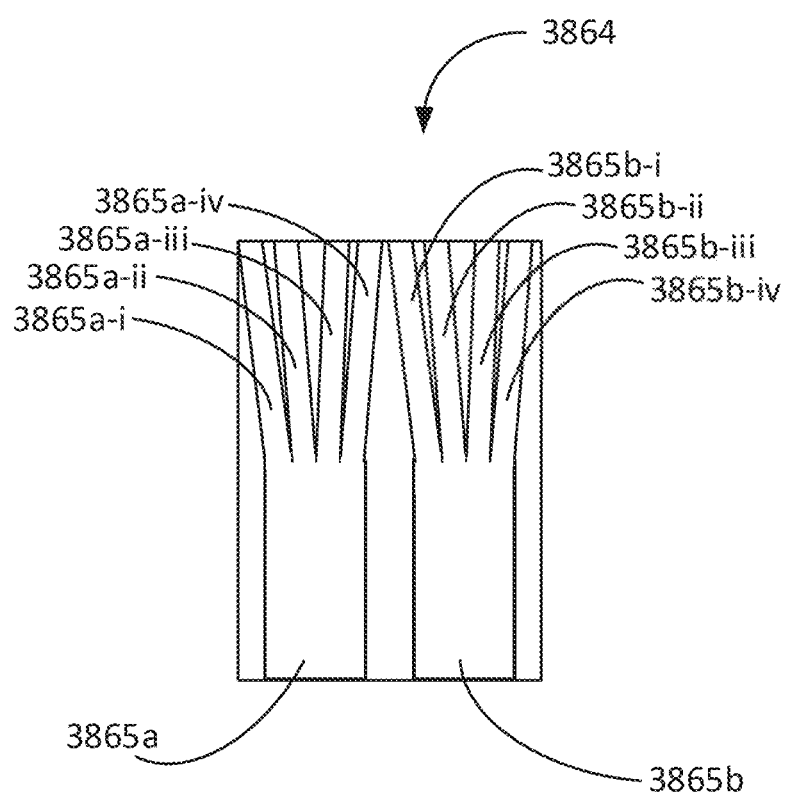
FIG. 35 is a schematic diagram of a quenching station, according to an embodiment.

In some embodiments, a RCG as described herein can have a QS with multiple orifices or passageways that merge prior to exiting into a MCC. FIG. 35 is a schematic diagram of a QS 3864 of a RCG, according to such embodiments. As shown, the QS 3864 includes QS orifices 3865a, 3865b (e.g., exit orifices), as well as QS sub-orifices 3865a-i, 3865a-ii, 3865a-iii, 3865a-iv, 3865b-i, 3865b-ii, 3865b-iii, 3865b-iv. As shown, the QS sub-orifices 3865a-i, 3865a-ii, 3865a-iii, 3865a-iv merge into the QS orifice 3865a, while the QS sub-orifices 3865b-i, 3865b-ii, 3865b-iii, 3865b-iv merge into the QS orifice 3865b. The QS sub-orifices 3865a-i, 3865a-ii, 3865a-iii, 3865a-iv, 3865b-i, 3865b-ii, 3865b-iii, 3865b-iv are directly coupled to an RCG chamber (not shown), while the QS orifices 3865a, 3865b are coupled to a MCC (not shown). Stated differently, the QS 3864 can have sets of orifices that are in fluid communication with one another and provide a passageway from an RCG chamber to a MCC of an engine (i.e., fluidically couple an RCG chamber to a MCC), with each set of orifices including one or more sub-orifices 3865a-i, 3865a-ii, 3865a-iii, 3865a-iv, 3865b-i, 3865b-ii, 3865b-iii, 3865b-iv and one or more orifices 3865a, 3865b.

The use of sub-orifices has several advantages. Once ignition has occurred in the RCG chamber, the flame front from the quenched fuel passes through the sub-orifices 3865, where quenching occurs. Such sub-orifices can have similar dimensional properties (e.g., length-to-diameter ratios) as the orifices described above with reference to QS ends 1500, 1600, 1700, 1800, 1900, 2000. Low diameter-to-length ratios (or higher length-to-diameter ratios) are more conducive to successful quenching, so the narrower QS sub-orifices 3865a-i, 3865a-ii, 3865a-iii, 3865a-iv, 3865b-i, 3865b-ii, 3865b-iii, 3865b-iv can properly facilitate quenching. However, it is important that the momentum of the quenched jet stream is sufficiently large such that the quenched jet stream can significantly penetrate the MCC. The further the quenched fuel travels across the MCC, the more distributed the radical species, and therefore the more uniform or complete the combustion is in the MCC. By combining the QS sub-orifices 3865a-i, 3865a-ii, 3865a-iii, 3865a-iv, 3865b-i, 3865b-ii, 3865b-iii, 3865b-iv into QS orifices 3865a, 3865b, the mass of the quenched fuel entering the MCC can multiply by an approximate factor of the number of sub-orifices feeding into each orifice (e.g., about four in FIG. 35). The increase in mass leads to an increase in momentum of the fuel entering the MCC, which can lead to deeper penetration of the quenched fuel-air charge into the MCC.

In some embodiments, the quenched fuel can exit the QS orifices 3865a, 3865b and enter the MCC at an exit velocity of at least about 200 m/s, at least about 210 m/s, at least about 220 m/s, at least about 230 m/s, at least about 240 m/s, at least about 250 m/s, at least about 260 m/s, at least about 270 m/s, at least about 280 m/s, at least about 290 m/s, or at least about 300 m/s, inclusive of all values and ranges therebetween. This exit velocity is important to ensure sufficient penetration of the jet of RS within the MCC.

In some embodiments, the cross-sectional area of the QS orifices 3865a, 3865b at the end that exits into the MCC can be equal to or approximately equal to the combined cross-sectional area of each of the QS sub-orifices 3865 feeding into the QS orifices 3865a. For example, the QS orifice 3865a at the end exiting into the MCC can have a cross-sectional area of about 1 cm, while the QS sub-orifices 3865a-i, 3865a-ii, 3865a-iii, 3865a-iv each have cross-sectional areas of about 0.25 cm.

While each QS orifice 3865a, 3865b is depicted in FIG. 35 as being fed by 4 QS sub-orifices, it can be appreciated that any number of sub-orifices can merge or fed into a single orifice. For example, each of the QS orifices 3865a, 3865b can be fed by 2, 3, 4, 5, 6, 7, 8, 9, 10, 11, 12, 13, 14, 15, 16, 17, 18, 19, 20, at least about 20, at least about 25, at least about 30, at least about 35, at least about 40, at least about 45, or at least about 50 QS sub-orifices, inclusive of all values and ranges therebetween. Additionally, while the QS 3864 is shown with two QS orifices and eight QS sub-orifices, it can be appreciated that any number of QS orifices or QS sub-orifices can be used. For example, QS 3864 can have between 1 and about 10 QS orifices exiting into the MCC, including all subranges and values therebetween. Additionally or alternatively, the QS 3864 can have between 2 and about 50 QS sub-orifices extending from the RCG chamber (and merging into the QS orifices), including all subranges and values therebetween.

Further details of an example RCG designed with multiple sub-orifices that feed into or merge together to form an orifice are described with reference to FIGS. 36A-36H.

In some embodiments, the RCG 460 can include a coating 492, e.g., along at least a portion of an inner wall of the RCGv 457. The coating 492 can be a catalytic coating or thermal barrier coating configured to enhance combustion and RS generation.

In some embodiments, the RCG 460 can be configured with an independent water or other coolant jacket. For example, as depicted in FIG. 25C, the RCG 2900 can have an independent water or coolant jacket 2904. In some embodiments, the RCG 460 can share a coolant mechanism with the head of an internal combustion engine (e.g., engines 100, 200, 300) (e.g., share coolant passageways contained in the head). For example, as depicted in FIG. 24, the RCG 2800 can share a cooling system 2804 with the head of the engine.

In some embodiments, the RCG 460 can utilize the same fuel source as the MCC fuel supply. The RCG 460 can have a fuel requirement that is low compared to the total engine fuel consumption, e.g., approximately 1-3% of total engine fuel consumption.

In some embodiments, the RCG 460 can be fabricated by modifying a PCC design. For example, the RCG 460 can be fabricated by modifying a screw-in type PCC or a flange-mounted PCC, e.g., by removing a nozzle head of the PCC (or portion of the PCC including the nozzle head) and replacing it with the RCG QS (or portion of a RCG including a QS, as described herein). The RCG QS can be affixed to a body of the PCC (or remaining portion of the PCC), e.g., via screw-in attachment, and can then be welded onto the body of the PCC for final assembly.

In some embodiments, the RCG 460 can be designed to suit particular engine types and unique geometries, e.g., have specific configurations of QS such that it produces RS that are effective at inducing ERI with particular engine types and/or unique geometries.

The timing of quenching by the RCG 460 and subsequent mixing of the hot RS-rich jet with the fuel-air charge in the MCC can be predetermined based on a number of parameters, including: (1) a geometry and volume of the RCG 460 relative to a clearance volume (CV) of the MCC (e.g., MCC 117), where the CV is the volume of the MCC at top dead center (TDC) (e.g., 180 degrees after bottom dead center (BDC), when the piston is furthest from the crankshaft and a volume of the MCC is smallest); (2) the equivalence ratio (ER) of the RCG 460; (3) the design of the QS 464 and passageways 465, including, for example, QS passageway length, QS passageway diameter, or QS passageway length to diameter ratio (L/D), number of passageways, QS passageway alignment, QS passageway total cross-sectional area, QS passageway end-edge shapes, QS passageway symmetry, and QS passageway convergence and/or divergence, and QS being contained in threaded or flange mounted end. For the RCG 460 to be effective at producing a RS-rich jet, the RCG requires suitable volumes, geometries, ER, QS and passageway designs, among other parameters. These parameters of the RCG 460 can be selected to better suit the RCG 460 to different engine types and geometries (e.g., 2-stroke, 4-stroke, engine speed range, turbo/non-turbo, cylinder size, compression ratio (Cr), MCC ER, etc.), fuel type (e.g., liquid, gaseous, dual-fuel, etc.), and engine configuration (e.g., slow, constant speed, variable speed range, varying load range, fuel injected, naturally aspirated, etc.).

In embodiments described herein, an RCG (e.g., RCG 460) can be designed to provide reliable flame-quenching of the expelled jet which induces ERI in the MCC followed by a robust low-temperature combustion path, as further described herein. The ERI-initiated combustion can reduce misfires and result in more complete combustion of the fuel-air charge in an MCC. By quenching the burning combustion mass as it exits the RCG, the QS of the RCG can produce a hot jet containing partial combustion products. This hot jet can be injected at a high velocity into the MCC and can contain partial-combustion products, which are rich in highly reactive RS. These highly reactive RS can be essential for initiating a chain-branching ignition/combustion process in the MCC in the absence of a spark, flame or other thermal source. The RCG can inject the hot jet of RS into the MCC, thereby inducing ignition of the MCC fuel-air charge by chemical, thermal and turbulent mixing without a flame or spark source. The RCG QS orifices can be aligned (e.g., aimed) for distributing and mixing of the hot jet containing RS throughout the MCC fuel-air charge so that ignition is initiated in a more homogeneous or distributed fashion.

In some embodiments, RCGs (e.g., RCG 460) described herein can be used with large-bore engines. With large-bore engines, it can be important to specifically design the RCG QS orifices to achieve suitable exit velocities from the RCG orifices and into the MCC for substantial penetration into the MCC and mixing with the fuel-air charge, such that ERI is induced. This ERI technology can be applied to large (greater than about 14") and medium (about 6-14") bore stationary engines. In such engines, high velocities of the hot jet can be required for sufficient distribution of the RS and mixing of the RS with the MCC fuel-air charge throughout the CV. Such engines may have pre-existing orifices that can be used to mount an RCG, but such orifices may not be symmetrically positioned over the center of the piston (e.g., are offset from a crown of the head). As such, the distances across the cylinder CV can be many times the QS length and in conjunction with the asymmetric point for mounting the RCG can present additional challenges to effective mixing of the RCG hot-jet and efficient ERI. Systems, devices, and methods described herein include RCG designs that account for the asymmetric mounting and distribution requirements of medium and large-bore engines.

In some embodiments, the RCG QS (e.g., QS 464 of RCG 460) can be designed to disperse a hot jet of RS into a MCC to provide coverage at multiple locations within a CV such that a more volumetric mode of combustion is achieved. For example, FIG. 5 depicts a top view of an example internal combustion engine 300. The engine 300 can include components that are structurally and/or functionally similar to other engines described herein (e.g., engines 100, 200). For example, the engine 300 can include a MCC 317, a head 316, an RCG 360, and one or more M-Cs 370. The RCG 360 can be used to induce ERI in MCC 317. The RCG 360 can include a QS 364 with one or more passageways or orifices. The QS 364 can be configured to deliver a hot jet of partial combustion products rich in RS into the MCC 317, e.g., via quenching of the ignited RCG fuel-air charge. In some embodiments, the QS 364 can include a set of orifices that are angled to deliver the hot jet of partial combustion products in a dispersed configuration, as shown in FIG. 5. For example, the QS 364 can include orifices that are angled relative to one another (e.g., at non-zero angles with respect to one another) that quench the ignited RCG fuel-air charge and then deliver output streams 365*a-e* that are angled with respect to one another. These output streams 365*a-e* can distribute the RS rich jet throughout the CV of the MCC 317. In some embodiments, the QS 364 can include five orifices: a first orifice that extends parallel to a longitudinal axis of the QS and produces a first jet stream 365*a*, and four additional orifices that are angled with respect to the longitudinal axis of the QS and produce jet streams 365*b-e* that are angled A4, A5, A6, A7 with respect to the first jet stream 365*a*. In some embodiments, each of angles A4, A5, A6, and A7 can be different from one another. In some embodiments, angles A4 and A5 can be the same or substantially the same as each other, and angles A6 and A7 can be greater than angles A4 and A5 but the same or substantially the same as each other. In an embodiment, e.g., with a large bore engine such as an Ajax or GMV engine, jet streams 365*b* and 365*c* can be angled A4, A5 at about 15 degrees from jet stream 365*a*, and jet streams 365*d* and 365*e* can be angled A6, A7 at about 30 degrees from jet stream 365*a*. Angles A4, A5, A6, and A7 represent side-to-side angles of the orifices of the QS 364. In some embodiments, while not visible the view shown in FIG. 5, each of the orifices can be further angled up relative to a bottom of the MCC 317, e.g., at an angle of about 20 degrees (as shown and described in FIG. 4C with respect to engine 200). In some embodiments, each of the orifices can be angled upwards at about the same angle, while in other embodiments, one or more orifices can be angled upwards at different angles. Such angling of the QS orifices and distribution of the jet from the QS 364 can be specifically designed for each engine depending on engine type, size, etc.

In some embodiments, the engine 300 can optionally include two or more RCGs 360. For example, in a first example configuration, the engine 300 can include a single RCG (e.g., RCG 360) as the source for inducing ignition. In a second example configuration, the engine 300 can include two RCGs (e.g., RCGs 360) that together act to induce ignition. In a third example configuration, the engine 300 can include two or more RCGs (e.g., RCGs 360) where one or more RCG(s) act as a RS fumigator and one or more RCG(s) can act as the RS igniter. More specifically, the RS fumigator can act to fumigate the MCC with (e.g., provide or inject into the MCC) a first amount of RS that does not induce ignition, and the RS igniter can subsequently act to induce ignition by injecting a second amount of RS into the MCC causing ERI. The RS fumigator can be designed to over-quench the burning charge from its RCGv (e.g., RCGv 457) by having a high L/D and ER. The RS fumigator can be designed such that it does not cause ignition. For example, the RS fumigator can be configured to be over-quenched, e.g., have a smaller diameter nozzle. The RS fumigator can fire before/during or after the MCC fuel injection event to seed the MCC charge with additional RS to enhance ignition and combustion when the RS igniter fires. In some embodiments, the RS fumigator and the RS igniter can be configured to have the same structure. Alternatively, in some embodiments, the RS fumigator and the RS igniter can be configured to have different structure, e.g., the RS fumigator can be over-quenched (e.g., have smaller nozzles) compared to the RS igniter and/or have a different spray pattern (e.g., have different nozzle exit angles) than the RS igniter. For example, the RS fumigator can be configured to disperse the RS more evenly throughout the MCC, while the RS igniter can be configured to concentrate a jet of RS at a center of the MCC. Further details of the timing of fumigation and ignition associated with this third example embodiment is provided with reference to FIGS. 20 and 21. In a fourth example configuration, the engine 300 can include a RCG (e.g., RCG 360) that acts as a RS fumigator and a PCC (or spark device) that can be used to induce ignition of the MCC RS-rich, fuel-air charge.

In embodiments including two or more RCGs 360, each RCG 360 can include components that are structurally and/or functionally similar to the other. In some embodiments, each RCG 360 can include a QS 364 with orifices that are angled relative to one another such that the orifices distribute the RS-rich jet throughout the CV of the MCC 317. In some embodiments, each RCG 360 can be designed for the same function, e.g., to induce ignition. Alternatively, subsets of one or more RCGs can be designed for different functions, e.g., fumigation and ignition, as described above. For example, a first RCG can act as a RS fumigator and includes a QS that is designed to be over-quenched such that the RCG does not ignite the MCC but rather seeds the MCC with RS to enhance ignition and combustion. The first RCG can fire sometime between intake port closure and before a second RCG that acts as a RS igniter fires (see FIGS. 20 and 21, as further described below). The first RCG can be designed such that it does not cause ignition in the MCC. The second RCG can be designed to act as the MCC igniter. The second RCG can be designed to initiate ERI in the RS-seeded MCC. The effectiveness of the second RCG at inducing ignition can be increased due to the RS fumigation by the first RCG. ERI resulting from this configuration may enhance certain benefits produced by a configuration having a single RCG (e.g., emissions reduction, stability improvement, fuel economy, etc.).

In some embodiments, the engine 300 can include one or more M-Cs 370. The one or more M-Cs 370 can be distributed along a periphery of the head 316 at locations that are spaced from the RCG 360 such that the M-Cs 370 and the RCG 360 can collectively enable more even distribution of RS in the MCC 317. FIG. Such can seed the MCC fuel-air charge with RS that can enhance ERI initiated by the RCG. This combustion enhancement initiates in a more distributed manner throughout the CV because of the RS seeding. In some embodiments, the M-Cs 370 can be incorporated into the head or piston, e.g., using screw-in plugs, as depicted in FIGS. 6A-6B (showing example cross-sections of M-Cs, e.g., along line A-A in FIG. 5).

For example, as depicted in FIG. 6A, each M-C 370 can be incorporated into a screw-in plug with a threaded outer surface 371 that enables it to be plugged into a threaded cavity in the head 316 of the engine 300. Each M-C 370 can include a chamber 370a and an orifice 370b. The orifice 370b can communicatively couple the M-C 370a to the MCC 317 to facilitate transfer of fuel, air, and RS between the MCC 317 and each M-C 370. The M-C orifice 370b can be specifically designed for suitable release of RS into the MCC 317 during a combustion cycle, as further described below with respect to FIGS. 4A-4D. For example, the M-C orifice 370b can be designed with a diameter 370b that enables release of RS at a predetermined rate into the MCC 317 during a combustion cycle, where the predetermined rate is specifically tailored for the type of engine and/or speed of the engine. The volume of the M-C chamber 370a can also be specifically tailored to enable storage and ejection of a suitable amount of RS for seeding the MCC to enhance ERI when initiated by the RCG in specific types of engines.

FIG. 6B depicts another example M-C 370', which can be incorporated into a screw-in plug with a threaded outer surface 371', which enables it to be plugged into a threaded cavity in the head 316 of the engine 300. Similar to the M-Cs 370 depicted in FIG. 6A, each M-C 370' can have a chamber 370a' and an orifice 370b'. The orifice 370b' can be angled relative to a central axis of the chamber 370a' at a predetermined angle and offset a predetermined distance from a central region of the chamber 370a', such that the orifice 370b' can induce swirling inside the chamber 370a'. The predetermined angle and/or distance can be adjusted to suit a particular engine type and/or speed. While the orifice 370b' is depicted as being angled and offset, it can be appreciated that M-Cs used with engines described herein can be angled, offset, or both angled and offset.

In some embodiments, the M-C(s) 370 can include a catalytic or thermal barrier coating 372, e.g., similar to coating 190 and/or coating 492 described herein. The catalytic or thermal barrier coating can enhance combustion and RS storage, generation and ejection. The coating can be disposed along an inside surface of the chamber 370a and/or orifice 370b. Coating the M-Cs interior with thermal barrier coatings can reduce heat transfer into the head and contribute to conditions that promote the storage and release of RS from one cycle to the next.

While the M-C(s) 370, 370' are depicted as having a dome shaped chamber, it can be appreciated that systems and devices described herein can include M-Cs having chambers with other shapes, e.g., circular or spherical, heart-shaped, etc. In some embodiments, a M-C chamber can be shaped to have a tapered end as it converges toward a M-C channel (e.g., a heart-shaped chamber that has an orifice or channel at its point), such that gases entering the M-C can be induced to have a swirling flow.

Sleeve for Installing RCG

While bolting or threading the RCG can be effective at fixing the RCG to the engine head, the addition of a sleeve around the RCG can aid in securing the RCG in place in the engine head in some embodiment. For example, in some embodiments, the RCG may be placed within an opening within an engine head that is larger than the RCG, e.g., in height and/or width. As such, a sleeve or other stabilization component can be placed into the opening of the engine head to support the RCG, such that noise, vibration, etc. do not threaten to dislodge and/or damage the RCG.

Figure 34:
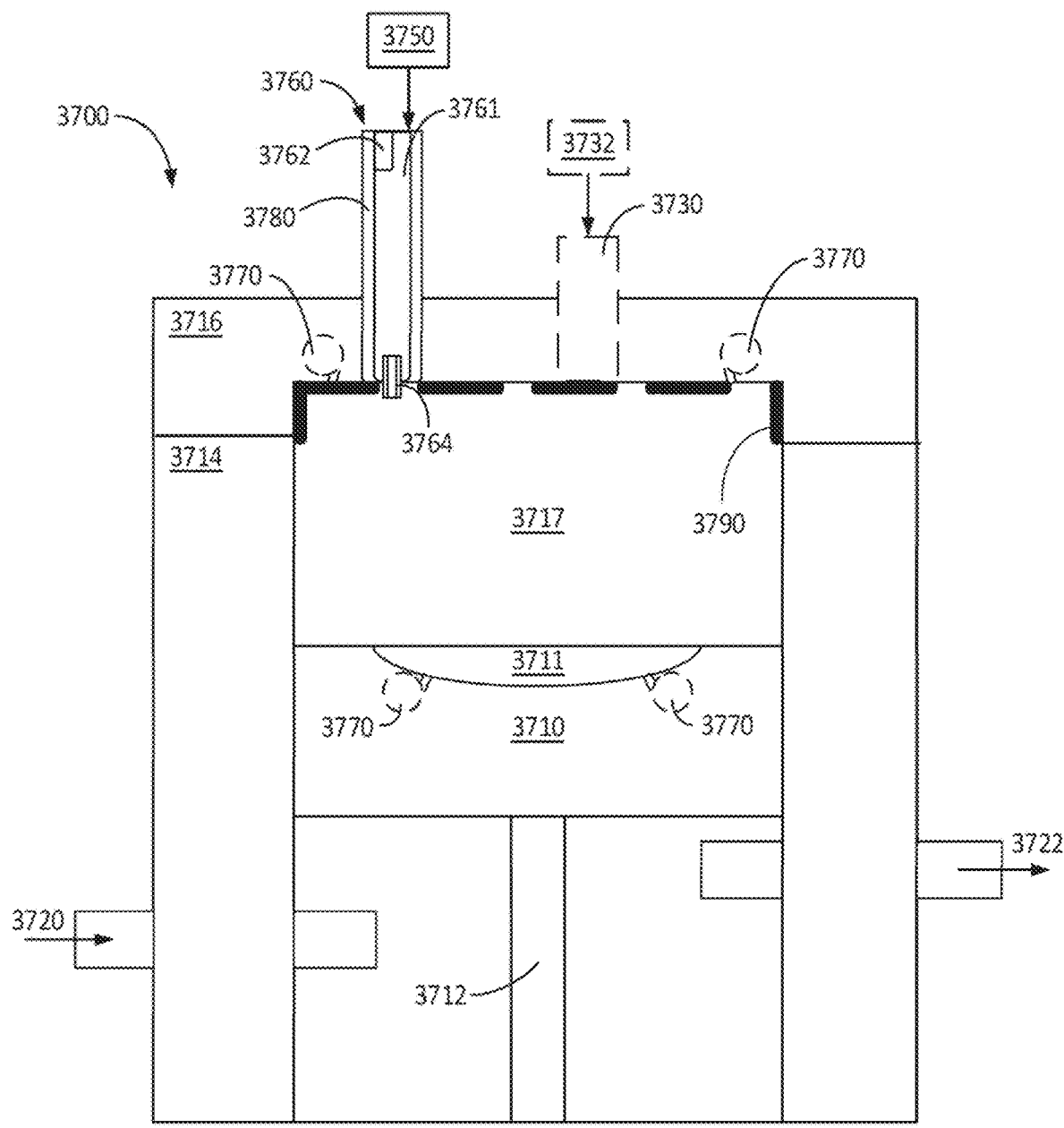
FIG. 34 is a schematic diagram of an example internal combustion engine cylinder, according to embodiments.

FIG. 34 is a schematic illustration of an example internal combustion engine 3700, according to embodiments. The engine 3700 includes an MCC 3717, a reciprocating piston 3710, a crown 3711, a rod 3712, a cylinder 3714, a head 3716, an air inlet 3720, an exhaust outlet 3722, a fuel valve body 3730, and an RCG 3760 with a chamber 3761, an ignition device 3762, and a QS 3764. The RCG 3760 includes a sleeve 3780 disposed thereon. Optionally, the engine 3700 can include one or more M-Cs 3770 located in the head 3716 and/or piston 3770. Fuel from a fuel source or fuel supply 3732 can optionally be supplied to the MCC 3717 via the fuel valve body 3730. In some embodiments, engine 3700 can include a coating 3790 disposed within the MCC 3717. In some embodiments, the reciprocating piston 3710, the crown 3711, the rod 3712, the cylinder 3714, the head 3716, the MCC 3717, the air inlet 3720, the exhaust outlet 3722, the fuel valve body 3730, the fuel supply 3732, the RCG 3760, the chamber 3761, the ignition device 3762, the QS 3764, the M-Cs 3770, and the coating 3790 can be the same or substantially similar to the reciprocating piston 110, the crown 111, the rod 112, the cylinder 114, the head 116, the MCC 117, the air inlet 120, the exhaust outlet 122, the fuel valve body 130, the fuel supply 132, the RCG 160, the chamber 161, the ignition device 162, the QS 164, the M-Cs 170, and the coating 190 as described above with reference to FIG. 2. Thus, certain aspects of the reciprocating piston 3710, the crown 3711, the rod 3712, the cylinder 3714, the head 3716, the MCC 3717, the air inlet 3720, the exhaust outlet 3722, the fuel valve body 3730, the fuel supply 3732, the RCG 3760, the chamber 3761, the ignition device 3762, the QS 3764, the M-Cs 3770, and the coating 3790 are not described in greater detail herein.

The sleeve 3780 provides an additional layer of stability in securing the RCG 3760 to the head 3716. In some embodiments, the sleeve 3780 can be coupled to (e.g., secured to) the head 3716 and define a channel or opening for receiving the RCG 3760. Alternatively, the sleeve 3780 can extend partially down a length or thickness of the head 3716, with a top end of the sleeve 3780 being secured to the head (e.g., with a mechanical fastener such as a C-clip) and a bottom end of the sleeve 3780 free-floating within the head. In such configurations, the RCG 3760 may extend out from the bottom of the sleeve 3780 and attach to a bottom of the head (e.g., at an opening into the MCC of the engine). The sleeve 3780 can optionally be used with an adapter or connector, such as a collar, for coupling its bottom end to a top portion of the RCG 3760. Further details of such an arrangement are described with reference to FIGS. 38A-40.

In some embodiments, the sleeve 3780 has a hollow cylinder shape and can define a cylindrical channel. Alternatively, the sleeve 3780 can have any elongate shape that defines an opening for receiving the RCG 3760. As shown, the sleeve 3780 extends from a top or exterior surface of the head 3716 down through the head 3716. In some embodiments, the sleeve 3780 can fit substantially or entirely within an opening within the head 3716. Optionally, the sleeve 3780 can have portions that sit higher than the top surface or exterior of the head 3716 or sit within the MCC 3717. In some embodiments, the sleeve 3780 can be configured to couple (e.g., mate or secure) the RCG 3760 to the head 3716.

Advantageously, rather than modifying the size of the RCG 3760 to fit an opening in the head 3716, which may be a complex process and require significant redesign for each type of engine head, the size of the sleeve 3780 can be modified to ensure an appropriate fit (e.g., tight fit) of the RCG 3760 into the head 3716. During assembly of a RCG into the head 3716, the sleeve 3780 can first be inserted into the head 3716 to create a channel or opening for receiving the RCG 3760. The RCG 3760 can then be inserted into channel of the sleeve 3780 such that the RCG 3760 is supported by the sleeve 3780. In some embodiments, once the RCG 3760 is installed within the engine, the RCG 3760 is disposed entirely within the sleeve 3780. Alternatively, portions of the RCG 3760 can extend out of the sleeve 3780. In some embodiments, the sleeve 3780 can be attached to the bottom of the head 3716 (e.g., threaded, welded, etc. to the bottom of the head 3716), and the RCG 3760 can be attached to the sleeve 3780 or an intermediate component such as a collar. Alternatively, both the sleeve 3780 and the RCG 3760 can have portions that are attached directly to the bottom of the head 3716 (e.g., via threading, welding, etc.). In some embodiments, the sleeve 3780 can be composed of gray cast iron, carbon steel, ceramic, or any combination thereof.

FIGS. 36A-36H illustrate components of an engine, installed with a sleeve 3980 and a RCG 3960, according to an embodiment. As shown in FIGS. 36A-36H, coolant jacket 3904 is disposed around the sleeve 3980, and a QS 3964 (including QS orifices 3965*a*, 3965*b*). The sleeve 3980 includes O-ring grooves 3981*a*, 3981*b*. An RCG 3960 is disposed in the sleeve 3980, with an ignition device 3962 and a spark plug insulator 3967. A check valve 3968 is coupled to the ignition device 3962. The QS 3964 can include multiple orifices that merge together prior to exiting into the MCC of the engine. In particular, the QS orifice 3965*a* is fed by QS sub-orifices 3965*a-i*, 3965*a-ii*, 3965*a-iii*, 3965*a-iv*, while the QS orifice 3965*b* is fed by QS sub-orifices 3965*b-i*, 3965*b-ii*, 3965*b-iii*, 3965*b-iv*. In some embodiments, the coolant jacket 3904 can be the same or substantially similar to the coolant jacket 2904, as described above with reference to FIGS. 25A-25C. In some embodiments, the RCG 3960, the ignition device 3962, and the sleeve 3980 can be the same or substantially similar to the RCG 3760, the ignition device 3762, and the sleeve 3780, as described above with reference to FIG. 34. In some embodiments, the QS orifices 3965*a*, 3965*b*, and the QS sub-orifices 3965*a-i*, 3965*a-ii*, 3965*a-iii*, 3965*a-iv*, 3965*b-i*, 3965*b-ii*, 3965*b-iii*, 3965*b-iv*, can be the same or substantially similar to the QS orifices 3865*a*, 3865*b*, and the QS sub-orifices 3865*a-i*, 3865*a-ii*, 3865*a-iii*, 3865*a-iv*, 3865*b-i*, 3865*b-ii*, 3865*b-iii*, 3865*b-iv*, as described above with reference to FIG. 35. Thus, certain aspects of the coolant jacket 3904, the RCG 3960, the ignition device 3962, the QS orifices 3965*a*, 3965*b*, the QS sub-orifices 3965*a-i*, 3965*a-ii*, 3965*a-iii*, 3965*a-iv*, 3965*b-i*, 3965*b-ii*, 3965*b-iii*, 3965*b-iv*, and the sleeve 3980 are not described in greater detail herein.

Figure 36A:
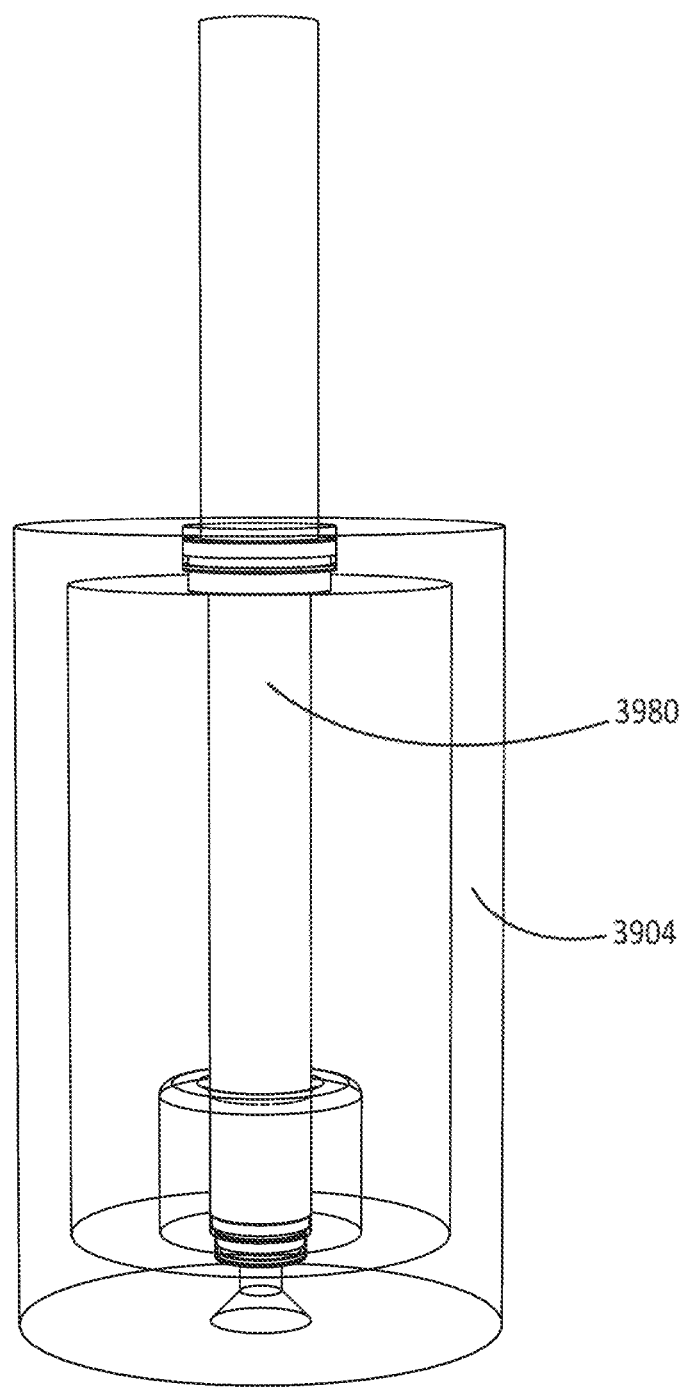
FIGS. 36A-36H illustrate various components of an internal combustion engine, including a sleeve and a quenching system, according to an embodiment.
Figure 36B:
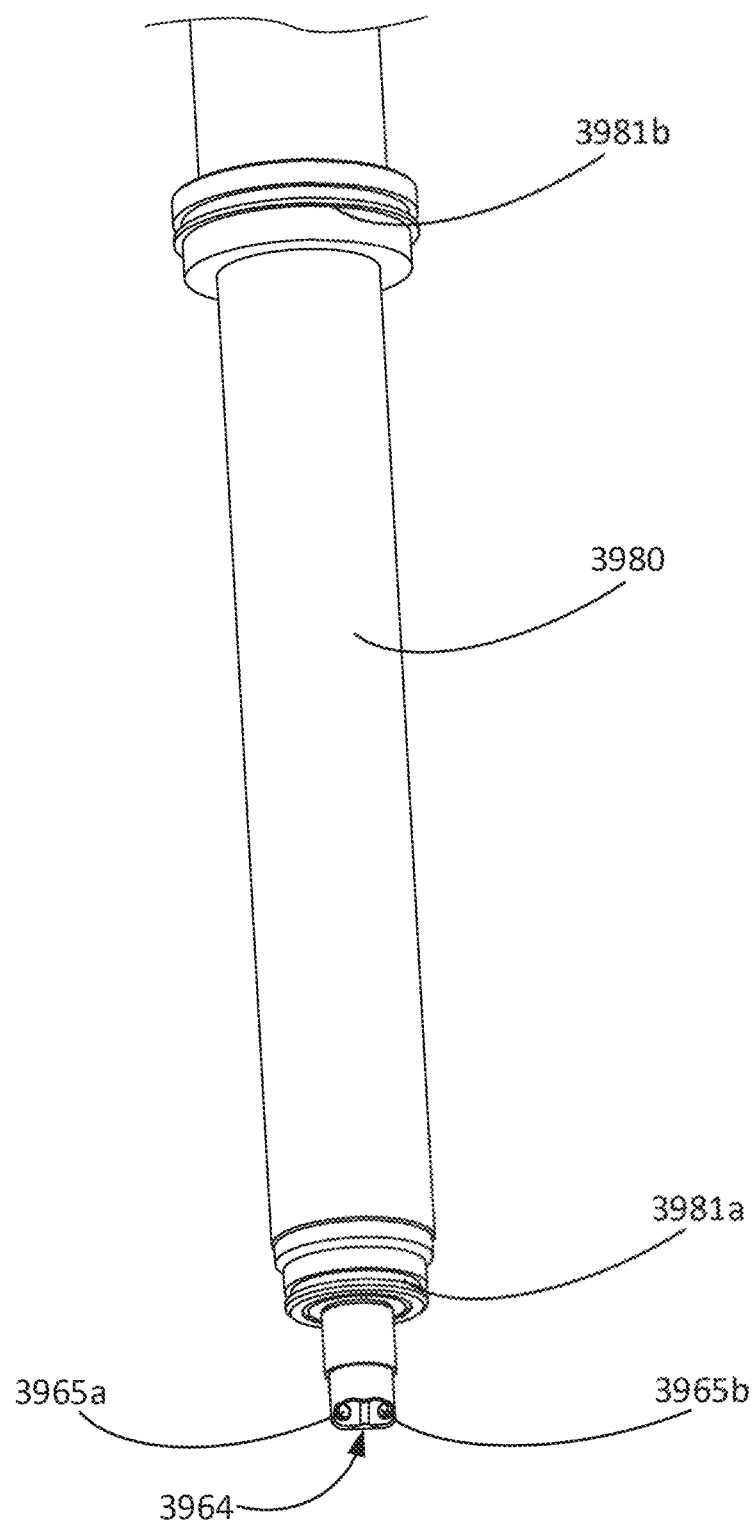

FIG. 36A includes a sleeve 3980 with a coolant jacket 3904 disposed around the sleeve 3980, while FIG. 36B depicts more detail of the sleeve 3980, including O-ring grooves 3981*a*, 3981*b*. The coolant jacket 3904 can be part of the cooling system of the engine, and not a separate coolant jacket of the RCG. Stated differently, the RCG 3960 may not require an independent coolant jacket. Rather, the sleeve 3980 can be formed of a material that has high heat conductivity (e.g., carbon steel) such that the sleeve 3980 can conduct heat away from the RCG to the coolant jacket 3904 disposed on the outside of the sleeve 3980 (which can be the part of the same cooling system built into the engine head for cooling the engine). The coolant jacket 3904 is depicted transparently in FIG. 36A, while it is absent from FIG. 36B. The coolant jacket 3904 draws heat away from the sleeve 3980, and the RCG 3960. In some embodiments, a cooling fluid can flow through the coolant jacket 3904 to maximize heat transfer from the sleeve 3980 and the RCG 3960. In some embodiments, the cooling fluid can include water, ethylene glycol, propylene, ethanol, or any combination thereof. O-rings installed on the O-ring grooves 3981*a*, 3981*b* can prevent the inflow of cooling fluid into the sleeve 3980 and the RCG 3960.

Figure 36C:
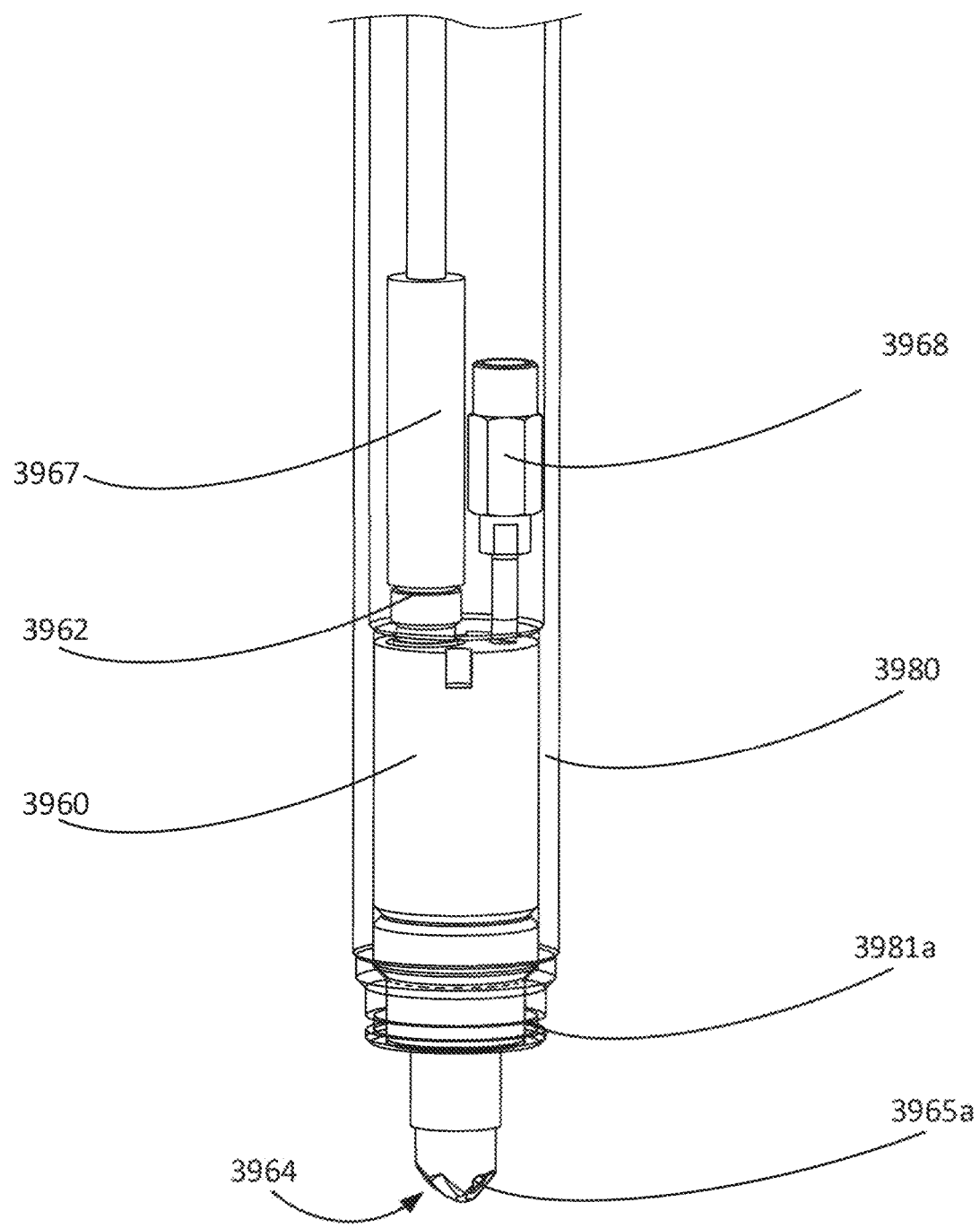

FIG. 36C shows the interior of the sleeve 3980, including the RCG 3960, the ignition device 3962, the spark plug insulator 3967, the check valve 3968, the O-ring groove 3981*a*, and the QS 3964 with QS orifice 3965*a* visible. Ignition can originate with the ignition device 3962 (e.g., spark plug) in the RCG 3960, which can ignite a fuel-air charge in the RCG 3960 that is quenched via the QS 3964 to inject RS into the MCC. The injection of the RS into the MCC can induce enhanced radical ignition, as described in the next section.

In some embodiments, the sleeve 3980 can have a diameter of at least about 1 cm, at least about 1.5 cm, at least about 2 cm, at least about 2.5 cm, at least about 3 cm, at least about 3.5 cm, at least about 4 cm, or at least about 4.5 cm. In some embodiments, the sleeve 3980 can have a diameter of no more than about 5 cm, no more than about 4.5 cm, no more than about 4 cm, no more than about 3.5 cm, no more than about 3 cm, no more than about 2.5 cm, no more than about 2 cm, or no more than about 1.5 cm. Combinations of the above-referenced diameters of the sleeve 3980 are also possible (e.g., at least about 1 cm and no more than about 5 cm or at least about 2 cm and no more than about 4 cm), inclusive of all values and ranges therebetween. In some embodiments, the sleeve 3980 can have a diameter of about 1 cm, about 1.5 cm, about 2 cm, about 2.5 cm, about 3 cm, about 3.5 cm, about 4 cm, about 4.5 cm, or about 5 cm.

Figure 36D:
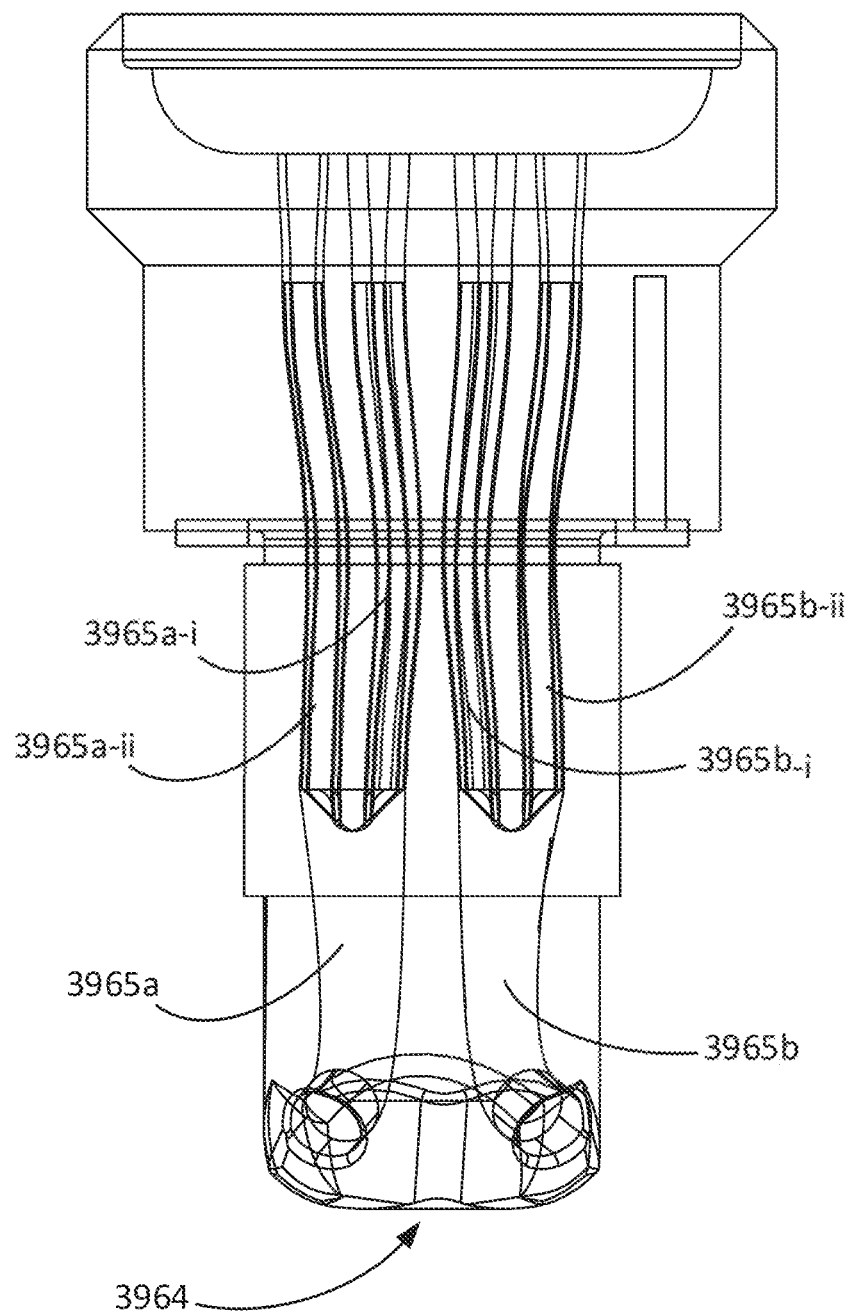
Figure 36E:
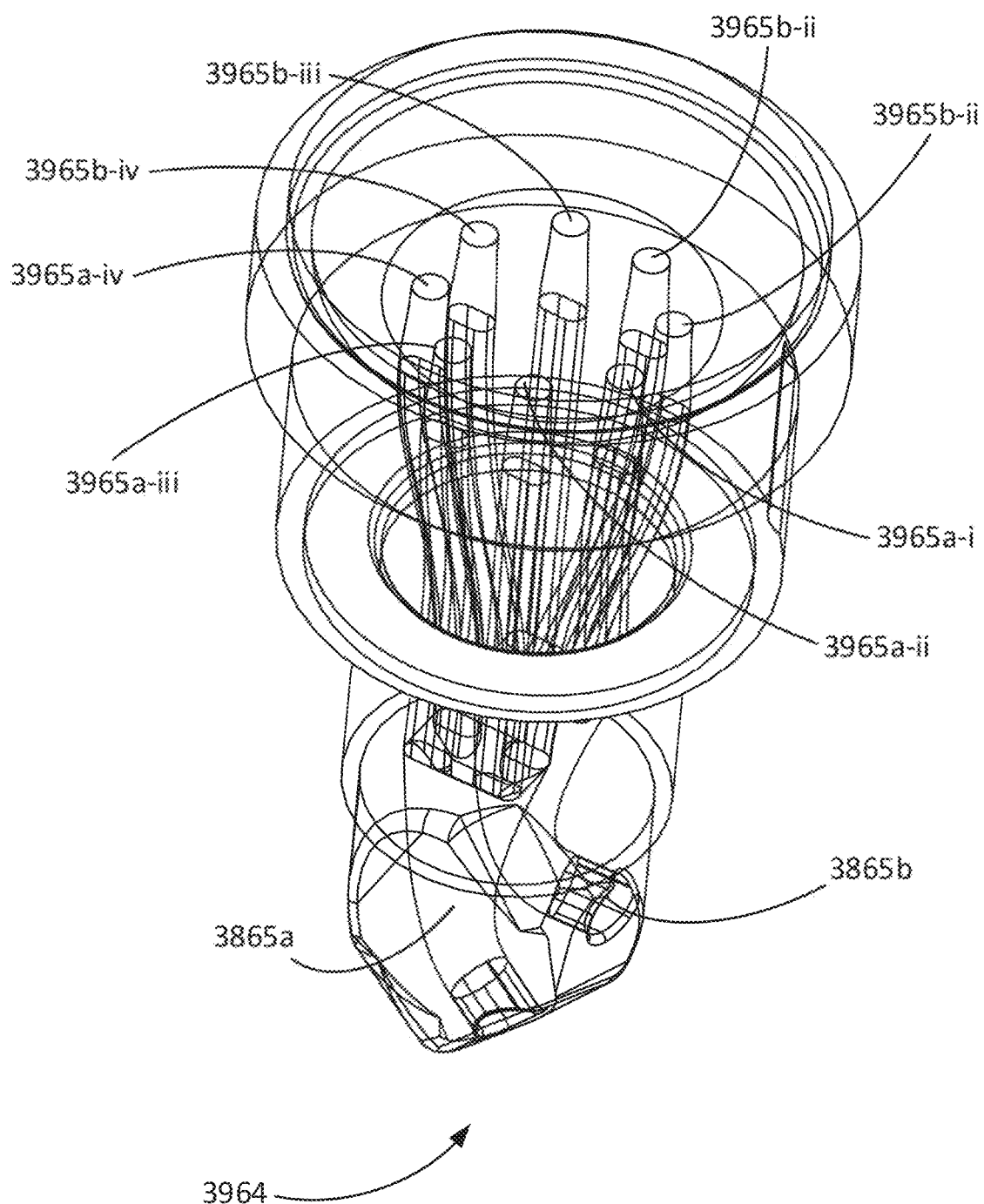
Figure 36F:
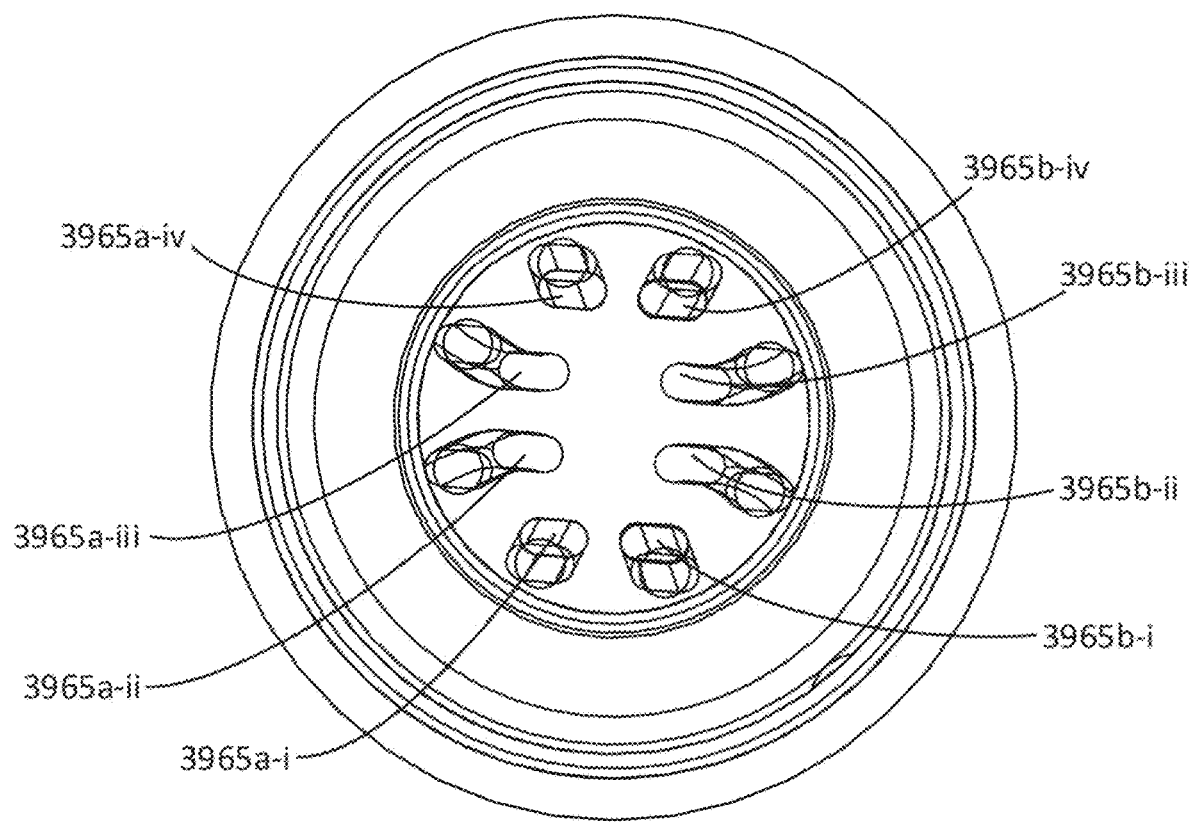

FIGS. 36D and 36E show the merger of the QS sub-orifices 3965a-i, 3965a-ii, 3965a-iii, 3965a-iv into the QS orifice 3965a and the merger of the QS sub-orifices 3965b-i, 3965b-ii, 3965b-iii, 3965b-iv into the QS orifice 3965b. FIG. 36D shows a front view facing the QS orifices 3965a, 3965b, while FIG. 36E shows an auxiliary view of the mergers. FIG. 36F shows a horizontal cross-sectional view of the QS sub-orifices 3965a-i, 3965a-ii, 3965a-iii, 3965a-iv, 3965b-i, 3965b-ii, 3965b-iii, 3965b-iv. As shown, the QS sub-orifices 3965a-i, 3965a-ii, 3965a-iii, 3965a-iv, 3965b-i, 3965b-ii, 3965b-iii, 3965b-iv have an oval cross-sectional shape. In some embodiments, the QS sub-orifices 3965a-i, 3965a-ii, 3965a-iii, 3965a-iv, 3965b-i, 3965b-ii, 3965b-iii, 3965b-iv can have a circular, elliptical, a rectangular shape, a square shape, or any other suitable shape or combinations thereof.

In some embodiments, the QS sub-orifices 3965a-i, 3965a-ii, 3965a-iii, 3965a-iv, 3965b-i, 3965b-ii, 3965b-iii, 3965b-iv can have a circular cross-section and have a cross-sectional diameter of at least about 0.5 mm, at least about 1 mm, at least about 1.5 mm, at least about 2.5 mm, at least about 3 mm, at least about 3.5 mm, at least about 4 mm, or at least about 4.5 mm. In some embodiments, the QS sub-orifices 3965a-i, 3965a-ii, 3965a-iii, 3965a-iv, 3965b-i, 3965b-ii, 3965b-iii, 3965b-iv can have a cross-sectional diameter of no more than about 5 mm, no more than about 4.5 mm, no more than about 4 mm, no more than about 3.5 mm, no more than about 3 mm, no more than about 2.5 mm, no more than about 2 mm, no more than about 1.5 mm, or no more than about 1 mm. Combinations of the above-referenced cross-sectional diameters are also possible (e.g., at least about 0.5 mm and no more than about 5 mm or at least about 2 mm and no more than about 3 mm). In some embodiments, the QS sub-orifices 3965a-i, 3965a-ii, 3965a-iii, 3965a-iv, 3965b-i, 3965b-ii, 3965b-iii, 3965b-iv can have a cross-sectional diameter of about 0.5 mm, about 1 mm, about 1.5 mm, about 2.5 mm, about 3 mm, about 3.5 mm, about 4 mm, about 4.5 mm, or about 5 mm.

Alternatively, the QS sub-orifices 3965a-i, 3965a-ii, 3965a-iii, 3965a-iv, 3965b-i, 3965b-ii, 3965b-iii, 3965b-iv have a cross-sectional area that is not circular, but their cross-sectional area can be similar to the cross-sectional area of a circular cross-section with a specified diameter. In particular, an orifice can have an oblong or non-circular cross-sectional area with a hydraulic cross-sectional area that is equivalent to the hydraulic cross-sectional area of a circular orifice with a cross-sectional diameter of 2.5 mm. In other words, the non-circular orifice can have a hydraulic cross sectional area that is equal to that of a circular orifice with a cross-sectional diameter of 2.5 mm. Such a cross-section is referred to herein as having an "equivalent cross-sectional diameter" of 2.5 mm.

In some embodiments, the QS sub-orifices 3965a-i, 3965a-ii, 3965a-iii, 3965a-iv, 3965b-i, 3965b-ii, 3965b-iii, 3965b-iv can have an equivalent cross-sectional diameter of at least about 0.5 mm, at least about 1 mm, at least about 1.5 mm, at least about 2.5 mm, at least about 3 mm, at least about 3.5 mm, at least about 4 mm, or at least about 4.5 mm. In some embodiments, the QS sub-orifices 3965a-i, 3965a-ii, 3965a-iii, 3965a-iv, 3965b-i, 3965b-ii, 3965b-iii, 3965b-iv can have an equivalent cross-sectional diameter of no more than about 5 mm, no more than about 4.5 mm, no more than about 4 mm, no more than about 3.5 mm, no more than about 3 mm, no more than about 2.5 mm, no more than about 2 mm, no more than about 1.5 mm, or no more than about 1 mm. Combinations of the above-referenced equivalent cross-sectional diameters are also possible (e.g., at least about 0.5 mm and no more than about 5 mm or at least about 2 mm and no more than about 3 mm). In some embodiments, the QS sub-orifices 3965a-i, 3965a-ii, 3965a-iii, 3965a-iv, 3965b-i, 3965b-ii, 3965b-iii, 3965b-iv can have an equivalent cross-sectional diameter of about 0.5 mm, about 1 mm, about 1.5 mm, about 2.5 mm, about 3 mm, about 3.5 mm, about 4 mm, about 4.5 mm, or about 5 mm.

In some embodiments, the QS sub-orifices 3965a-i, 3965a-ii, 3965a-iii, 3965a-iv, 3965b-i, 3965b-ii, 3965b-iii, 3965b-iv can have a cross-sectional area of at least about 0.5 mm$^2$, at least about 1 mm$^2$, at least about 2 mm$^2$, at least about 3 mm$^2$, at least about 4 mm$^2$, at least about 5 mm$^2$, at least about 6 mm$^2$, at least about 7 mm$^2$, at least about 8 mm$^2$, at least about 9 mm$^2$, at least about 10 mm$^2$, at least about 15 mm$^2$, at least about 20 mm$^2$, at least about 25 mm$^2$, at least about 30 mm$^2$, at least about 35 mm$^2$, at least about 40 mm$^2$, at least about 45 mm$^2$, at least about 50 mm$^2$, at least about 55 mm$^2$, at least about 60 mm$^2$, at least about 65 mm$^2$, at least about 70 mm$^2$, at least about 75 mm$^2$, at least about 80 mm$^2$, at least about 85 mm$^2$, at least about 90 mm$^2$, or at least about 95 mm$^2$. In some embodiments, the QS sub-orifices 3965a-i, 3965a-ii, 3965a-iii, 3965a-iv, 3965b-i, 3965b-ii, 3965b-iii, 3965b-iv can have a cross-sectional area of no more than about 100 mm$^2$, no more than about 95 mm$^2$, no more than about 90 mm$^2$, no more than about 85 mm$^2$, no more than about 80 mm$^2$, no more than about 75 mm$^2$, no more than about 70 mm$^2$, no more than about 65 mm$^2$, no more than about 60 mm$^2$, no more than about 55 mm$^2$, no more than about 50 mm$^2$, no more than about 45 mm$^2$, no more than about 30 mm$^2$, no more than about 25 mm$^2$, no more than about 20 mm$^2$, no more than about 15 mm$^2$, no more than about 10 mm$^2$, no more than about 9 mm$^2$, no more than about 8 mm$^2$, no more than about 7 mm$^2$, no more than about 6 mm$^2$, no more than about 5 mm$^2$, no more than about 4 mm$^2$, no more than about 3 mm$^2$, no more than about 2 mm$^2$, or no more than about 1 mm$^2$.

Combinations of the above-referenced cross-sectional areas are also possible (e.g., at least about 0.5 mm$^2$ and no more than about 100 mm$^2$ or at least about 5 mm$^2$ and no more than about 25 mm$^2$), inclusive of all values and ranges therebetween. In some embodiments, the QS sub-orifices 3965a-i, 3965a-ii, 3965a-iii, 3965a-iv, 3965b-i, 3965b-ii, 3965b-iii, 3965b-iv can have a cross-sectional area of about 0.5 mm$^2$, about 1 mm$^2$, about 2 mm$^2$, about 3 mm$^2$, about 4 mm$^2$, about 5 mm$^2$, about 6 mm$^2$, about 7 mm$^2$, about 8 mm$^2$, about 9 mm$^2$, about 10 mm$^2$, about 15 mm$^2$, about 20 mm$^2$, about 25 mm$^2$, about 30 mm$^2$, about 35 mm$^2$, about 40 mm², about 45 mm², about 50 mm², about 55 mm², about 60 mm², about 65 mm², about 70 mm², about 75 mm², about 80 mm², about 85 mm², about 90 mm², about 95 mm², or about 100 mm².

In some embodiments, the QS sub-orifices 3965*a-i*, 3965*a-ii*, 3965*a-iii*, 3965*a-iv* can have a combined cross-sectional area of at least about 50%, at least about 55%, at least about 60%, at least about 65%, at least about 70%, at least about 75%, at least about 80%, at least about 85%, at least about 90%, or at least about 95% of the cross-sectional area of the QS orifice 3965*a*. In some embodiments, the QS sub-orifices 3965*a-i*, 3965*a-ii*, 3965*a-iii*, 3965*a-iv* can have a combined cross-sectional area of no more than about 100%, no more than about 95%, no more than about 90%, no more than about 85%, no more than about 80%, no more than about 75%, no more than about 70%, no more than about 65%, no more than about 60%, no more than about 55% of the cross-sectional area of the QS orifice 3965*a*. Combinations of the above-referenced percentages of the combined cross sectional-area of the QS sub-orifices 3965*a-i*, 3965*a-ii*, 3965*a-iii*, 3965*a-iv* compared to the QS orifice 3965*a* are also possible (e.g., at least about 50% and no more than about 100% or at least about 60% and no more than about 80%), inclusive of all values and ranges therebetween. In some embodiments, the QS sub-orifices 3965*a-i*, 3965*a-ii*, 3965*a-iii*, 3965*a-iv* can have a combined cross-sectional area of about 50%, about 55%, about 60%, about 65%, about 70%, about 75%, about 80%, about 85%, about 90%, about 95%, or about 100% of the cross-sectional area of the QS orifice 3965*a*.

In some embodiments, the QS sub-orifices 3965*b-i*, 3965*b-ii*, 3965*b-iii*, 3965*b-iv* can have a combined cross-sectional area of at least about 50%, at least about 55%, at least about 60%, at least about 65%, at least about 70%, at least about 75%, at least about 80%, at least about 85%, at least about 90%, or at least about 95% of the cross-sectional area of the QS orifice 3965*b*. In some embodiments, the QS sub-orifices 3965*b-i*, 3965*b-ii*, 3965*b-iii*, 3965*b-iv* can have a combined cross-sectional area of no more than about 100%, no more than about 95%, no more than about 90%, no more than about 85%, no more than about 80%, no more than about 75%, no more than about 70%, no more than about 65%, no more than about 60%, no more than about 55% of the cross-sectional area of the QS orifice 3965*b*. Combinations of the above-referenced percentages of the combined cross sectional-area of the QS sub-orifices 3965*b-i*, 3965*b-ii*, 3965*b-iii*, 3965*b-iv* compared to the QS orifice 3965*b* are also possible (e.g., at least about 50% and no more than about 100% or at least about 60% and no more than about 80%), inclusive of all values and ranges therebetween. In some embodiments, the QS sub-orifices 3965*b-i*, 3965*b-ii*, 3965*b-iii*, 3965*b-iv* can have a combined cross-sectional area of about 50%, about 55%, about 60%, about 65%, about 70%, about 75%, about 80%, about 85%, about 90%, about 95%, or about 100% of the cross-sectional area of the QS orifice 3965*b*.

Figure 36G:
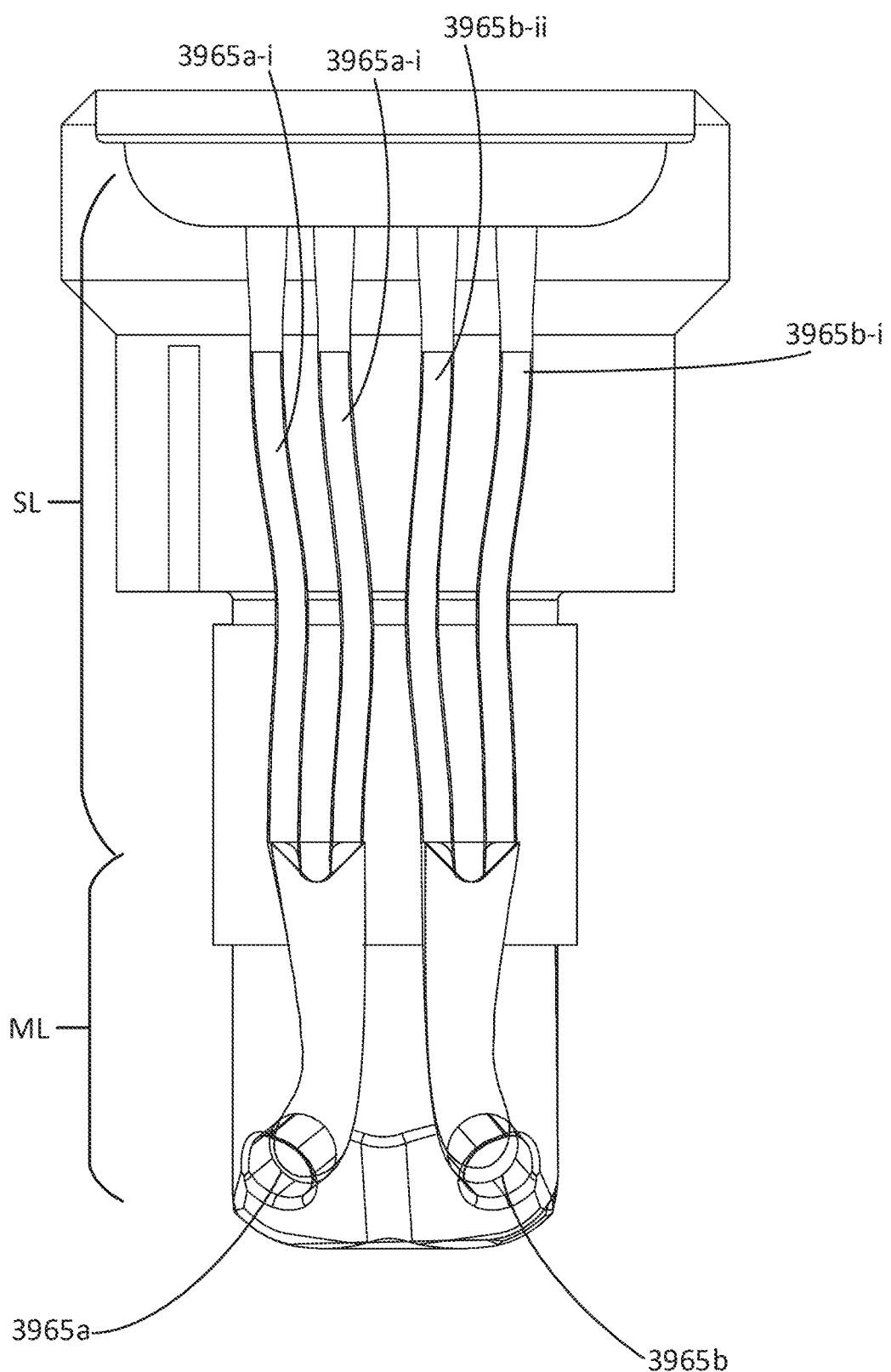

FIG. 36G shows a vertical cross-section of the QS orifices 3965*a*, 3965*b* with the QS sub-orifices 3965*a-i*, 3965*a-ii*, 3965*b-i*, and 3965*b-ii* visible. As shown, the QS sub-orifices 3965*a-i*, 3965*a-ii*, 3965*a-iii*, 3965*a-iv*, 3965*b-i*, 3965*b-ii*, 3965*b-iii*, 3965*b-iv* extend along a separated length SL of the QS 3964 before merging into the QS orifices 3965*a*, 3965*b*. The QS orifices 3965*a*, 3965*b* extend along a merged length ML of the QS 3964. The separated length SL and the merged length ML are vertical distances, rather than actual lengths of the QS sub-orifices 3965*a-i*, 3965*a-ii*, 3965*a-iii*, 3965*a-iv*, 3965*b-i*, 3965*b-ii*, 3965*b-iii*, 3965*b-iv* and the QS orifices 3965*a*, 3965*b*. In other words, the QS sub-orifices 3965*a-i*, 3965*a-ii*, 3965*a-iii*, 3965*a-iv*, 3965*b-i*, 3965*b-ii*, 3965*b-iii*, 3965*b-iv* and the QS orifices 3965*a*, 3965*b* can follow a tortuous path such that their actual path lengths are greater than the separated length SL and the merged length ML.

In some embodiments, the separated length SL can be at least about 10 mm, at least about 15 mm, at least about 20 mm, at least about 25 mm, at least about 30 mm, at least about 35 mm, at least about 40 mm, at least about 50 mm, at least about 55 mm, at least about 60 mm, at least about 65 mm, at least about 70 mm, or at least about 75 mm. In some embodiments, the separated length SL can be less than about 75 mm, less than about 70 mm, less than about 65 mm, less than about 60 mm, less than about 55 mm, less than about 50 mm, less than about 45 mm, less than about 40 mm, less than about 35 mm, less than about 30 mm, less than about 25 mm, less than about 20 mm, less than about 15 mm, or less than about 10 mm.

Combinations of the above-referenced values of the separated length SL are also possible (e.g., at least about 10 mm and no more than about 50 mm or at least about 20 mm and no more than about 40 mm), inclusive of all values and ranges therebetween. In some embodiments, the separated length SL can be about 10 mm, about 15 mm, about 20 mm, about 25 mm, about 30 mm, about 35 mm, about 40 mm, about 45 mm, about 50 mm, about 55 mm, about 60 mm, about 65 mm, about 70 mm, or about 75 mm.

In embodiments described herein, the cross-sectional diameters (or equivalent cross-sectional diameters) and the lengths of the sub-orifices can be selected to achieve a desired L/D ratio, as described above with reference to FIG. 7. In particular, the cross-sectional diameters of the sub-orifices and the separated lengths SL can be selected to achieve predetermined L/D ratio suitable for quenching. In some embodiments, the L/D ratio of the sub-orifices can be greater than about 3, greater than about 3.5, greater than about 4, greater than about 4.5, greater than about 5, greater than about 10, greater than 15, including all values and ranges in-between.

In some embodiments, the merged length ML can be at least about 15 mm, at least about 16 mm, at least about 17 mm, at least about 18 mm, at least about 19 mm, at least about 20 mm, at least about 21 mm, at least about 22 mm, at least about 23 mm, at least about 24 mm, at least about 25 mm, at least about 26 mm, at least about 27 mm, at least about 28 mm, at least about 29 mm, at least about 30 mm, at least about 31 mm, at least about 32 mm, at least about 33 mm, at least about 34 mm, at least about 35 mm, at least about 36 mm, at least about 37 mm, at least about 38 mm, at least about 39 mm, at least about 40 mm, at least about 41 mm, at least about 42 mm, at least about 43 mm, or at least about 44 mm. In some embodiments, the merged length ML can be no more than about 45 mm, no more than about 44 mm, no more than about 43 mm, no more than about 42 mm, no more than about 41 mm, no more than about 40 mm, no more than about 39 mm, no more than about 38 mm, no more than about 37 mm, no more than about 36 mm, no more than about 35 mm, no more than about 34 mm, no more than about 33 mm, no more than about 32 mm, no more than about 31 mm, no more than about 30 mm, no more than about 29 mm, no more than about 28 mm, no more than about 27 mm, no more than about 26 mm, no more than about 25 mm, no more than about 24 mm, no more than about 23 mm, no more than about 22 mm, no more than about 21 mm, no more than about 20 mm, no more than about 19 mm, no more than about 18 mm, no more than about 17 mm, or no more than about 16 mm.

Combinations of the above-referenced values of the merged length ML are also possible (e.g., at least about 15 mm and no more than about 45 mm or at least about 20 mm and no more than about 30 mm), inclusive of all values and ranges therebetween. In some embodiments, the merged length ML can be about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 41 mm, about 42 mm, about 43 mm, about 44 mm, or about 45 mm.

In some embodiments, the number of or cross-sectional diameter (or total cross-sectional diameter) of the sub-orifices and/or other parameters of the RCG 3760, can be selected based on engine type. For example, the number of and/or cross-sectional diameter (or total cross-sectional diameter) of the sub-orifices or a volume of the RCG 3760 can be selected based on a size, shape, volume, or other geometric property of the engine, the engine head, the MCC, etc. In an example embodiment, for a Worthington UTC engine compared to a GMV engine, a larger RCG volume may be required. Alternatively, multiple RCGs can be used to achieve a larger RCG volume.

In some embodiments, the QS sub-orifices 3965*a-i*, 3965*a-ii*, 3965*a-iii*, 3965*a-iv*, 3965*b-i*, 3965*b-ii*, 3965*b-iii*, 3965*b-iv* and/or the QS orifices 3965*a*, 3965*b* can have a tortuosity, such that the path length a volume of gas follows when passing through a geometric center of the QS sub-orifices 3965*a-i*, 3965*a-ii*, 3965*a-iii*, 3965*a-iv*, 3965*b-i*, 3965*b-ii*, 3965*b-iii*, 3965*b-iv* and the QS orifices 3965*a*, 3965*b* is greater than the separated length SL and the merged length ML. Tortuosity of the QS sub-orifices ($\tau_{SO}$) 3965*a-i*, 3965*a-ii*, 3965*a-iii*, 3965*a-iv*, 3965*b-i*, 3965*b-ii*, 3965*b-iii*, 3965*b-iv* is defined as follows.

$$\tau_{so} = \frac{PL_{so}}{SL}$$

Where $PL_{SO}$ is the path length a volume of gas follows when passing through a geometric center of the QS sub-orifices 3965*a-i*, 3965*a-ii*, 3965*a-iii*, 3965*a-iv*, 3965*b-i*, 3965*b-ii*, 3965*b-iii*, 3965*b-iv*

Tortuosity of the QS orifices (To) 3965*a*, 3965*b* is defined as follows.

$$\tau_{so} = \frac{PL_o}{ML}$$

Where $PL_O$ is the path length a volume of gas follows when passing through a geometric center of the QS orifices 3965*a*, 3965*b*.

In some embodiments, $\tau_{SO}$ and/or $\tau_O$ can be at least about 1, at least about 1.1, at least about 1.2, at least about 1.3, at least about 1.4, at least about 1.5, at least about 1.6, at least about 1.7, at least about 1.8, at least about 1.9, at least about 2, at least about 2.5, at least about 3, at least about 3.5, at least about 4, or at least about 4.5. In some embodiments, iso and/or to can be no more than about 5, no more than about 4.5, no more than about 4, no more than about 3.5, no more than about 3, no more than about 2.5, no more than about 2, no more than about 1.9, no more than about 1.8, no more than about 1.7, no more than about 1.6, no more than about 1.5, no more than about 1.4, no more than about 1.3, no more than about 1.2, or no more than about 1.1. Combinations of the above-referenced tortuosities are also possible (e.g., at least about 1 and no more than about 5 or at least about 1.5 and no more than about 2.5), inclusive of all values and ranges therebetween. In some embodiments, iso and/or to can be about 1, about 1.1, about 1.2, about 1.3, about 1.4, about 1.5, about 1.6, about 1.7, about 1.8, about 1.9, about 2, about 2.5, about 3, about 3.5, about 4, about 4.5, or about 5.

In some embodiments, an entry point of the QS orifices 3965*a*, 3965*b* (i.e., a point immediately past where the QS sub-orifices 3965*a-i*, 3965*a-ii*, 3965*a-iii*, 3965*a-iv*, 3965*b-i*, 3965*b-ii*, 3965*b-iii*, 3965*b-iv* merge into the QS orifices 3965*a*, 3965*b*) can have a cross-sectional area larger than a point at which the QS orifices 3965*a*, 3965*b* feed into the MCC (referred to herein as the "exit point" of the QS orifices 3965*a*, 3965*b*). In other words, the cross-sectional area of the QS orifices 3965*a*, 3965*b* can shrink along the merged length ML. In some embodiments, a ratio of the cross-sectional area of the entry point of the QS orifices 3965*a*, 3965*b* to the cross-sectional area of the exit point of the QS orifices 3965*a*, 3965*b* can be about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, or about 5.0, inclusive of all values and ranges therebetween.

In some embodiments, the cross-sectional area of the entry point of the QS orifices 3965*a*, 3965*b* can be at least about 20 mm$^2$, at least about 21 mm$^2$, at least about 22 mm$^2$, at least about 23 mm$^2$, at least about 24 mm$^2$, at least about 25 mm$^2$, at least about 26 mm$^2$, at least about 27 mm$^2$, at least about 28 mm$^2$, at least about 29 mm$^2$, at least about 30 mm$^2$, at least about 31 mm$^2$, at least about 32 mm$^2$, at least about 33 mm$^2$, at least about 34 mm$^2$, at least about 35 mm$^2$, at least about 36 mm$^2$, at least about 37 mm$^2$, at least about 38 mm$^2$, at least about 39 mm$^2$, at least about 40 mm$^2$, at least about 41 mm$^2$, at least about 42 mm$^2$, at least about 43 mm$^2$, at least about 44 mm$^2$, at least about 45 mm$^2$, at least about 46 mm$^2$, at least about 47 mm$^2$, at least about 48 mm$^2$, or at least about 49 mm$^2$. In some embodiments, the cross-sectional area of the entry point of the QS orifices 3965*a*, 3965*b* can be no more than about 50 mm$^2$, no more than about 49 mm$^2$, no more than about 48 mm$^2$, no more than about 47 mm$^2$, no more than about 46 mm$^2$, no more than about 45 mm$^2$, no more than about 44 mm$^2$, no more than about 43 mm$^2$, no more than about 42 mm$^2$, no more than about 41 mm$^2$, no more than about 40 mm$^2$, no more than about 39 mm$^2$, no more than about 38 mm$^2$ no more than about 37 mm$^2$, no more than about 36 mm$^2$, no more than about 35 mm$^2$, no more than about 34 mm$^2$, no more than about 33 mm$^2$, no more than about 32 mm$^2$, no more than about 310 mm$^2$, no more than about 30 mm$^2$, no more than about 29 mm$^2$, no more than about 28 mm$^2$, no more than about 27 mm$^2$, no more than about 26 mm$^2$, no more than about 25 mm$^2$, no more than about 24 mm$^2$, no more than about 23 mm$^2$, no more than about 22 mm$^2$, or no more than about 21 mm$^2$.

Combinations of the above-referenced cross-sectional areas of the entry point of the QS orifices 3965*a*, 3965*b* are also possible (e.g., at least about 20 mm$^2$ and no more than about 50 mm² or at least about 25 mm² and no more than about 45 mm²), inclusive of all values and ranges therebetween. In some embodiments, the cross-sectional area of the entry point of the QS orifices 3965a, 3965b can be about 20 mm², about 21 mm², about 22 mm², about 23 mm², about 24 mm², about 25 mm², about 26 mm², about 27 mm², about 28 mm², about 29 mm², about 30 mm², about 31 mm², about 32 mm², about 33 mm², about 34 mm², about 35 mm², about 36 mm², about 37 mm², about 38 mm², about 39 mm², about 40 mm², about 41 mm², about 42 mm², about 43 mm², about 44 mm², about 45 mm², about 46 mm², about 47 mm², about 48 mm², about 49 mm², or about 50 mm².

In some embodiments, the cross-sectional area of the exit point of the QS orifices 3965a, 3965b can be at least about 10 mm², at least about 11 mm², at least about 12 mm², at least about 13 mm², at least about 14 mm², at least about 15 mm², at least about 16 mm², at least about 17 mm², at least about 18 mm², at least about 19 mm², at least about 20 mm², at least about 21 mm², at least about 22 mm², at least about 23 mm², at least about 24 mm², at least about 25 mm², at least about 26 mm², at least about 27 mm², at least about 28 mm², or at least about 29 mm². In some embodiments, the cross-sectional area of the exit point of the QS orifices 3965a, 3965b can be no more than about 30 mm², no more than about 29 mm², no more than about 28 mm², no more than about 27 mm², no more than about 26 mm², no more than about 25 mm², no more than about 24 mm², no more than about 23 mm², no more than about 22 mm², no more than about 21 mm², no more than about 20 mm², no more than about 19 mm², no more than about 18 mm², no more than about 17 mm², no more than about 16 mm², no more than about 15 mm², no more than about 14 mm², no more than about 13 mm², no more than about 12 mm², or no more than about 11 mm².

Combinations of the above-referenced cross-sectional areas of the exit point of the QS orifices 3965a, 3965b are also possible (e.g., at least about 10 mm² and no more than about 30 mm² or at least about 15 mm² and no more than about 25 mm²), inclusive of all values and ranges therebetween. In some embodiments, the cross-sectional area of the exit point of the QS orifices 3965a, 3965b can be about 10 mm², about 11 mm², about 12 mm², about 13 mm², about 14 mm², about 15 mm², about 16 mm², about 17 mm², about 18 mm², about 19 mm², about 20 mm², about 21 mm², about 22 mm², about 23 mm², about 24 mm², about 25 mm², about 26 mm², about 27 mm², about 28 mm², about 29 mm², or about 30 mm².

Figure 36H:
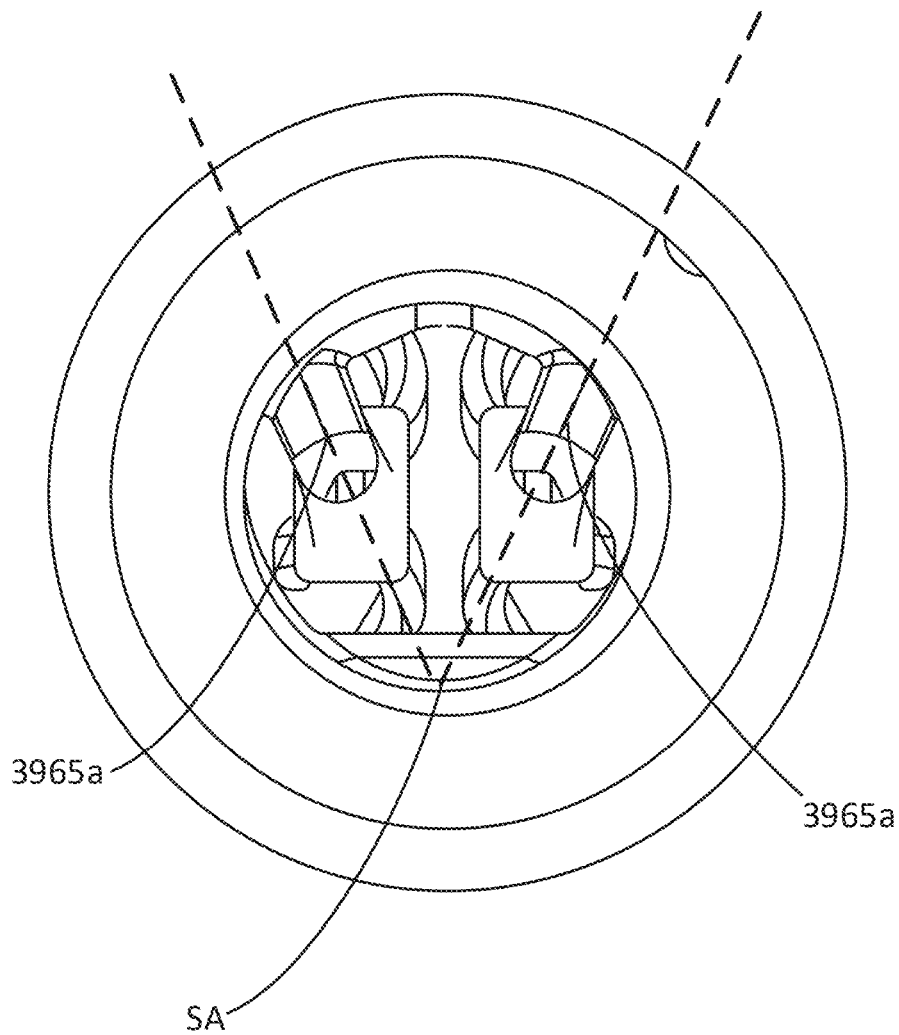

FIG. 36H shows a horizontal cross section of the QS orifices 3965a, 3965b from below the QS 3964. As shown, the exits the QS orifices 3965a, 3965b at a characteristic separation angle SA. In other words, the QS orifice 3965a sprays at an angle relative to the QS orifice 3965b. In some embodiments, the separation angle SA can be at least about 10 degrees, at least about 15 degrees, at least about 20 degrees, at least about 25 degrees, at least about 30 degrees, at least about 35 degrees, at least about 40 degrees, at least about 45 degrees, at least about 50 degrees, at least about 55 degrees, at least about 60 degrees, at least about 65 degrees, at least about 70 degrees, at least about 75 degrees, at least about 80 degrees, at least about 85 degrees, at least about 90 degrees, at least about 95 degrees, at least about 100 degrees, at least about 105 degrees, at least about 110 degrees, at least about 115 degrees, at least about 120 degrees, at least about 125 degrees, at least about 130 degrees, at least about 135 degrees, at least about 140 degrees, at least about 145 degrees, at least about 150 degrees, at least about 155 degrees, at least about 160 degrees, at least about 165 degrees, at least about 170 degrees, or at least about 175 degrees. In some embodiments, the separation angle SA can be no more than about 180 degrees, no more than about 175 degrees, no more than about 170 degrees, no more than about 165 degrees, no more than about 160 degrees, no more than about 155 degrees, no more than about 150 degrees, no more than about 145 degrees, no more than about 140 degrees, no more than about 135 degrees, no more than about 130 degrees, no more than about 125 degrees, no more than about 120 degrees, no more than about 115 degrees, no more than about 110 degrees, no more than about 105 degrees, no more than about 100 degrees, no more than about 95 degrees, no more than about 90 degrees, no more than about 85 degrees, no more than about 80 degrees, no more than about 75 degrees, no more than about 70 degrees, no more than about 65 degrees, no more than about 60 degrees, no more than about 55 degrees, no more than about 50 degrees, no more than about 45 degrees, no more than about 40 degrees, no more than about 35 degrees, no more than about 30 degrees, no more than about 25 degrees, no more than about 20 degrees, or no more than about 15 degrees.

The separation angle SA can be adjusted to accomplish different distributions of RS jets into the MCC of an engine, e.g., to fully or more evenly distribute the RS in the MCC. Depending on the number of orifices 3965a, 3965b and the location of the RCG in the engine head, different separation angles SL between the orifices can be used. For example, while two orifices 3965a, 3965b are depicted in FIGS. 36A-36H, it can be appreciated that any number of orifices 3965a, 3965b can be used. When more orifices are used, the angle between the orifices can be smaller than when two orifices are used to achieve even distribution of RS. In some embodiments, multiple RCGs mounted or installed at different locations on an engine head can be used to achieve more even distribution of RS. Such distribution of RS is further described below with reference to FIGS. 37A-37G.

In addition to the separation angle, the orifices 3965a, 3965b can be angled relative to a centerline or longitudinal axis of the RCG 3960 when exiting into the MCC. This angle can also be selected to enable more even distribution of RS. In particular, as described above with reference to FIG. 4C, the exit angle of the orifices 3965a, 3965b of a RCG can be between about 0 and about 40 degrees (including all values and subranges in-between), or specifically about 20 degrees.

In some embodiments, a sleeve may be designed to extend partially down the length of the head, e.g., in instances where larger or thicker heads are used in an engine such as with uniflow engines. For example, uniflow engines have exhaust valves and flow paths in the engine head, which requires the head to be larger to accommodate the complexity of the components within the head. In such instances, given the thickness of the head, it may not be practical to have a sleeve extend the full length of the head, e.g., due to the geometries and placements of the openings in the head. Accordingly, having a sleeve that has a first end coupled to the top of the head and a second end that extends partially down the length of the head but is otherwise free-floating can be advantageous to accommodate installation of a RCG within the engine.

Figure 40A:
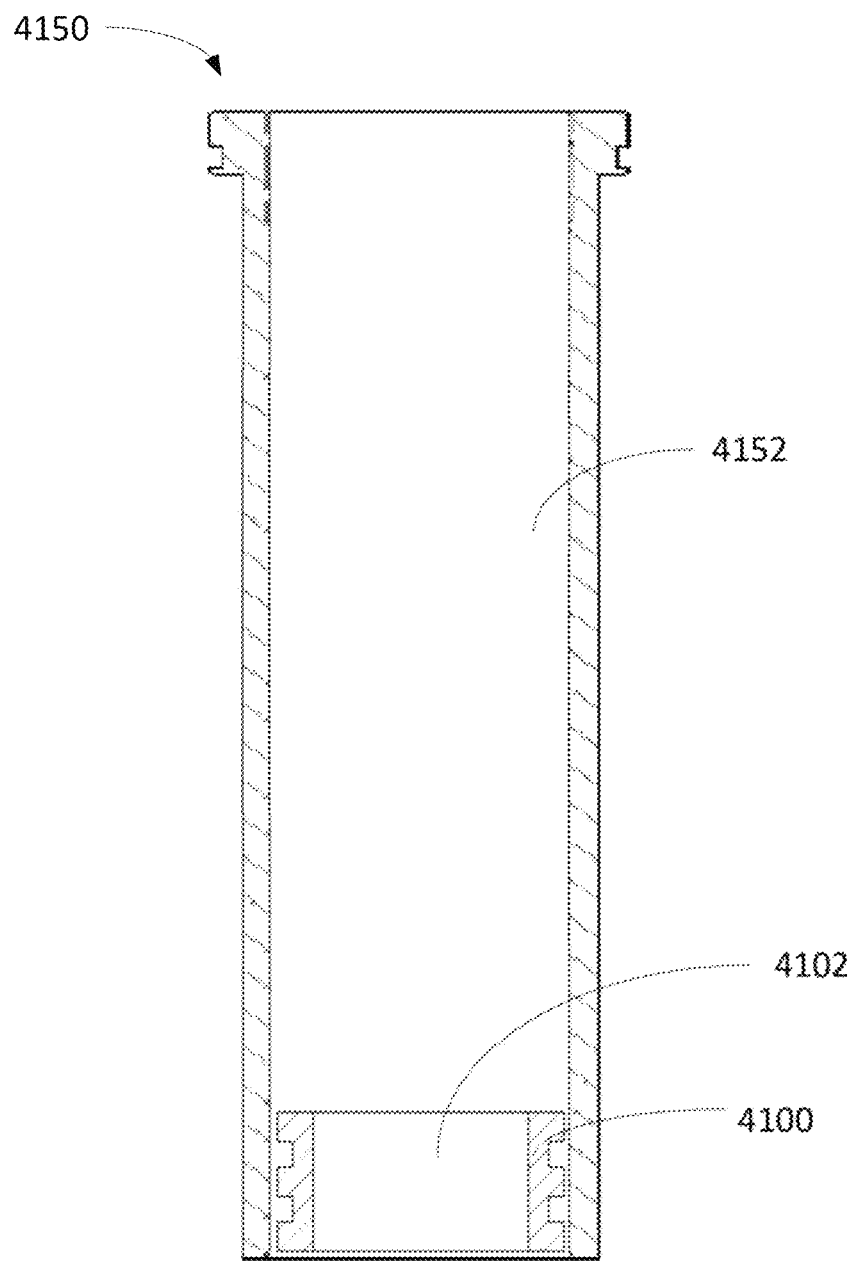
FIG. 40A shows an assembly including the connector of FIGS. 38A-38C and sleeve of FIGS. 39A-39B.
Figure 40B:
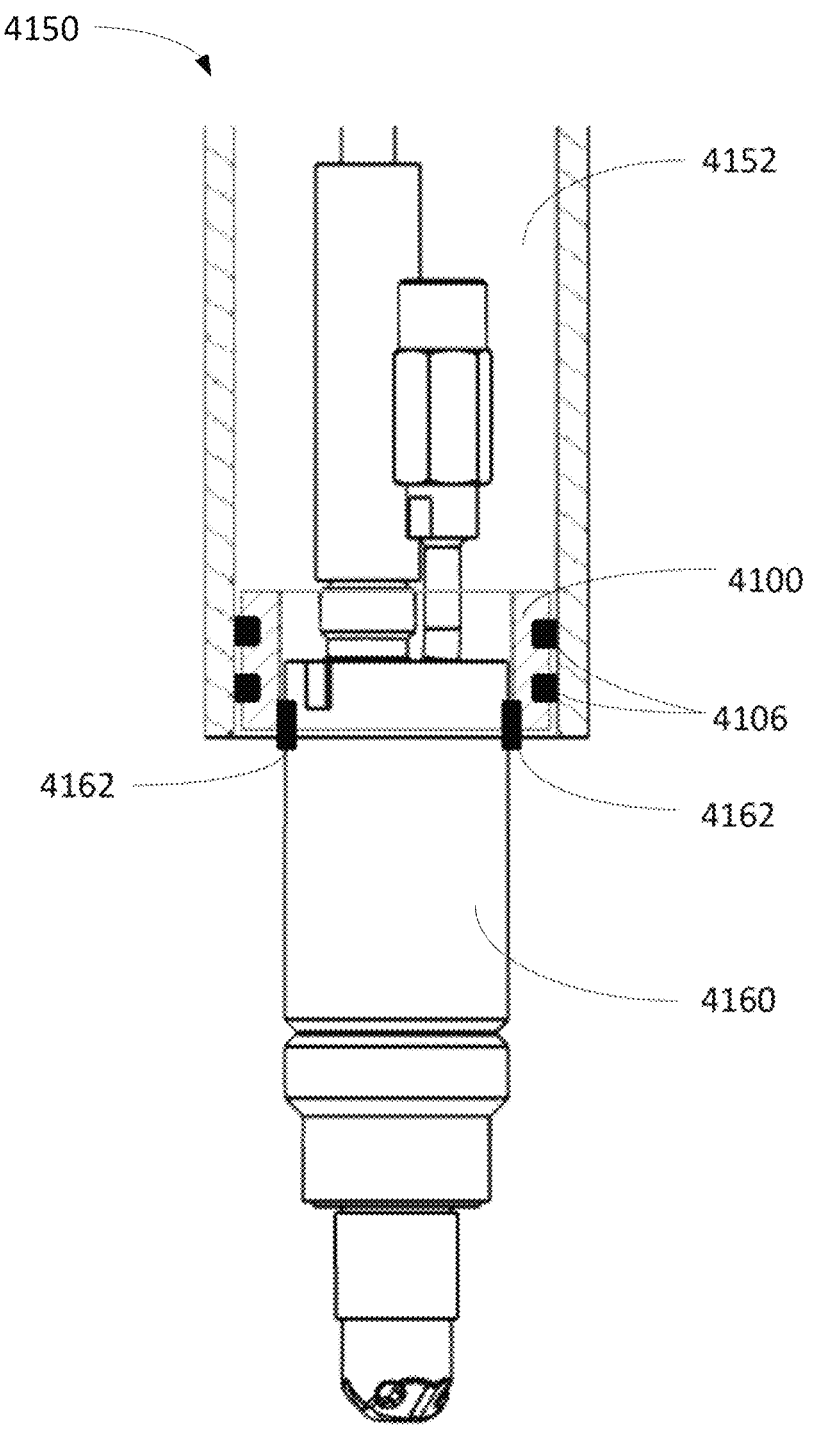
FIG. 40B shows an assembly including the connector of FIGS. 38A-38C and sleeve of FIGS. 39A-39B, with a RCG installed within the connector, according to embodiments.

FIGS. 38A-40B depict an example of using a sleeve 4150 that is designed to extend a partial length into a head of an engine. The sleeve 4150 can be functionally and/or structurally similar to other sleeves described herein, but have one end that is designed to float within a space in the head. The sleeve 4150 can be used with an intermediate component, such as a connector implemented as a collar 4100. The collar 4100 can be configured to provide an interface between the sleeve 4150 and a RCG 4160 (see FIG. 40B). For example, as shown in FIGS. 40A-40B, the collar 4100 can sit within a lumen or channel 4152 of the sleeve 4150 near a bottom end of the sleeve 4150. The collar 4100 can be held to the sleeve via friction fit, e.g., via O-rings 4106 that can be disposed within annular ridges 4104 on an outside surface of the collar 4100. The collar 4100, as depicted in FIGS. 38B and 38C, can include a central lumen or channel that can be configured to receive the RCG 4160.

In use, the collar 4100 can be directly attached to a top portion of a RCG 4160, with a bottom portion of the RCG 4160 extending below the collar 4100, as shown in FIG. 40B. To install the RCG 4160, the sleeve 4150 can initially be placed within a hole in the engine head. The collar 4100 with RCG 4160 can then be slid down through the channel 4152 of the sleeve 4150 and positioned such that the collar is near a bottom end of the sleeve 4150. The RCG 4160, with the collar 4100 so positioned, would extend below a bottom of the collar 4100 and the sleeve 4150. The bottom end of the RCG 4160 can then be attached (e.g., screwed in or otherwise attached) into an opening at the bottom of the head such that the RCGv is fluidically coupled to the MCC of the engine. The RCG 4160 can be coupled to the collar 4100 prior to being placed within the sleeve 4150. In some embodiments, the RCG 4160 an be welded to the collar 4100, e.g., via a ring 4162 around a bottom of the collar 4100.

In some embodiments, by having the RCG 4160 extend out of the sleeve 4150 (e.g., extend below a bottom of the sleeve 4150), the RCG 4160 can be configured to sit directly within a coolant jacket or passages within the engine head. This can advantageously improve the cooling effects of the jacket on the RCG 4160, as no sleeve would then reduce any conduction of heat between the jacket and the RCG 4160.

Processes

Disclosed herein are methods of controlling timing of RS generation (by an RCG and/or M-Cs) and transfer of such RS into a MCC of an internal combustion engine during its combustion cycle. Different timing of generation, storage, and transfer of RS into the MCC can be achieve by varying factors such as, for example, RCG spark timing, RCG ER, and RCG QS designs.

Figure 3:
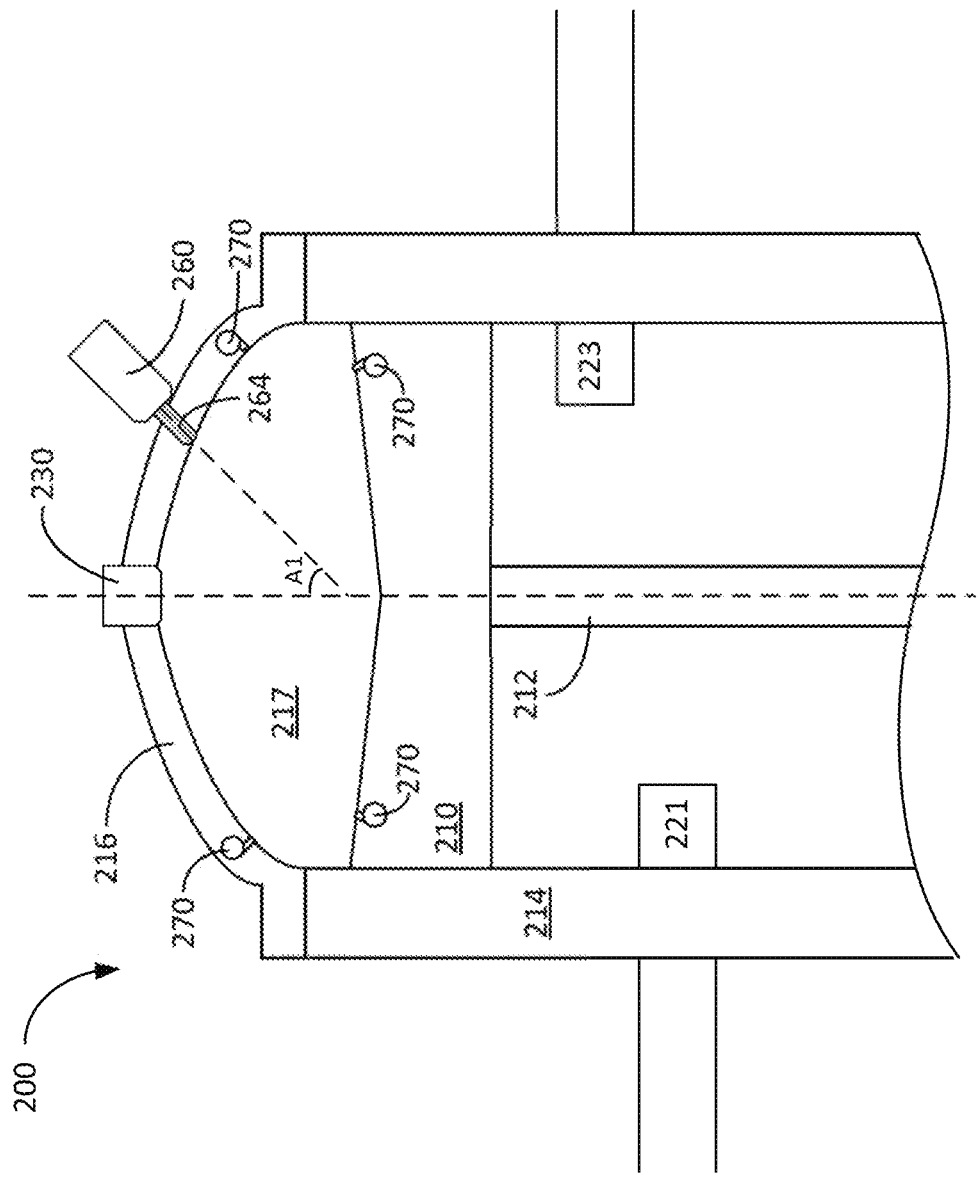
FIG. 3 is a diagram of a cross-section view of an example internal combustion engine cylinder, of the type commonly known as a "two-stroke" or "two cycle" engine, according to embodiments.

FIG. 3 depicts an example of a two-stroke internal combustion engine 200 including an RCG 260 and a set of M-Cs 270. While a single RCG 260 and a plurality of M-Cs 270 are depicted in FIG. 3, it can be appreciated that any number of RCGs 260 and/or M-Cs 270 can be used in embodiments described herein. The engine 200 can include one or more components that are structurally and/or functionally similar to those of engine 100 depicted in FIG. 2. For example, the engine 200 can include a piston 210 attached to a rod 212 that is designed to reciprocate in a cylinder 214. The engine 200 can include an air inlet 221 and an exhaust outlet 223. The engine 200 can include a head 214 to which the RCG 20 is mounted and into which one or more M-Cs 270 can be integrated. The head 214, cylinder 214, and piston 210 can define a MCC 217. The engine 200 can include a fuel injector or valve 230 (or other control device) that delivers fuel (e.g., from a fuel source) into the MCC 217.

The RCG 260 can be mounted to the head 216, e.g., via a screw-in connection and/or flange-type arrangement. In some embodiments, RCG 260 can be incorporated into an existing internal combustion engine, e.g., at a location of a PCC or other engine component (e.g. spark plug) that the RCG 260 replaces. For example, the RCG 260 can be incorporated into an Ajax engine or a GMV engine at a PCC or spark plug site (e.g., via a screw-fit or flanged connection). In such engines, the PCC may be angled with respect to a central axis of the engine. For example, the PCC nozzle can be oriented at an angle of approximately 45 to 70 degrees from a centerline of an Ajax engine, and the PCC nozzle can be at an angle of approximately 70 degrees from a centerline of a GMV engine. Accordingly, the RCG 260, when installed in such engines, may be at similar angles with respect to a centerline of the engine, e.g., as illustrated using angle A1 in FIG. 3. In some embodiments (e.g., with an Ajax or GMV engine), A1 can be about 0 to about 70 degrees, including all subranges and values in-between. In view of angle A1, the RCG 260 can include QS 264 with orifices that are angled with respect to angle A1 by an angle A2, as depicted in FIG. 4C. Angle A2 can enable more even (e.g., more volumetric) distribution of RS generated by the RCG 260 during an ERI process. In some embodiments (e.g., with an Ajax or GMV engine), angle A2 can be between about 0 to about 40 degrees (including all values and subranges in-between), or specifically about 20 degrees, such that a jet of RS exiting the QS 264 can be delivered across the middle of the CV of the MCC 217 (e.g., to the middle and periphery of the CV) instead of toward the piston face.

The M-Cs 270 can be incorporated into a periphery of the head 216 and/or a periphery of the piston 210. Alternatively, in some embodiments, the engine 200 may not include M-Cs 270, or the M-Cs 270 may be incorporated into the periphery of the head 216 and not the periphery of the piston 210, and vice versa.

Collectively, the RCG 260 and the M-Cs 270 can provide RS to the MCC 217 for inducing ERI, as further described with reference to FIGS. 4A-4D.

While large bore engines such as Ajax and GMV engines are described herein, it can be appreciated that devices and processes described herein can be implemented in a range of engine types, including, for example, everything from smaller engines designed for weed whackers/trimmers and chain saws to larger engines designed for maritime vessels. Such engines can be liquid-fueled and/or natural gas fueled engines.

Systems, devices, and methods described herein, including engines 100 and 200, can implement ERI processes. The ERI processes can include early ERI sub-processes and main ERI sub-processes. These sub-processes are described below, with reference to Table 1, which includes a detailed account of the different events during an ERI process.

Figure 13:
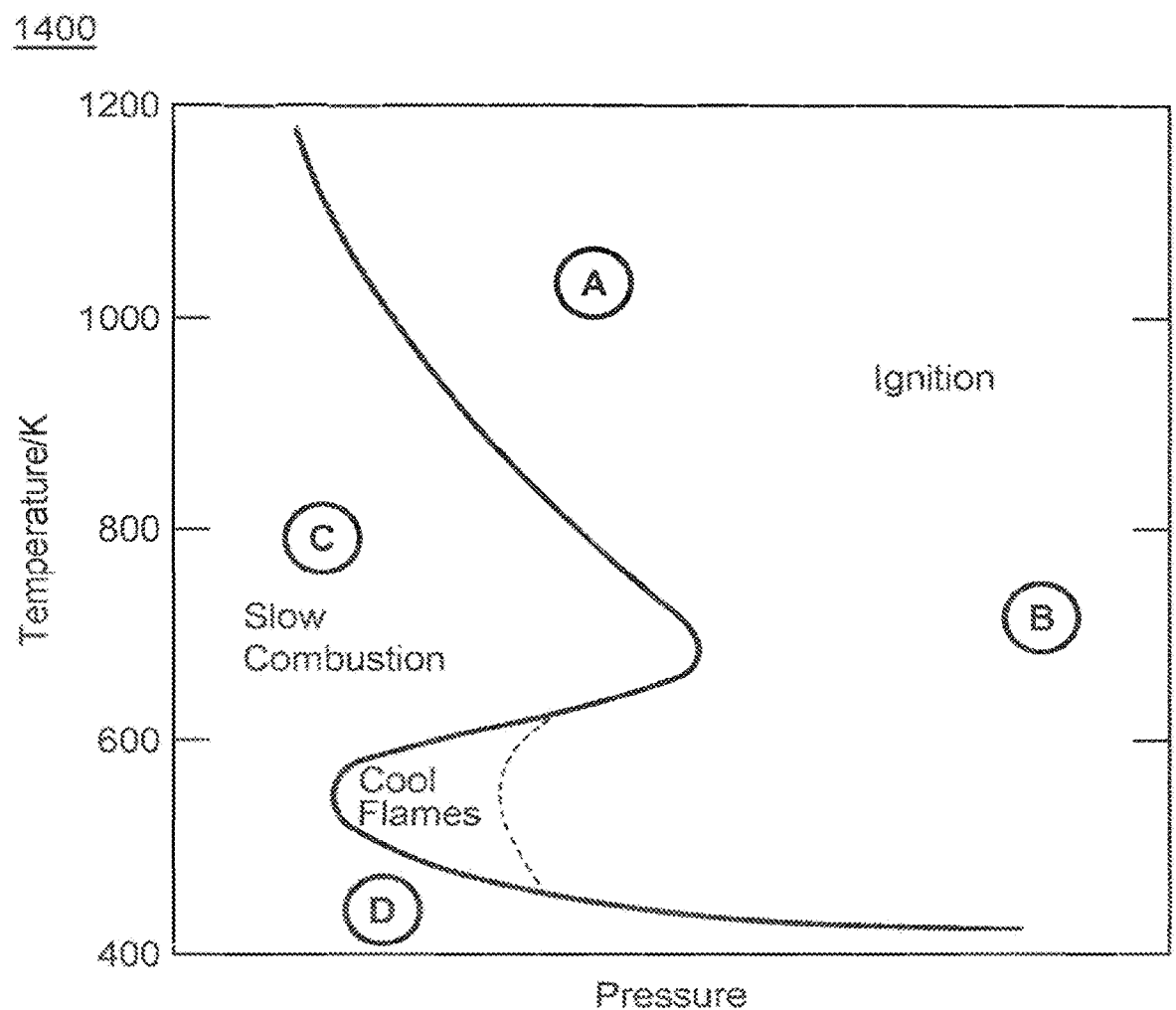
FIG. 13 depicts a pressure-temperature diagram for a hydrocarbon and oxygen mixture.
Figure 14A:
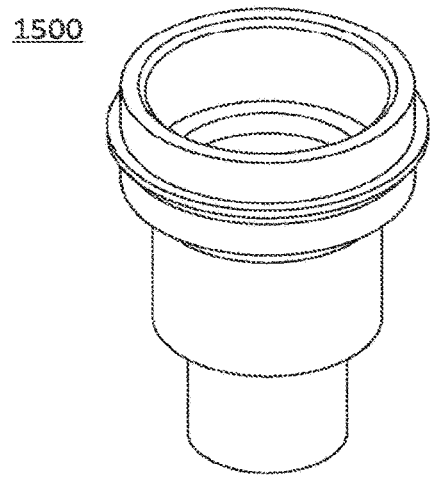
FIGS. 14A-14D illustrate an example QS section of an RCG, according to embodiments.
Figure 14B:
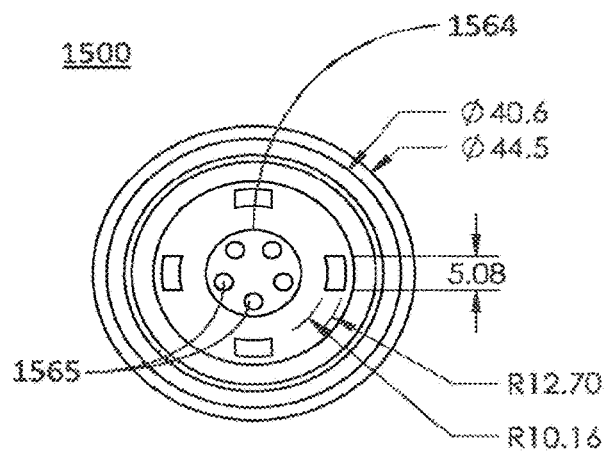
Figure 14C:
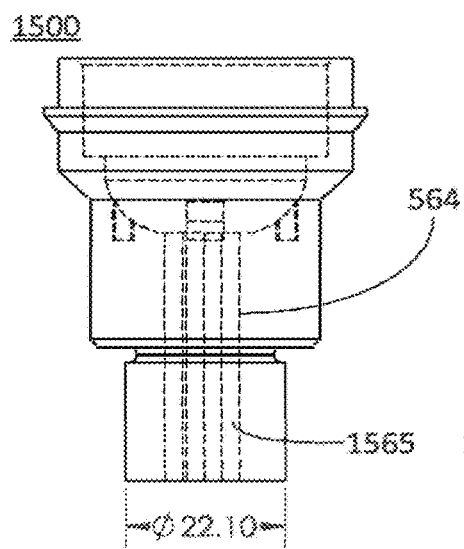
Figure 14D:
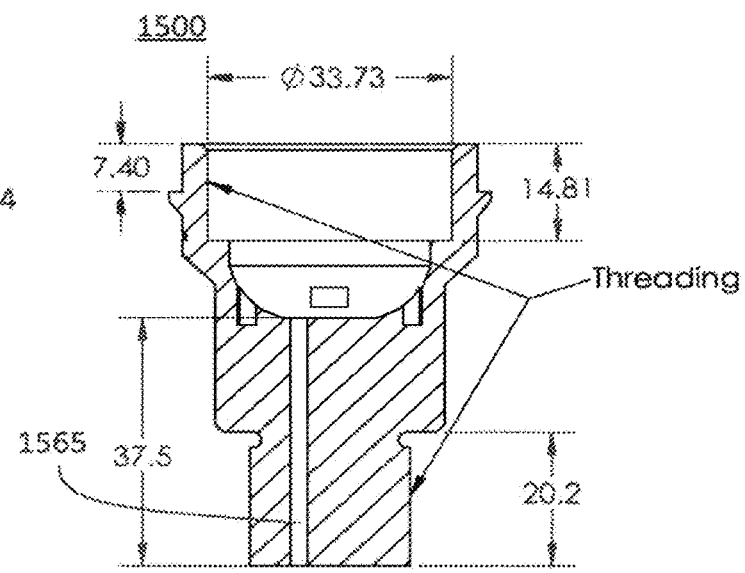
Figure 15A:
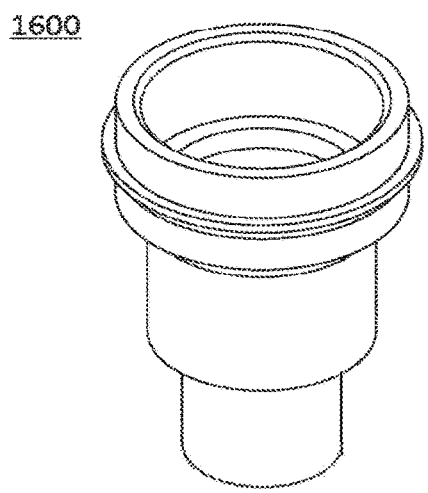
FIGS. 15A-15D illustrate an example QS section of an RCG, according to embodiments.
Figure 15B:
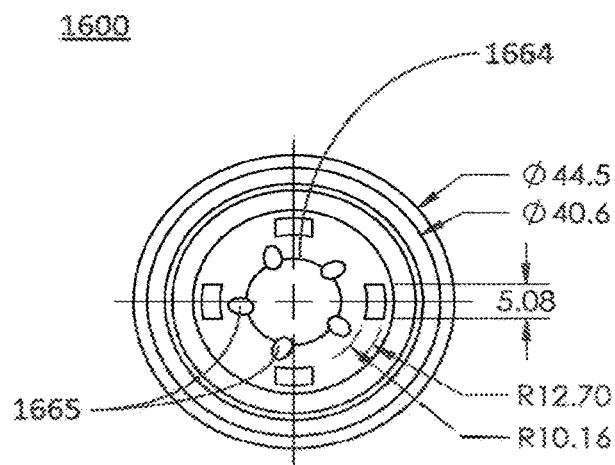
Figure 15C:
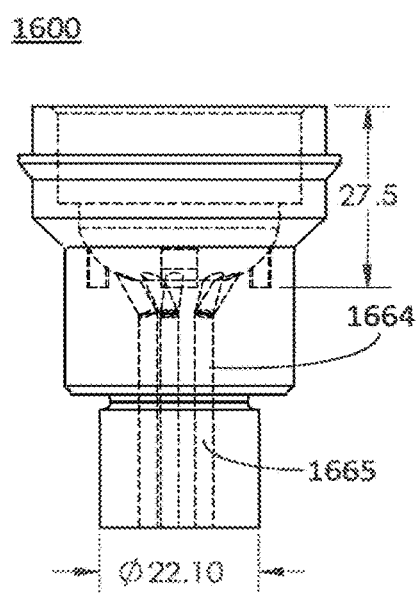
Figure 15D:
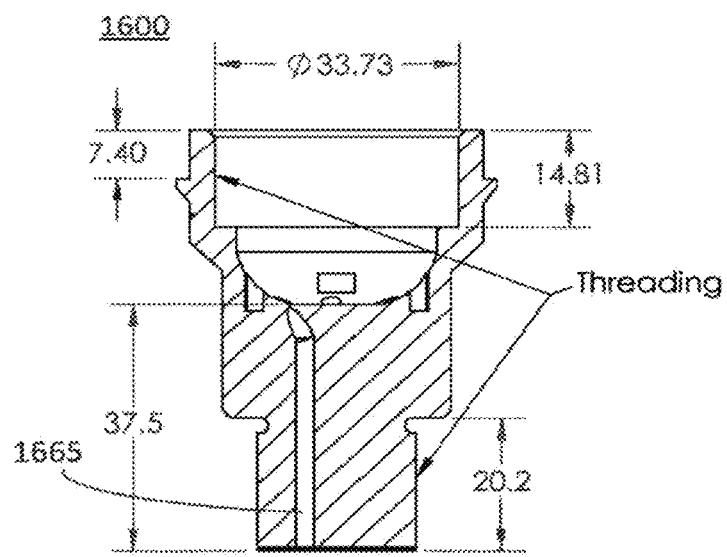
Figure 16A:
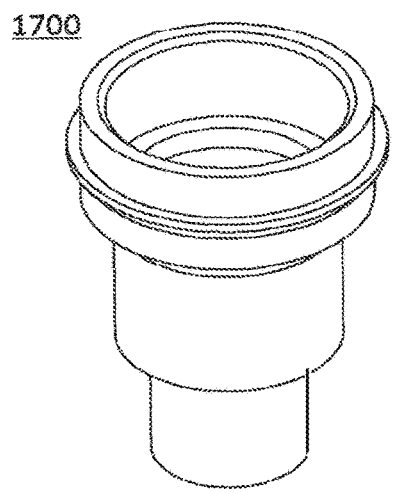
FIGS. 16A-16D illustrate an example QS section of an RCG, according to embodiments.
Figure 16B:
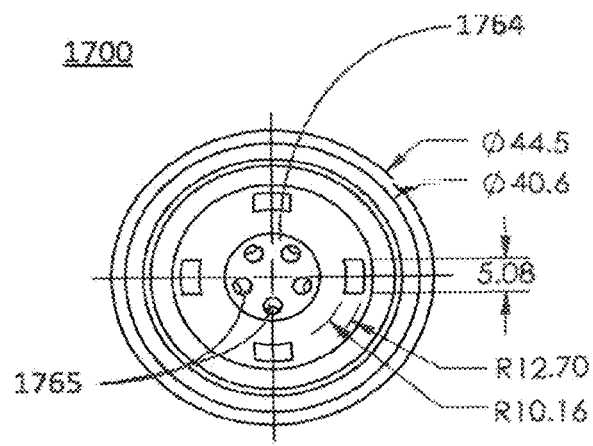
Figure 16C:
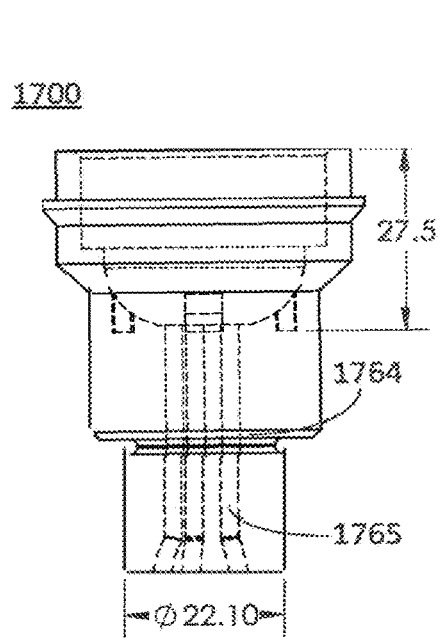
Figure 16D:
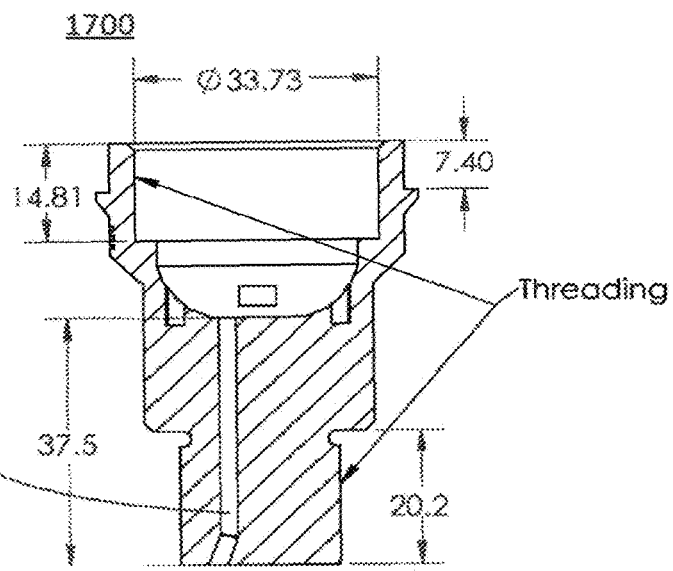
Figure 17A:
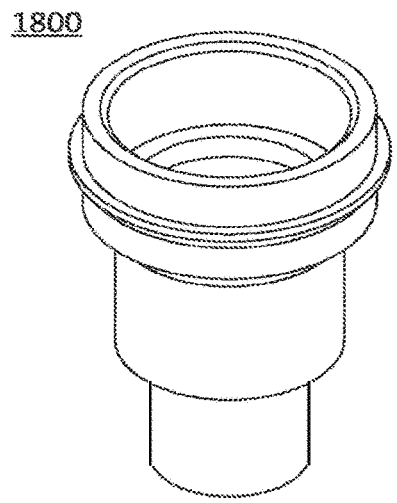
FIGS. 17A-17D illustrate an example QS section of an RCG, according to embodiments.
Figure 17B:
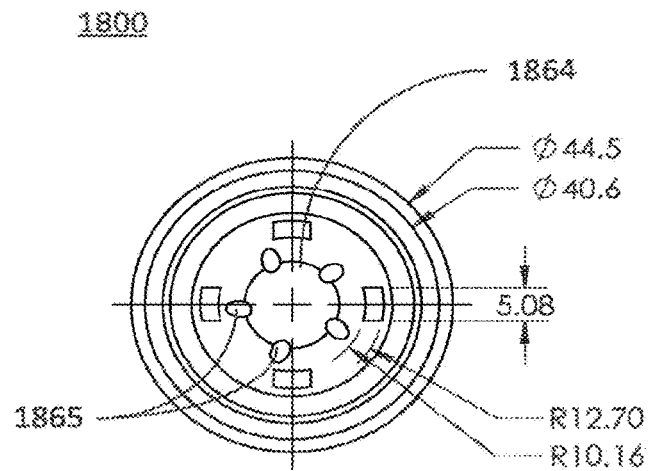
Figure 17C:
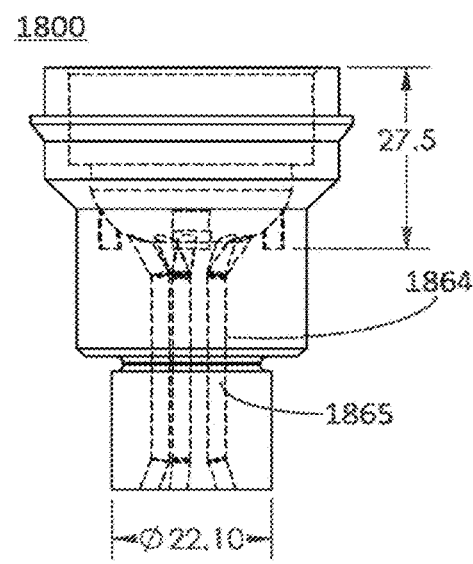
Figure 17D:
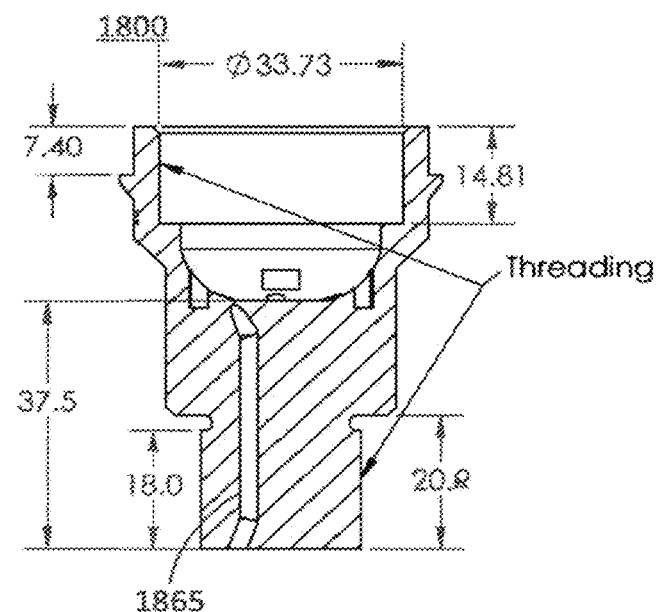

The early ERI sub-processes include a first sub-process that takes place within the RCGs and M-Cs after combustion (e.g., ERI ignition) in the MCC (Table 1, Event 7). The RCGs and M-Cs are configured such that, during an initial part of MCC expansion (e.g., after ERI ignition), they can be transitioned to and thermally maintained in a slow combustion state, as further detailed in FIG. 13. FIG. 13 depicts a schematic ignition diagram 1400 for a hydrocarbon and O2 mixture, copied from "Free Radicals in Combustion Chemistry," by R. W. Walker, Science Progress, Vol. 74, No. 2 (294), pp. 163-187, 1990. As depicted in diagram 1400, region A corresponds to rapid combustion, region B corresponds to low temperature ignition, and regions C and D correspond to low oxidation which can promote the production of significant quantities of RS.

After ignition in the MCC, high pressures can force quantities of RS and energy into the RCGs and the M-Cs from the MCC (Table 1, Event 7). Fuel in the RCGs and the M-Cs can be rapidly reacted in the presence of the OH radicals in a non-explosive but exothermic (e.g., thermal energy producing) sub-process. This OH-driving sub-process can continue as the state of the RCGs and the M-Cs transition down through region A of diagram 1400. With natural gas, the sub-process can result in the generation of new quantities of the RS, including, for example, $H_2O_2$, $HO_2$, and $CH_2O$.

The main ERI sub-processes occur within the MCC during a next combustion cycle. In a first main sub-process, a portion of the RS (e.g., $H_2O_2$, $HO_2$, and $CH_2O$) generated in the previous cycle, as described above, can be transferred from the RCGs and the M-Cs over to the MCC to mix with an incoming MCC air charge prior to subsequent RCG and MCC ignition events. This transfer can result from naturally occurring hydrodynamic processes during exhaust, intake, and early main compression. During main compression, fuel is also indirectly injected into the RCGs and the M-Cs (e.g., via compression-induced flows). Due to the quantities of RS in the RCGs and the M-Cs, this additional fuel can drive larger quantities of additional RS into the MCC, thus further seeding the MCC with RS prior to the next MCC ignition event. During the same period of time, fuel can be directly injected into the MCC (Table 1, Event 4) and the RCGs while the temperatures of the MCC are low. During these low temperatures, e.g., as the MCC fuel-air charge transitions through a cool frame area and slow combustion area (i.e., region A in diagram 1400), the RS have a moderate effect on the MCC fuel-air charge. The effect of the RS in the MCC during this period leads to early and rapid buildup of more of the same RS (e.g., $H_2O_2$, $HO_2$, $CH_2O$) as well as different RS (e.g., OH radical).

This early and rapid buildup of concentrations of the RS enhances and enables an altered chemistry in the flame-front propagation process of the engine when ignited. After the RCG is ignited, the RCG can generate a quenched, high-temperature, RS-rich, high-velocity jet that travels into the MCC, where it can mix with the MCC fuel-air charge and induce ERI via an OH reaction path followed by lower temperature flame-front combustion propagation. Specifically, during the combustion event, as the flame front reaches new portions of unburned fuel-air charge in MCC, the first reaction (e.g., chain initiation reaction) is a heat-releasing $H_2O_2$ thermal-decomposition reaction, in which one reaction path results in the $H_2O_2$ being converted into two OH radicals. This first reaction is followed by a second heat-releasing, low temperature, OH-induced, fuel decomposition reaction. As the local temperatures rapidly increase within the new portions of the charge that are burning, the chemistry of the combustion can transition to conventional oxidation chemical kinetics. This ERI reaction sequence can start under leaner fuel conditions and at lower temperatures compared to those needed for a conventional thermally induced, fuel oxidation chain initiation reaction process. Thus, the presence of the RS in induced ERI processes enable ignition augmentation/enhancement.

In ERI processes, high concentrations of RS, and preferably $H_2O_2$, drive the ignition process. Such processes can be implemented with different types of fuels, including those fuels that are difficult to ignite or those that ignite more readily at lower CRs and/or under learner fuel conditions. Accordingly, variations in composition of a fuel or natural gas mixture have less effect on ignition processes in ERI-configured engines, as described here. In some embodiments, ERI-configured processes can be used to ignite natural gas mixtures with ERs of 0.5 or lower and containing 80% methane with similar combustion characteristics. ERI may be particularly effective in natural gas fueled engines where the fuel composition varies due to high concentrations of wet gas (e.g., natural gas that contains less methane, typically less than about 85% methane, and more ethane and other more complex hydrocarbons). ERI can reduce pre-ignition and detonation caused by wet gas which can result in damage to the engine. Since an ERI-configured engine can ignite the MCC fuel-air charge down to ERs of 0.5 or lower, such can further eliminate the requirement for high pressure fuel injection (e.g., at about 500 psi) to ignite lean mixtures with ERs between 0.5 and 0.7.

In ERI processes, use of higher concentrations of RS, e.g., where the RS is well-mixed, with lean fuel conditions can reduce pollutant emissions associated with start-up conditions.

FIGS. 4A-4D illustrate an ERI process in a two-stroke internal combustion engine. For illustration purposes, the ERI process in FIGS. 4A-4D are depicted with reference to engine 200, but it can be appreciated that other configurations of engines described herein (e.g., engine 100) can implement an ERI process similar to that depicted in FIGS. 4A-4D.

In FIG. 4A, a portion of RS (e.g., $H_2O_2$, $CH_2O$, and $HO_2$) generated during a previous cycle can be transferred from the RCG 260 and M-Cs 270 into the MCC 217, as illustrated via arrows 272. During exhaust, intake, and early main-compression, naturally occurring pressure differences between the MCC 270, RCG 260, and M-Cs 270 can cause this RS transfer. The RS can be transferred via connecting vents or orifices. As described above, the M-Cs 270 can be located around a periphery of the head 216 and/or piston 210 and can populate an edge region of the MCC 217 with RS. The transferred RS can mix with retained gases and intake gases, e.g., an incoming fuel-air charge in the MCC 217, prior to an ignition event in the MCC 217. For example, fuel can be delivered into the MCC 217 via fuel injector 230, and air can be delivered into the MCC 217 via air intake 221. The air from the delivered fuel and air can then mix with the RS transferred from the RCG 260 and the M-Cs 270.

In the middle of main compression (e.g., compression by the piston 210), when temperatures in the MCC 217 are relatively low, the presence of RS in the MCC 217 can produce early buildup of RS (e.g., $H_2O_2$, $CH_2O$, $HO_2$, OH radical). The MCC 217 can become highly impregnated with the carried-over RS from the earlier cycle. In parallel, a separate RS generation sub-process can begin in the MCC 270, which makes use of the RS carried over from the previous cycle that was retained in the RCG 260 and M-Cs 270. Such rapid and early build-up of concentrations of RS can enhance and enable an altered chemistry in a flame-front propagation process of the engine 200 when ignited by the RCG 260 (e.g., by delivering a jet of RS later in the combustion cycle). At a point prior to a middle of the compression event, fuel can be injected into the RCG 260, as schematically shown with arrow 252, to bring the RCG 260 to fuel rich conditions.

Figure 4B:
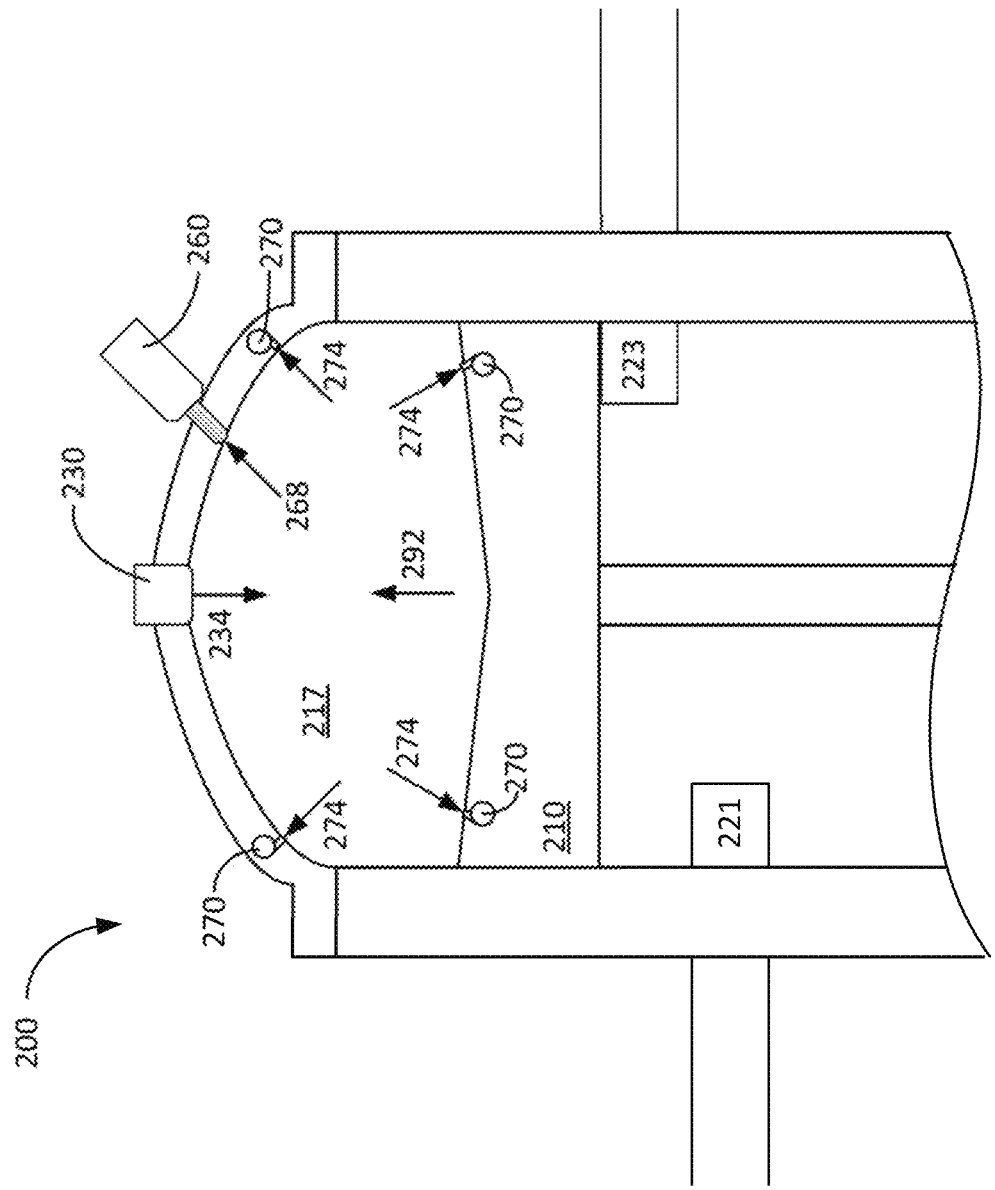
Figure 4C:
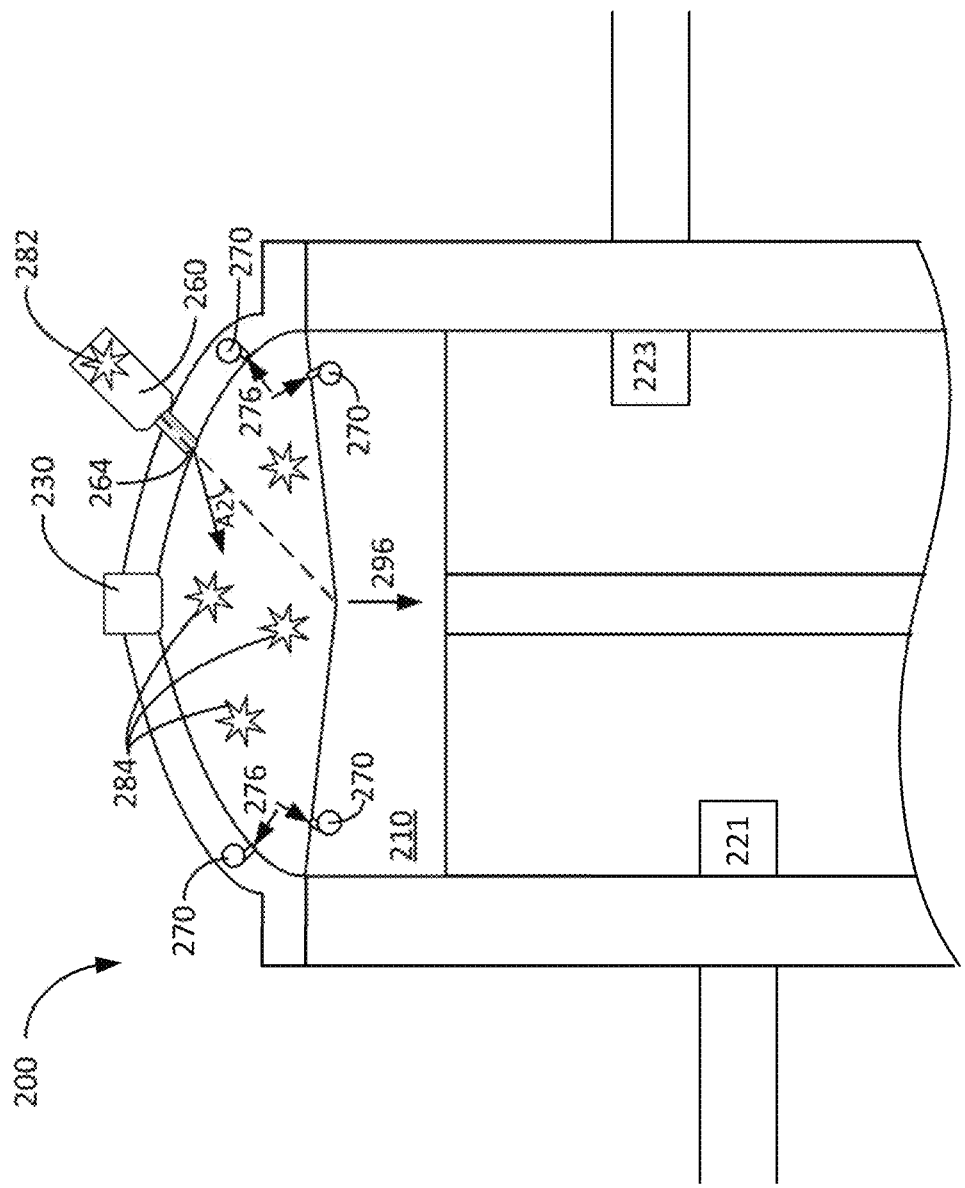

FIG. 4B depicts the process shortly after the middle of main compression. As compression continues in the direction 292, the RS and the gases in the MCC 217 undergo additional mixing. Compression can cause pressure rises and pressure-induced temperature rises. Accordingly, the activity of the RS in the MCC 217 can increase during this period. Pressure differences can form between the MCC 217, RCG 260, and M-Cs 260 and gases in the MCC 217 can be transferred into the RCG 260 and the M-Cs 270, as depicted via arrows 268 and 274. For example, the pressure differences can cause the transfer rates of the gases into the RCG 260 and the M-Cs 270 (e.g., via vents or orifices) to become throttled. Throttling causes the pressure differences to further build and result in the formation of high-speed mass jets. These jets can transfer (e.g., force) portions of the gases in the MCC 217 (e.g., including intake oxygen) into the RCG 260, renewing the RCG 260 and the M-Cs 270 oxygen supply. At this stage, the mixture in the RCG 260 can be fuel rich. The fuel rich mixture can contain remnants of RS carried over from an earlier cycle.

Early in the compression stroke, fuel can be injected into the MCC 217, as schematically depicted using arrow 234, in preparation for ERI (e.g., the combustion event). During late main compression, the injected fuel can mix with the RS in the MCC 217. During late to end of main compression, the previous cycle RS from the RCG 260 and the M-Cs 270 and retained in the MCC 217 can induce pre-ignition activity, thereby preparing the mixture in the MCC 217 for the jet of RS from the RCG 260 to induce ERI.

FIG. 4C depicts RCG spark ignition and ERI in the MCC 217. After the RCG spark ignition and the start of combustion 282 in the RCG 260, the ignited jet can expand out of the RCG 260 at a high velocity through the QS 264, which can be configured to quench the jet. The quenched jet can be rich in RS, e.g., including the partial combustion products produced by the RCG 260 and enhanced by the air from the MCC 217, which itself can be laden with RS from a previous combustion cycle. As this hot, RS-rich jet from the RCG 260 exits the QS 264 and travels across the CV, local combustion can start via the spontaneous decomposition of H2O2 into two OH radicals followed by OH-induced fuel decomposition. These processes can result in significant heat release. Once the local temperatures reach a certain level, combustion can shift to conventional fuel-oxidation. This process can continue in one or more locations 284 as the flame front propagates.

When the mixture in the RCG 260 is ignited, it results in the generation of more RS and a rapid rise in pressure within the RCG 260. The rise in pressure can result in the rapid transfer of most of the new RS supply to the MCC 217. Simultaneously and/or shortly before or after the RCG 260 activity, RS in the M-Cs 270 can undergo a significant temperature and pressure rise that results in ignition of the RS and expansion of the mass in the M-Cs 270, which can expand through the orifices of the M-Cs 270 into the MCC 217 seeding it with more RS for promoting ERI when the RCG 260 injects the main charge of RS into the MCC 217. As noted, the M-C 270 can be located around the periphery of the head 216 and/or piston 210, and their contribution of RS, although less than the RCGs on a mass basis, can populate the edge regions of the MCC 217 with RS that further promote turbulent mixing and a distribution of ignition sites.

Figure 4D:
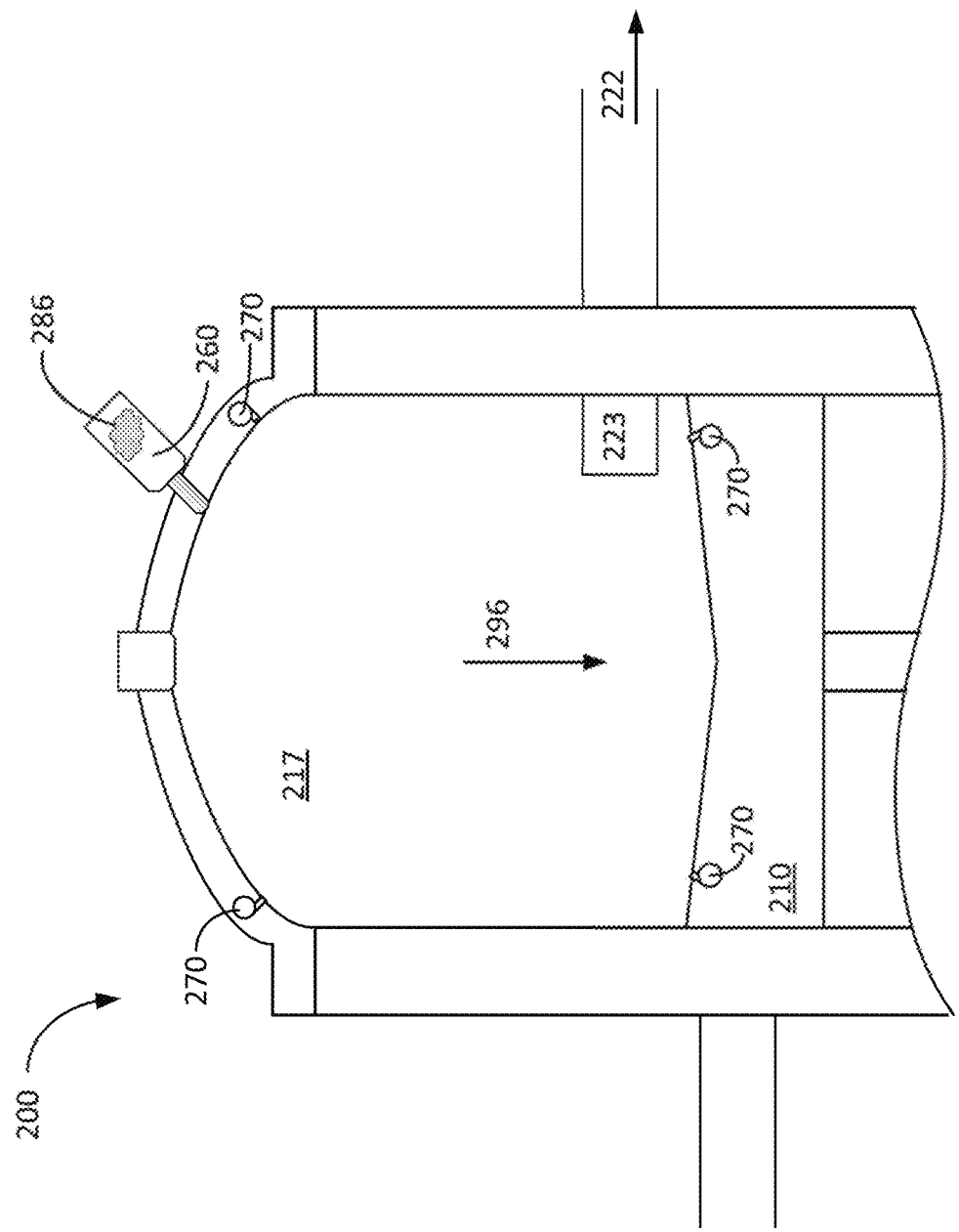

FIG. 4D illustrates mid-to-late portions of an expansion phase, e.g., as the piston 210 moves downwards along the arrow 296. Due to the rapid pressure rise in the MCC 217 during the expansion phase of the cycle, OH and energy are driven into the RCG 260 and the M-Cs 270, as represented by arrows 276 in FIG. 4C, thereby setting the stage for additional RS generation that can enhance the next combustion cycle. During mid-to-late portions of the expansion phase, new RS can be generated 286 in the RCG 260 and M-Cs 270. The cycle can then repeat. For example, during the mid-to-late portions of the expansion phase, the RS and unused fuel in the RCG 260 and the M-Cs 270 can be transferred into the MCC 217, resulting in RS generation and retention in the MCC 217. During this period, temperature drops can cause the MCC 217, RCG 260, and M-Cs 270 to go into an equilibrium state (e.g., frozen equilibrium) until the next combustion cycle.

Table 1 depicted below illustrates the flow of events during an ERI process.

TABLE 1

| Event No. & Cycle Timing | RCG (e.g., RCG 260) Occurrences | Flow | MCC (e.g., MCC 217) Occurrences | Flow | M-C (e.g., M-Cs 270) Occurrences |
|---|---|---|---|---|---|
| Exhaust, Intake & Early Main-Compression | Pressure differences cause transfer of RS in RCG to MCC | → | RS conveyed via MCC carryover + recycling + RCG and M-C carryover | ← | Pressure differences cause transfer of RS in M-C to MCC |
| By Mid Main-Compression | Direct fuel injection into RCG to support RS generation | ← | MCC gases highly impregnated with RS; pressure differences transfer portion of MCC gases to RCG and M-C | → | RS generation |
| After Mid Main-Compression | Pressure differences from intake gases + fuel forced into RCG; RS generation and pressure driven into MCC | → | Temperature rise causes RS to become reactive | ← | Pressure differences from intake gases + fuel forced into M-C's; RS generation and pressure driven into MCC |
| Mid to Late Main-Compression | Some of fuel directly injected into MCC are transferred into RCG | ← | Fuel Inserted | → | Some of fuel directly injected into MCC are transferred into M-C |
| Late Main-Compression | | ← | Fuel mixing with RS quasi-homogeneous | → | |
| Late to End Main-Compression | | ← | At below temperatures for inducing ERI; RS reacting with fuel | → | |
| Proximate to the Start of Expansion | Spark ignition in RCG increases pressure in RCG and drives quenched hot jet containing RS + energy through QS orifices into MCC | → | ERI initiates combustion propagation - initially involves fuel + OH decomposition, then shifts to fuel-oxidation | → | Pressure differences in MCC causes OH + energy to be driven into M-C |
| Mid-Late Expansion | Additional RS generation (OH-Induced), production can be sensitive to RCG temperature, geometry, volume, QS design, etc. | → | RS conveyed into MCC | ← | Additional RS generation, production can be sensitive to M-C temperature, volume, fuel percentage, etc. |

TABLE 1-continued

| Event No. & Cycle Timing | RCG (e.g., RCG 260) Occurrences | Flow | MCC (e.g., MCC 217) Occurrences | Flow | M-C (e.g., M-Cs 270) Occurrences |
|---|---|---|---|---|---|
| Mid-Late Expansion and Blow-Down | Temperature drops: RS go into frozen equilibrium | → | RS and unused fuel transferred to MCC; results in RS generation + radical retention; RS go into or near frozen equilibrium | ← | Temperature drops: RS go into frozen equilibrium |

Figure 11:
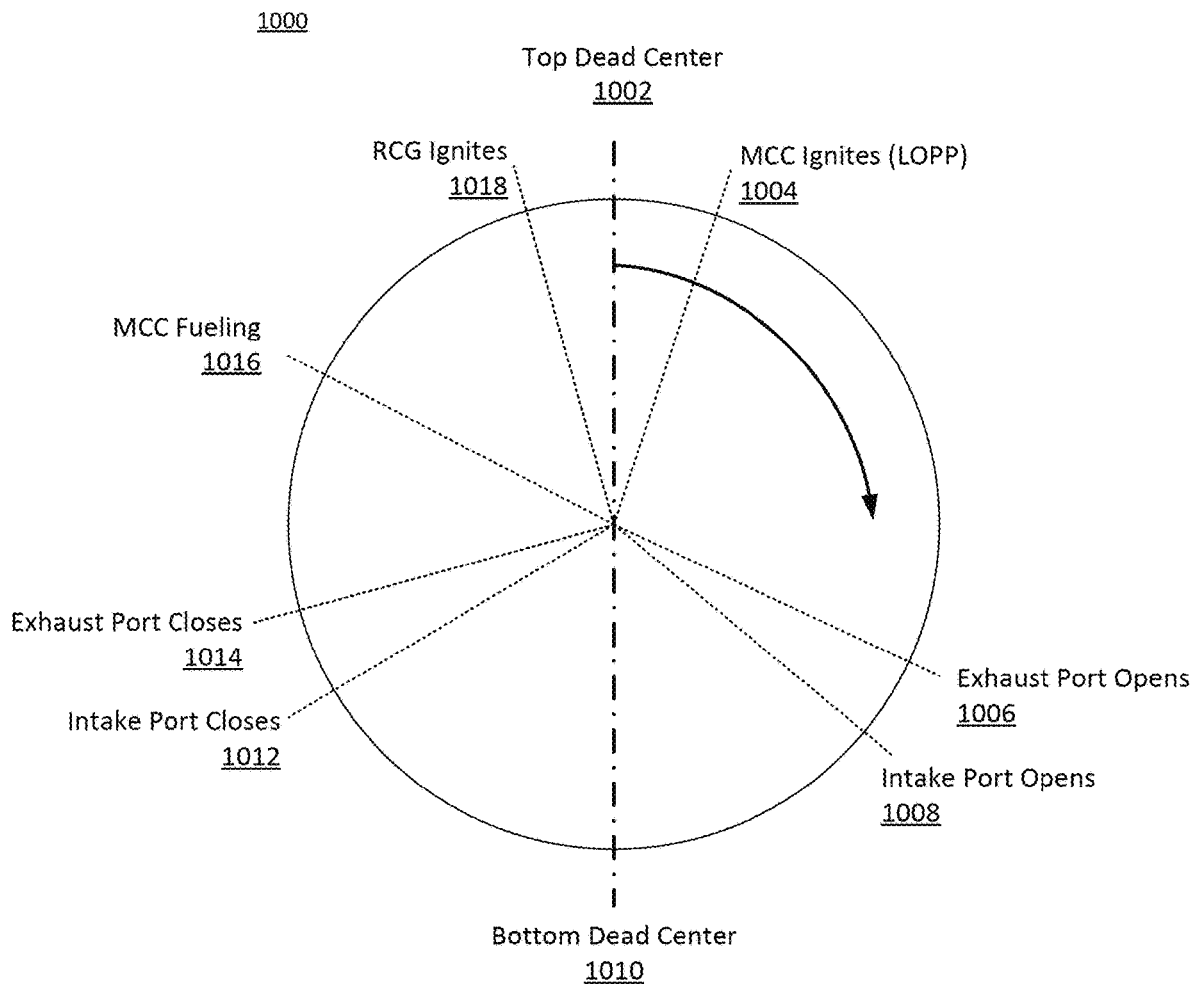
FIG. 11 depicts events during an ignition cycle of an example two-stroke internal combustion engine, according to embodiments.

FIG. 11 schematically illustrates events during a combustion cycle of a two-stroke engine, according to embodiments herein (e.g., engines 100, 200, 300). As depicted in FIG. 11, a MCC fuel-air charge of the engine can ignite, at 1004, after a piston moves past top dead center (TDC) 1002 and into an expansion phase. The MCC fuel-air charge can ignite with LOPP within a desirable range or at a desirable value, as further described below with reference to FIG. 12. The piston can continue its path downward in the expansion phase and the exhaust ports of the engine can open, at 1006, followed by the intake ports, at 1008. After the piston moves past BDC 1010, the intake ports close, at 1012, and the exhaust ports close, at 1014. MCC fueling then occurs, at 1016, and a fuel-air charge in an RCG of the engine can be ignited, at 1018. While not depicted in FIG. 11, during exhaust, intake, and early main-compression, naturally occurring pressure differences between the MCC and RCG (and optionally M-Cs of the engine) can cause RS transfer and build-up in the MCC. This RS buildup, along with the main RS charge from the RCG ignition, at 1018, can then induce ERI, at 1004.

Figure 12:
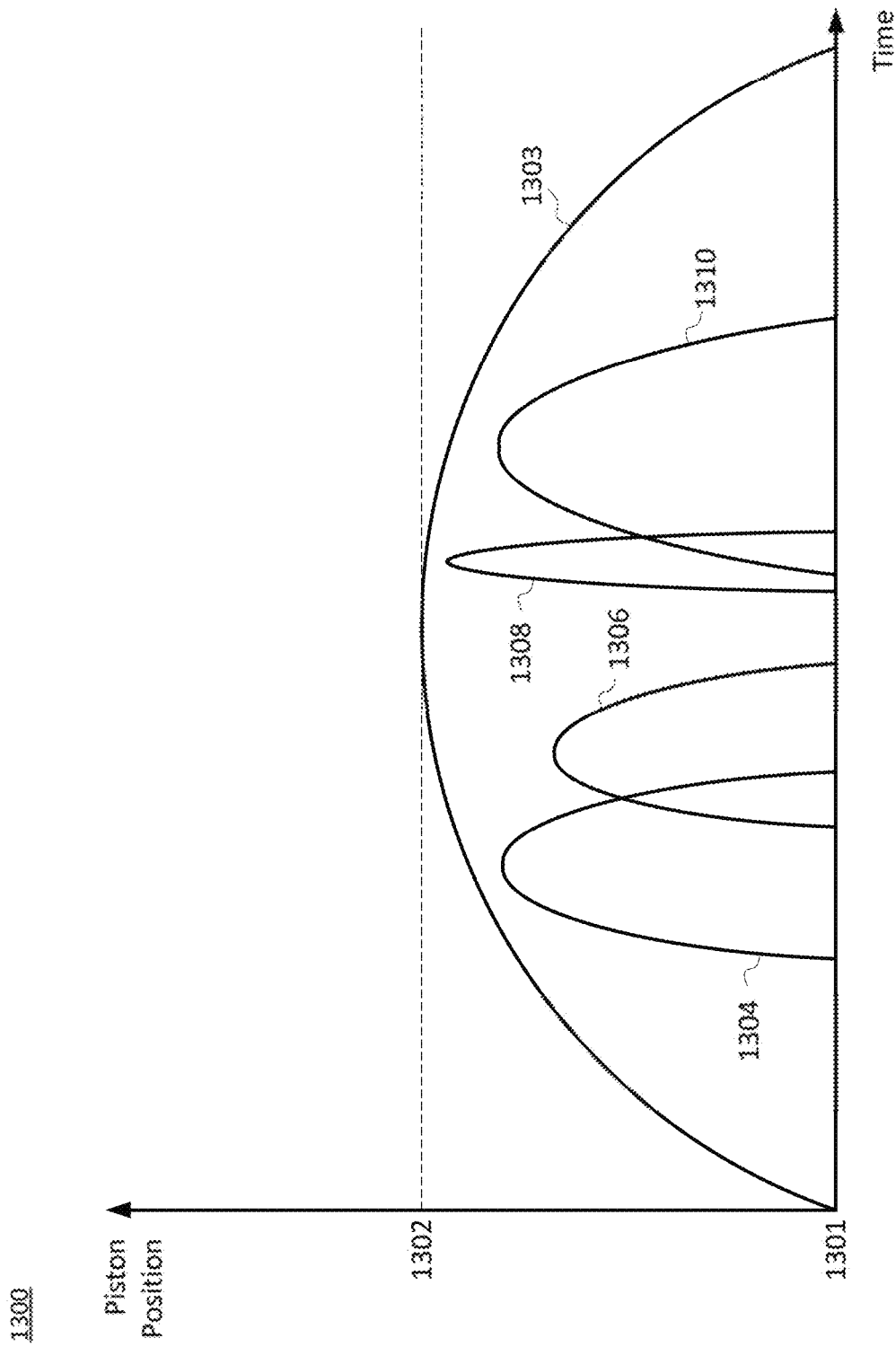
FIG. 12 depicts events over time during an ignition cycle of an example two-stroke internal combustion engine, according to embodiments.

FIG. 12 provides another schematic depiction of events during a combustion cycle of a two-stroke engine. FIG. 12 depicts such events relative to the piston position over time. Curve 1303 represents the piston position as the piston moves from BDC 1301 to TDC 1302. As the piston begins its path from BDC 1301 toward TDC 1302, the air intake can open and air can flow into the MCC of the engine, as schematically represented by curve 1304. Next, fuel can be injected into the MCC, as schematically represented by curve 1306. After the piston moves past TDC 1302, an RCG of the engine can deliver a jet rich in RS into the MCC, as schematically represented by curve 1308. This RS-rich jet, combined with RS that have been built up in the MCC during the earlier cycle and early compression and/or RS from M-Cs disposed around the MCC, can then induce ERI (e.g., the combustion event), as schematically represented by curve 1310. ERI can initiate with LOPP within a desirable range or at a desirable value, as further described below.

Figure 20:
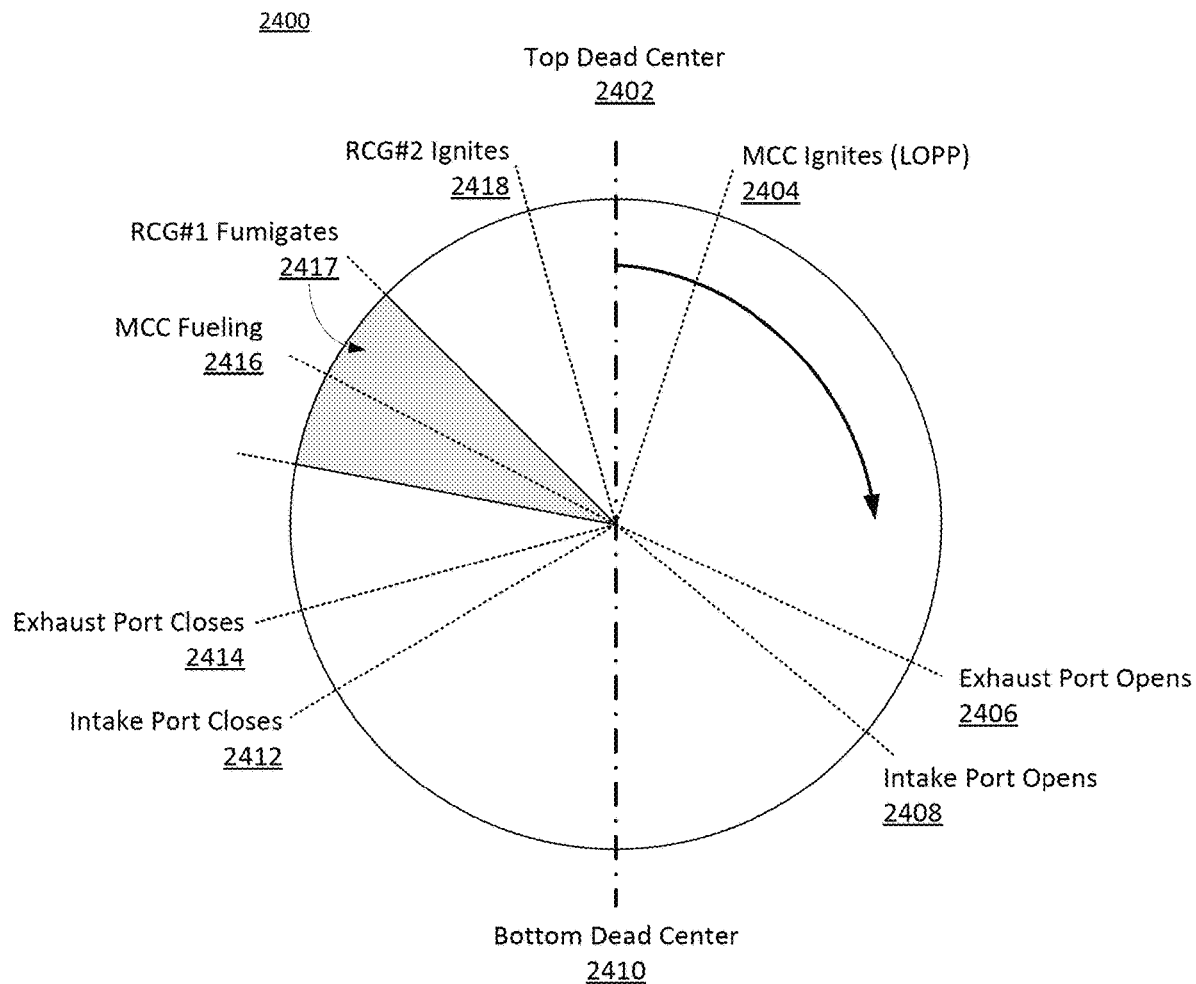
FIG. 20 depicts events during an ignition cycle of an example two-stroke internal combustion engine with use of multiple RCGs, according to embodiments.
Figure 21:
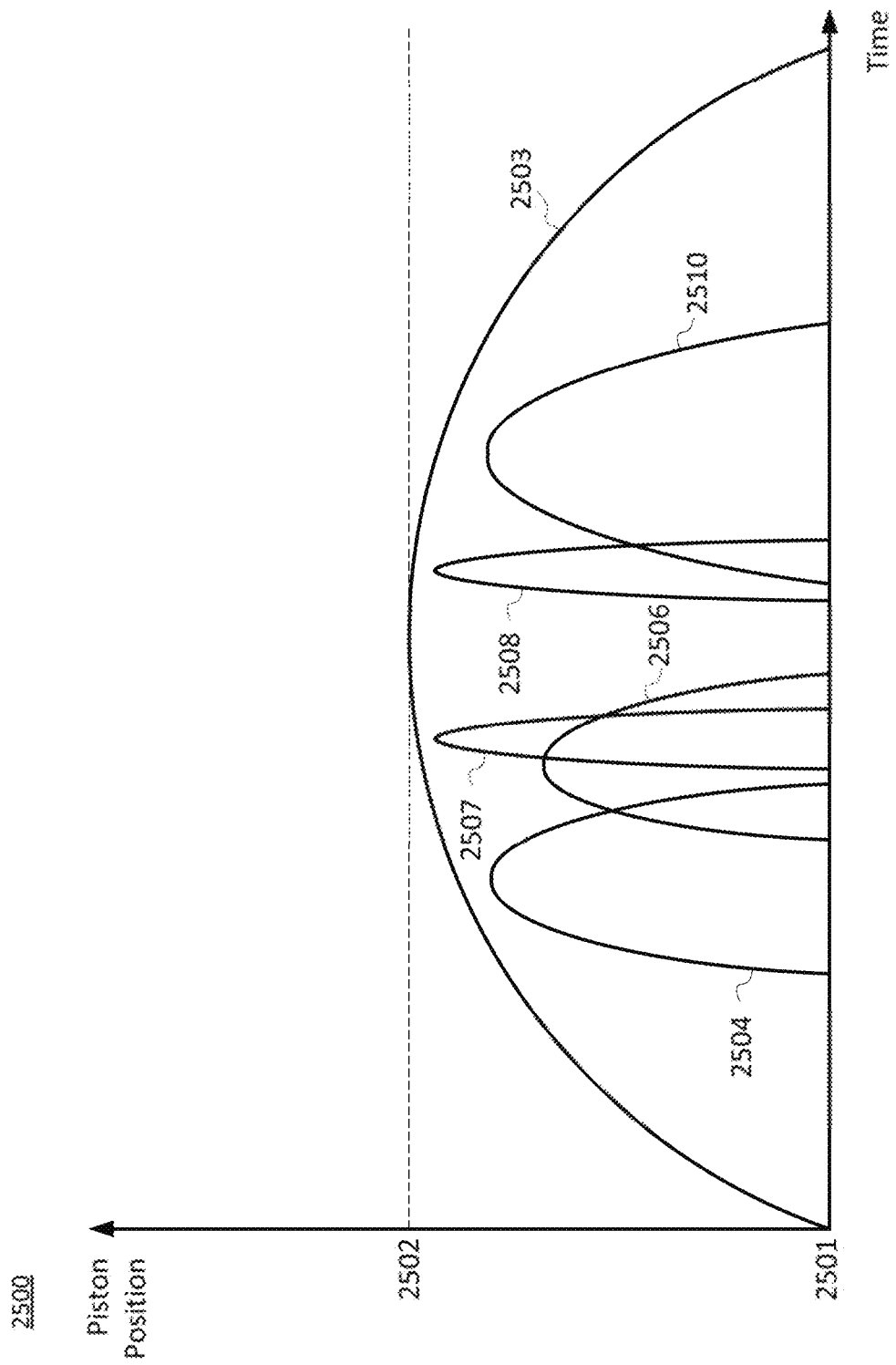
FIG. 21 depicts events over time during an ignition cycle of an example two-stroke internal combustion engine with use of multiple RCGs, according to embodiments.

In some embodiments, an engine can be equipped with a first RCG that is used to fumigate (e.g., seed a MCC with RS to enhance ignition and combustion) and a second RCG that is used to induce ignition. FIGS. 20 and 21 depict events during a combustion cycle involving fumigation and ignition. The events depicted in FIGS. 20 and 21 can be similar to those depicted in FIGS. 11 and 12, but also include a fumigation event that occurs before ignition. As depicted in FIG. 20, starting at TDC 2402, a piston can move toward BDC 2410. The MCC fuel-air charge can ignite, at 2404, e.g., with LOPP within a desirable range or at a desirable value. The exhaust ports can open at 2406, and the intake ports can open, at 2408. After the piston moves past BDC 2410, the intake ports can close, at 2412, and the exhaust ports can close, at 2414. MCC fueling then occurs, at 2416. At 2417, a first RCG (e.g., RCG #1) acting as a RCG fumigator can fumigate the MCC by seeding the MCC fuel-air charge with RS to enhance ignition and combustion. The first RCG can fumigate the MCC before, during, and/or after the MCC fueling at 2416, as represented by the shading in FIG. 20. And subsequently, at 2418, a second RCG (e.g., RCG #2) acting as a RCG igniter can inject RS into the MCC to induce MCC ignition, at 2404. The cycle then repeats as the piston of the engine moves from TDC 2402 toward BDC 2410 back toward TDC 2402.

FIG. 21 provides another schematic depiction of the events during the combustion cycle of a two-stroke engine including two RCGs, where a first RCG fumigates a MCC fuel-air charge and a second RCG ignites the MCC fuel-air charge. Curve 2503 represents the piston position as the piston moves from BDC 2501 to TDC 2502. As the piston begins its path from BDC 2501 toward TDC 2502, the air intake can option and air can flow into the MCC of the engine, as schematically represented by curve 2504. Fuel can be injected into the MCC of the engine, as schematically represented by curve 2506. The MCC fuel-air charge can be fumigated or seeded with a first amount of RS, at 2507, e.g., when a first RCG ignites and injects a first amount of RS into the MCC. After the piston moves past TDC 2502, a second amount of RS can be injected into the MCC, at 2508, e.g., when a second RCG ignites and injects a second amount of RS into the MCC. The RS-rich jet, combined with RS from the fumigation, RS that has built up in the MCC during an earlier cycle and early compression, and/or RS from M-Cs disposed around the MCC, can then induce ERI, as schematically represented by curve 2510. ERI can initiate with LOPP within a desirable range or at a desirable value, as further described below.

Figure 27:
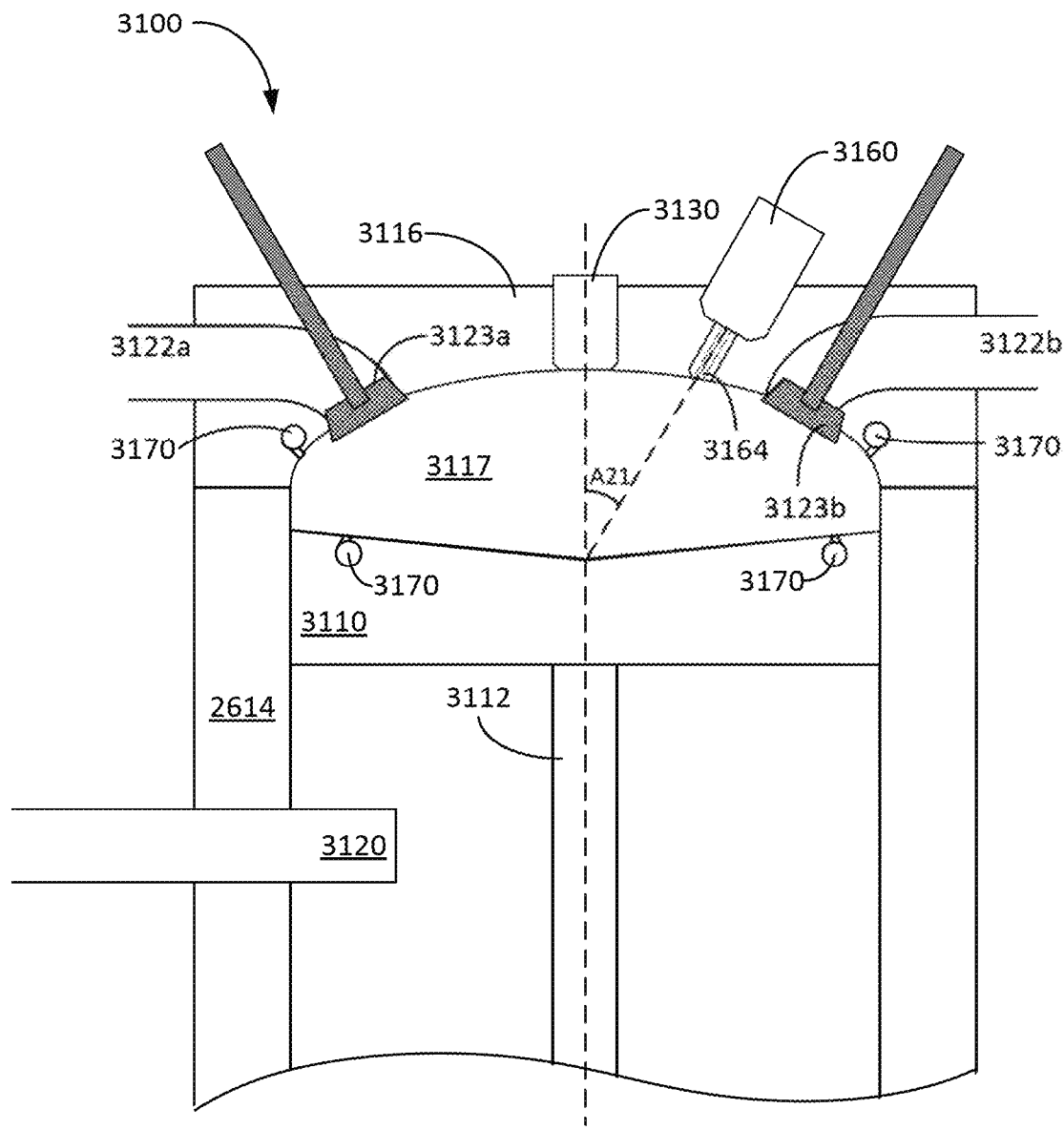
FIG. 27 is a diagram of a cross-section view of an example internal combustion engine cylinder, of the type commonly known as a uniflow engine, according to embodiments.

FIG. 27 depicts an example of a two-stroke uniflow internal combustion engine 3100, including an RCG 3160 and a set of M-Cs 3170. While a single RCG 3160 and a plurality of M-Cs 3170 are depicted in FIG. 27, it can be appreciated that any number of RCGs 3160 and/or M-Cs 3170 can be used in embodiments described herein. The engine 3100 can include one or more components that are structurally and/or functionally similar to those of other engines described herein (e.g., engine 200). For example, the engine 3100 can include a piston 3110, a rod 3112, a cylinder 3114, a head 3116, a MCC 3117, and a fuel delivery control device 3130 (e.g., a fuel injector or valve).

The RCG 3160 can be structurally and/or functionally similar to other RCGs described herein, including, for example, RCG 260 described with respect to the two-stroke engine 200 depicted in FIGS. 3-4D. The uniflow engine 3100 differs from two-stroke engines (e.g., engine 200) in that the uniflow engine 3100 does not have exhaust ports in a cylinder wall. Instead, the uniflow engine 3100 can be configured with one or more exhaust valves 3123a, 3123b in the head 3116 of the engine 3100. The exhaust valves 3123a, 3123b can be configured to control flow out exhaust gases out of the MCC 3117 via exhaust ports 3122a, 3122b.

Similar to other engines described herein, the RCG 3160 can be mounted to the head 3116, e.g., via a screw-in connection and/or flange-type arrangement. In some embodiments, the RCG 3160 can be installed in an existing port of the engine 3100, e.g., a port for a PCC or other engine component that has been removed. In some embodiments, the RCG 3160 can be installed at an angle A21 relative to a centerline of the engine, as depicted in FIG. 27. When installed at an angle (e.g., angle A21), the RCG 3160 can be equipped with one or more orifices that are angled with respect to angle A21, e.g., by an angle A24 as depicted in FIG. 28C. In some embodiments, the RCG 3160 can include a plurality of orifices that can be set at different angles. The angling of the orifices of the RCG 3160 can be set to enable sufficient distribution or dispersion of RS being injected into the MCC 3117 of the engine 3100 during a combustion cycle. In some embodiments (e.g., with an Ajax or GMV engine), A21 can be about 0 to about 70 degrees, including all subranges and values in-between, and A24 can be about 0 to about 40 degrees, including all subranges and values in-between.

Similar to other engines described herein, the M-Cs 3170 can be incorporated into a periphery of the head 3116 and/or a periphery of the piston 3110. Alternatively, in some embodiments, the engine 3100 may not include M-Cs 3170, or the M-Cs 3170 may be incorporated into the periphery of the head 216 and not the periphery of the piston 210, and vice versa.

Collectively, the RCG 3160 and the M-Cs 3170 can provide RS to the MCC 3117 for inducing ERI, as further described with reference to FIGS. 28A-28D. The process depicted in FIGS. 28A-28D can be similar to the process depicted for the two-stroke engine 200 in FIGS. 4A-4D. For example, in FIG. 28A, a portion of RS generated during a previous cycle can be transferred from the RCG 3160 and the M-Cs 3170 into the MCC 3117, as illustrated via arrows 3172. The RS can be transferred via connecting vents or orifices. The transferred RS can mix with retained gases and intake gases, e.g., an incoming fuel-air charge in the MCC 3117, prior to an ignition event in the MCC 3117. For example, fuel can be delivered into the MCC 3117 via fuel injector 3130, and air can be delivered into the MCC 217 via air intake 3120. The air from the delivered fuel and air can then mix with the RS transferred from the RCG 3160 and the M-Cs 3170. The present of such RS can produce early buildup of RS in the MCC 3117.

Figure 28A:
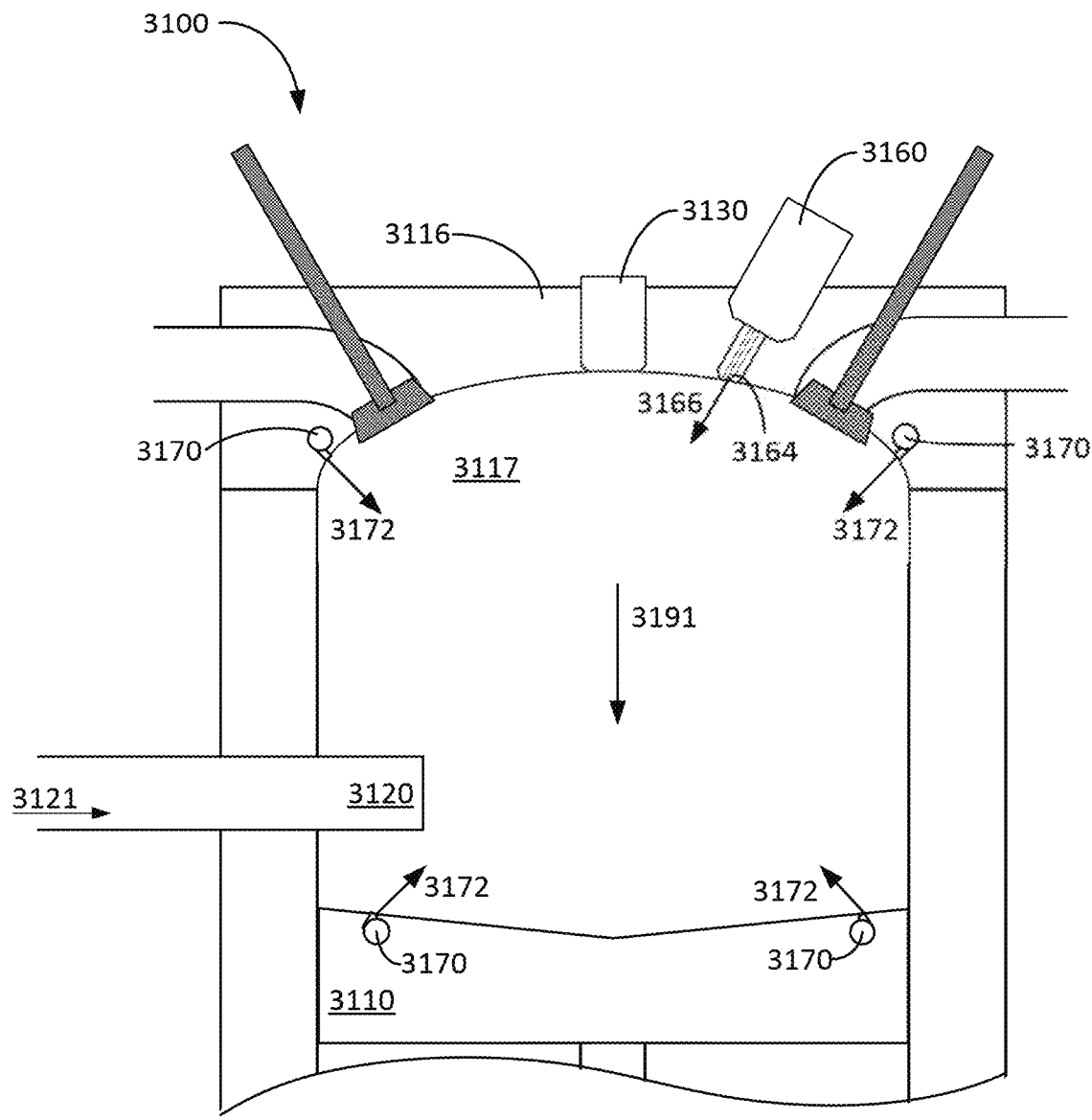
FIGS. 28A-28D illustrate an operation of the uniflow internal combustion engine during an ignition cycle, according to embodiments.
Figure 28B:
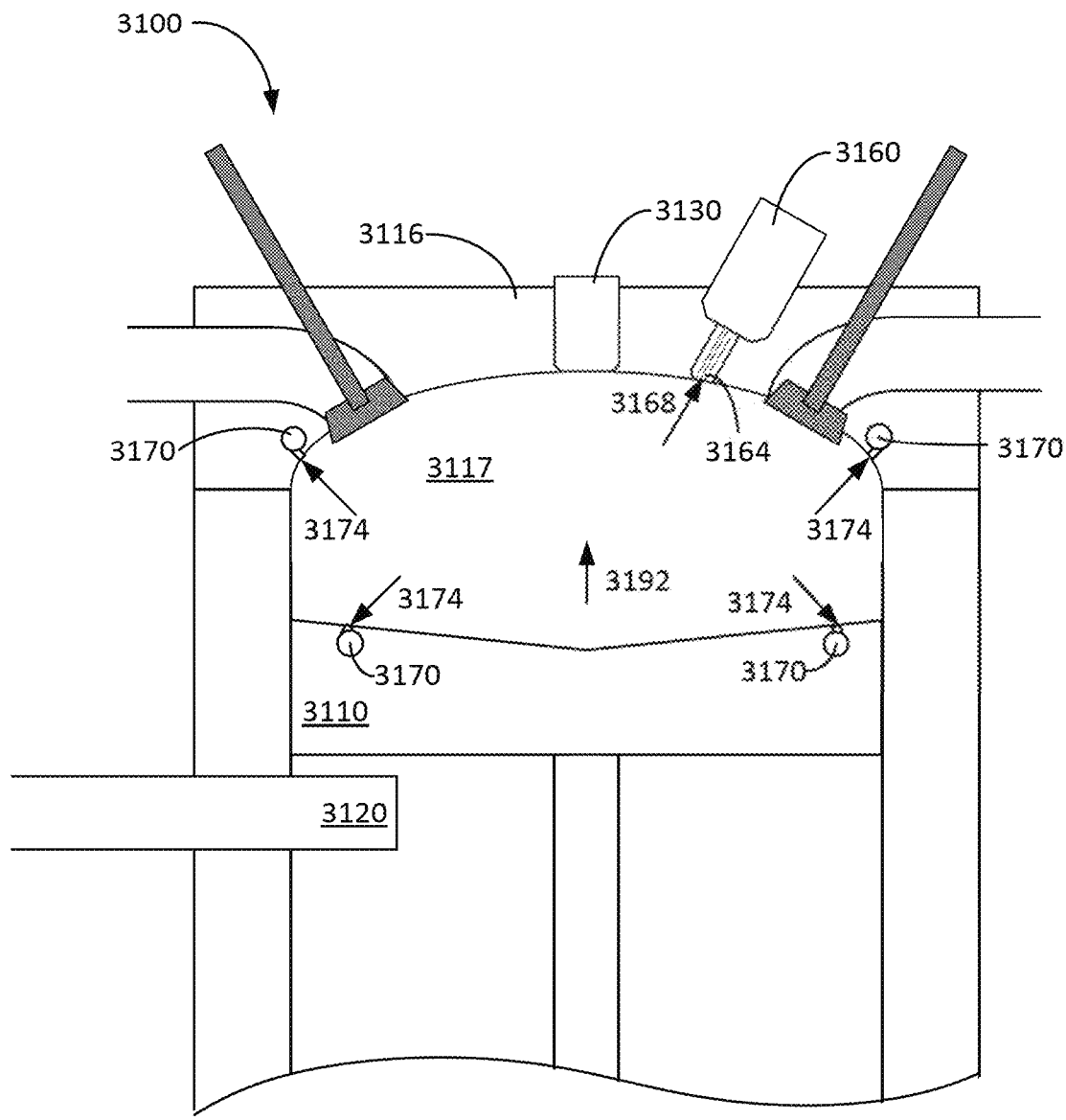
Figure 28C:
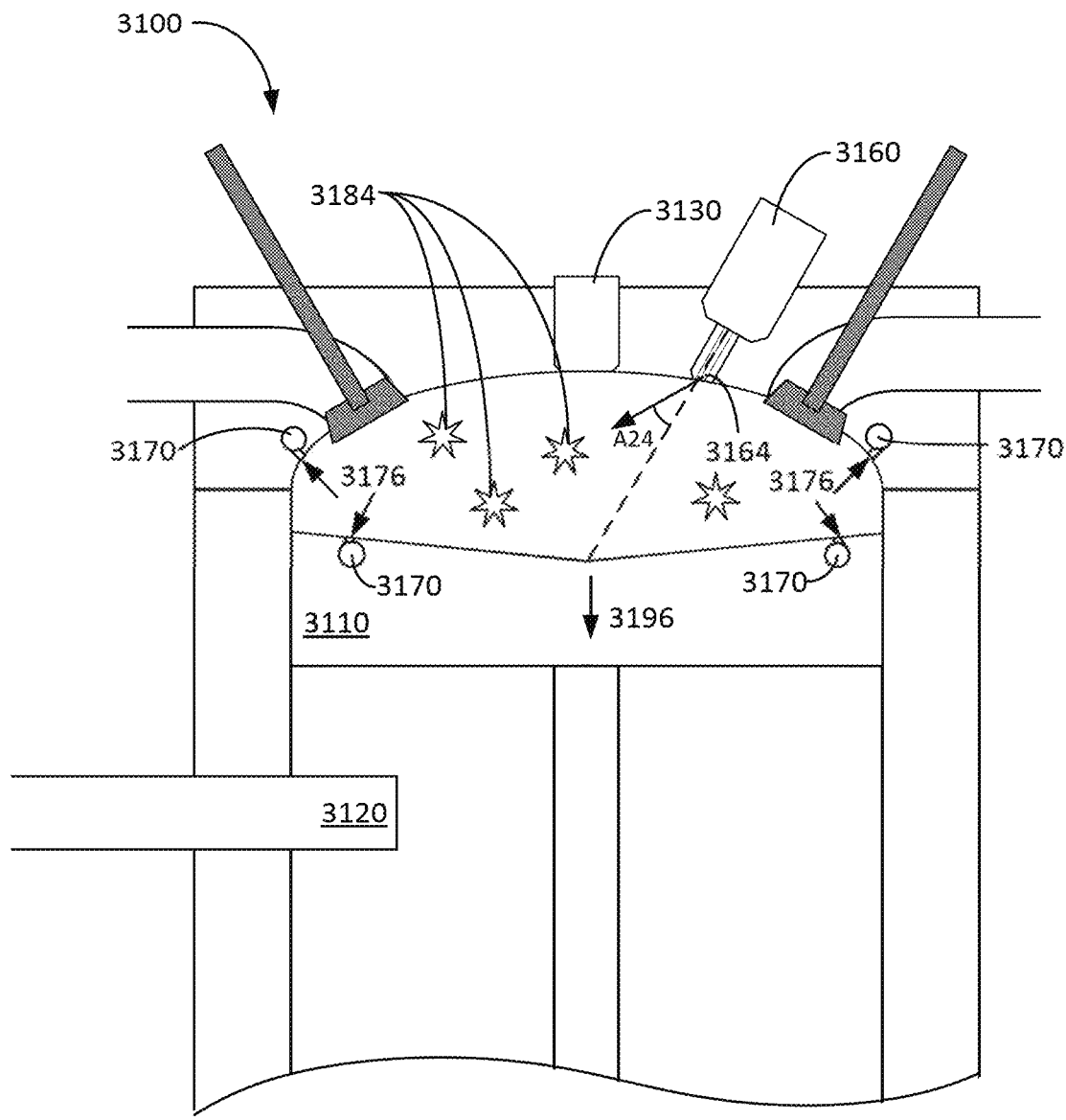

FIG. 28B depicts the process shortly after the middle of main compression. As compression continues in the direction 3192, the RS and the gases in the MCC 3117 undergo additional mixing. Compression can cause pressure rises and pressure-induced temperature rises. Accordingly, the activity of the RS in the MCC 3117 can increase during this period. Pressure differences can form between the MCC 3117, RCG 3160, and M-Cs 3160 and gases in the MCC 3117 can be transferred into the RCG 3160 and the M-Cs 3170, as depicted via arrows 3168 and 3174. At this stage, the mixture in the RCG 3160 can be fuel rich. The fuel rich mixture can contain remnants of RS carried over from an earlier cycle.

FIG. 28C depicts RCG spark ignition and ERI in the MCC 3117. After the RCG spark ignition, the ignited jet can expand out of the RCG 3160 at a high velocity through the QS 3164, which can be configured to quench the jet. The quenched jet can be rich in RS, and as this RS-rich jet from the RCG 3160 exits the QS 3164 and travels across a CV of the MCC 3117, local combustion can start. This process can continue in one or more locations 3184 as the flame front propagates.

Figure 28D:
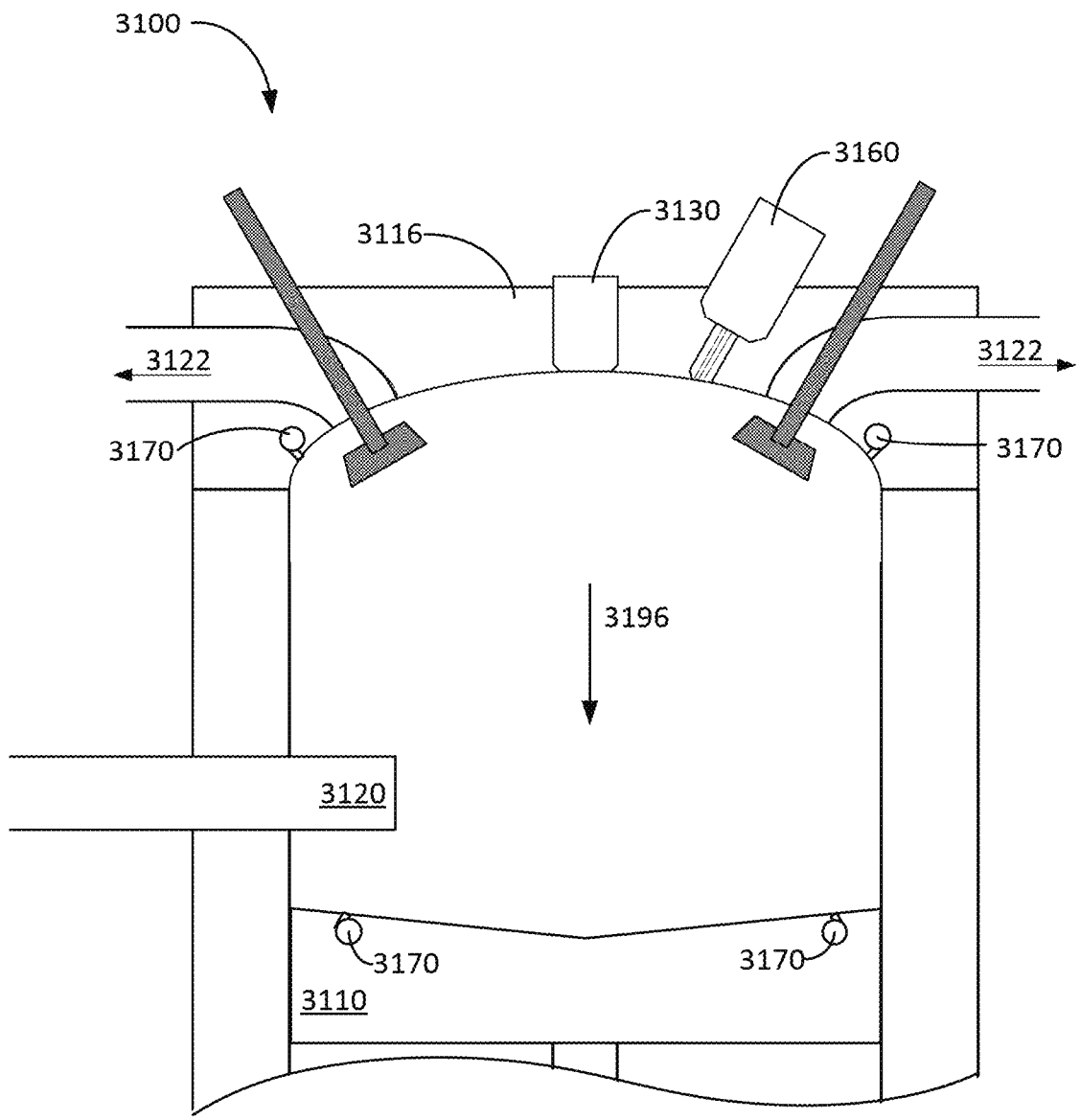
Figure 29A:
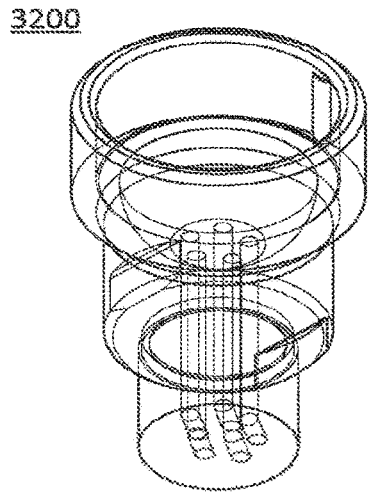
FIGS. 29A-29D illustrate an example QS section of an RCG, according to embodiments.
Figure 29B:
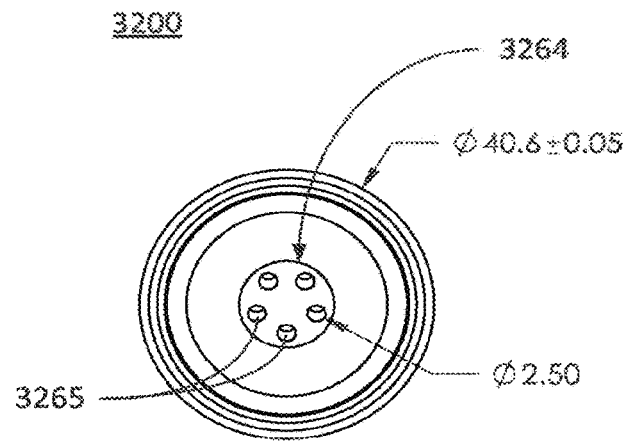
Figure 29C:
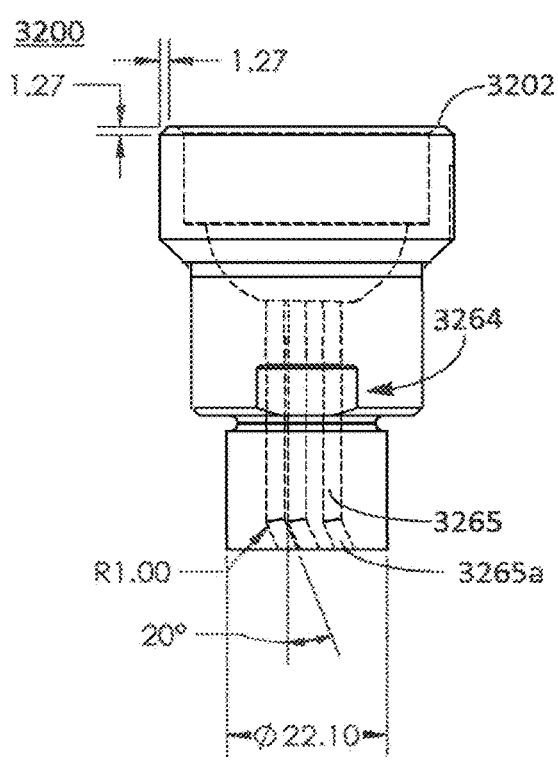
Figure 29D:
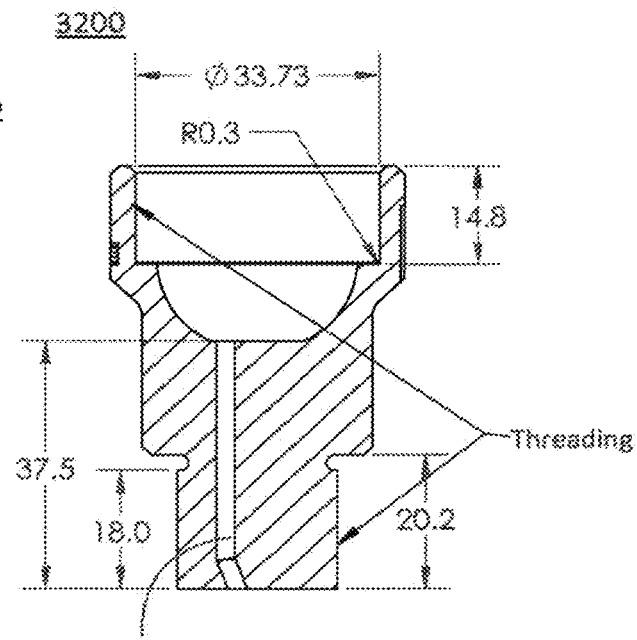
Figure 30A:
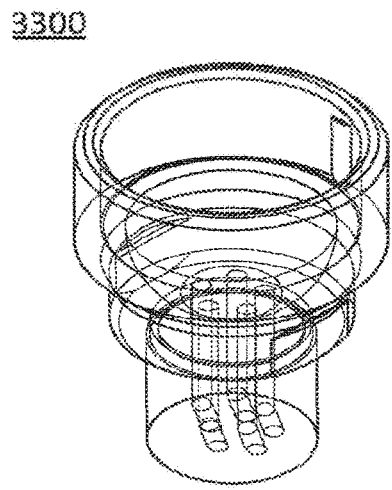
FIGS. 30A-30D illustrate an example QS section of an RCG, according to embodiments.
Figure 30B:
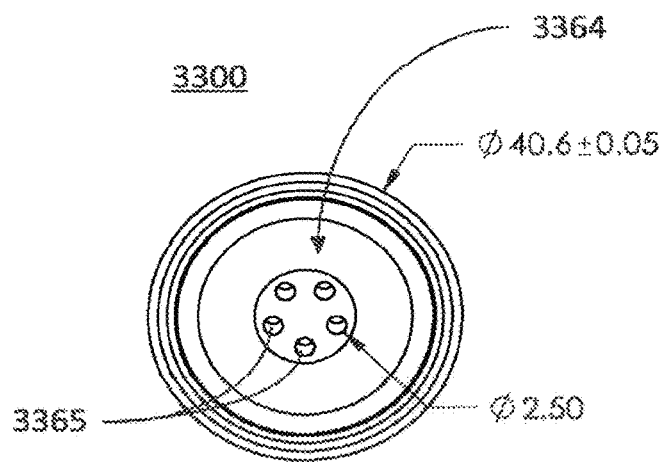
Figure 30C:
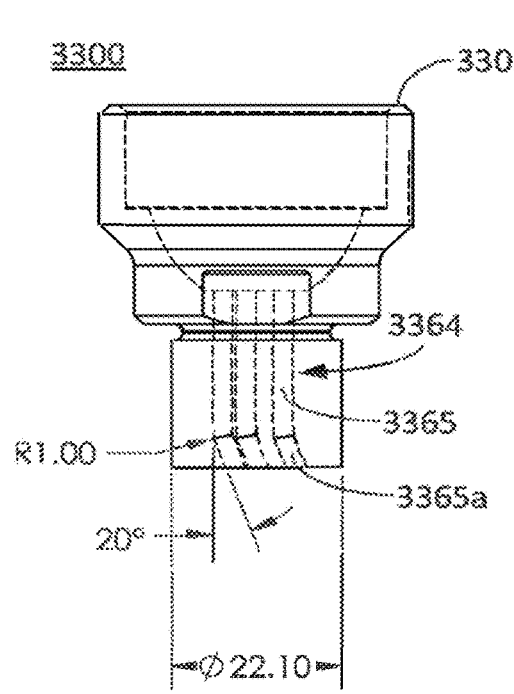
Figure 30D:
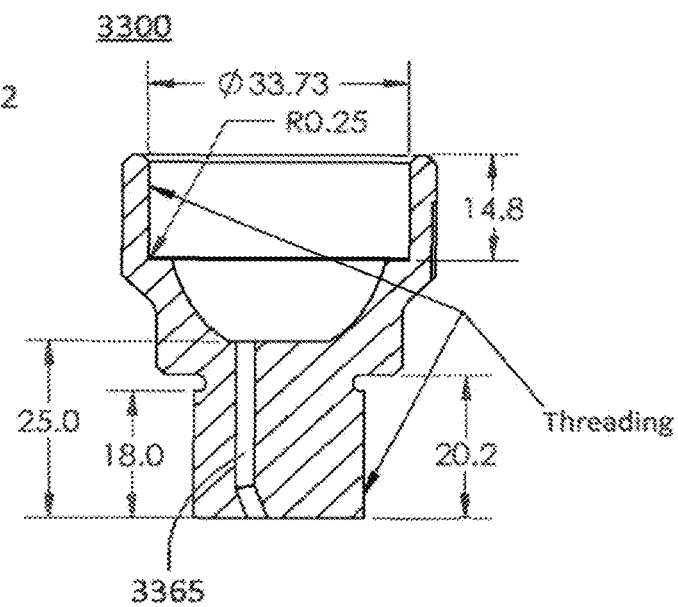

FIG. 28D illustrates mid-to-late portions of an expansion phase, e.g., as the piston 3110 moves downwards along the arrow 3196. Due to the rapid pressure rise in the MCC 3117 during the expansion phase of the cycle, OH and energy are driven into the RCG 3160 and the M-Cs 3170, as represented by arrows 3176 in FIG. 4C, thereby setting the stage for additional RS generation that can enhance the next combustion cycle. During mid-to-late portions of the expansion phase, new RS can be generated in the RCG 3160 and M-Cs 3170. The cycle can then repeat. The exhaust valves 3123a, 3123b can open and allow exhaust gases to exit the MCC 3117 via the exhaust ports 3122a, 3122b during expansion.

Figure 22:
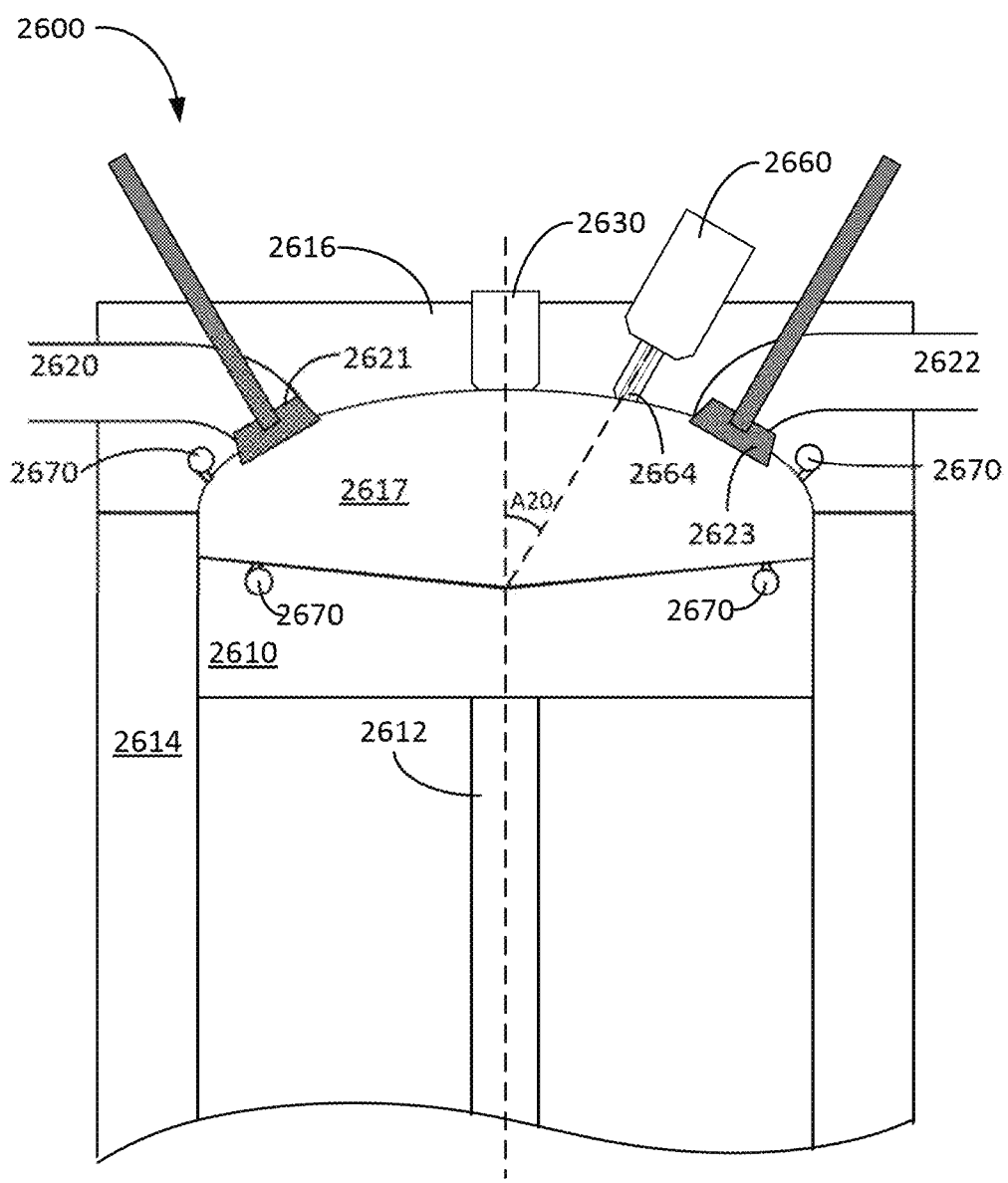
FIG. 22 depicts is a schematic diagram of an example internal combustion engine, of the type commonly known as a "four-stroke" engine, according to embodiments.

FIG. 22 depicts an example of a four-stroke internal combustion engine 2600, including an RCG 2660 and a set of M-Cs 2670. While a single RCG 2660 and a plurality of M-Cs 2670 are depicted in FIG. 22, it can be appreciated that any number of RCGs 2660 and/or M-Cs 2270 can be used in embodiments described herein. The engine 2600 can include one or more components that are structurally and/or functionally similar to those of other engines described herein (e.g., engine 200). For example, the engine 2600 can include a piston 2610, a rod 2612, a cylinder 2614, a head 2616, a MCC 2617, and a fuel delivery control device 2630 (e.g., a fuel injector or valve). But unlike two-stroke engines as described herein (e.g., engine 200), the four-stroke engine 2600 includes an air inlet or intake port 2620 that is controlled (e.g., opened and closed) by an intake valve 2621 and an exhaust outlet or exhaust port 2622 that is controlled (e.g., opened and closed) by an exhaust valve 2623. The intake port 2620 and the exhaust port 2622 can be located in the head 2616 of the engine 2600.

Similar to other engines described herein, the RCG 2660 can be mounted to the head 2616, e.g., via a screw-in connection and/or flange-type arrangement. In some embodiments, the RCG 2660 can be installed in an existing port of the engine 2600, e.g., a port for a PCC or other engine component that has been removed. In some embodiments, the RCG 2660 can be installed at an angle A20 relative to a centerline of the engine, as depicted in FIG. 22. When installed at an angle (e.g., angle A20), the RCG 2660 can be equipped with one or more orifices that are angled with respect to angle A20, e.g., by an angle A22 as depicted in FIG. 23C. In some embodiments, the RCG 2660 can include a plurality of orifices that can be set at different angles. The angling of the orifices of the RCG 2660 can be set to enable sufficient distribution or dispersion of RS being injected into the MCC 2617 of the engine 2600 during a combustion cycle. In some embodiments (e.g., with an Ajax or GMV engine), A20 can be about 0 to about 70 degrees, including all subranges and values in-between, and A22 can be about 0 to about 40 degrees, including all subranges and values in-between.

Similar to other engines described herein, the M-Cs 2670 can be incorporated into a periphery of the head 2616 and/or a periphery of the piston 2610. Alternatively, in some embodiments, the engine 2600 may not include M-Cs 2670, or the M-Cs 2670 may be incorporated into the periphery of the head 216 and not the periphery of the piston 210, and vice versa.

Collectively, the RCG 2660 and the M-Cs 2670 can provide RS to the MCC 2617 for inducing ERI, as further described with reference to FIGS. 23A-23E. Starting at FIG. 23A, the intake valve 2621 can open and air or a mixture of air and fuel can transfer into the MCC 2617. The piston 2610 can be moving in an expansion phase, e.g., toward BDC, as represented by arrow 2691. Additionally, a portion of RS generated during a previous cycle can be transferred from the RCG 2660 and the M-Cs 2270 into the MCC 2717, as illustrated by arrows 2672, 2666. The RS can be transferred via connecting vents or orifices. The transferred RS can mix with retained gases and intake gases, e.g., the incoming air or fuel-air mixture, in the MCC 2617.

Figure 23A:
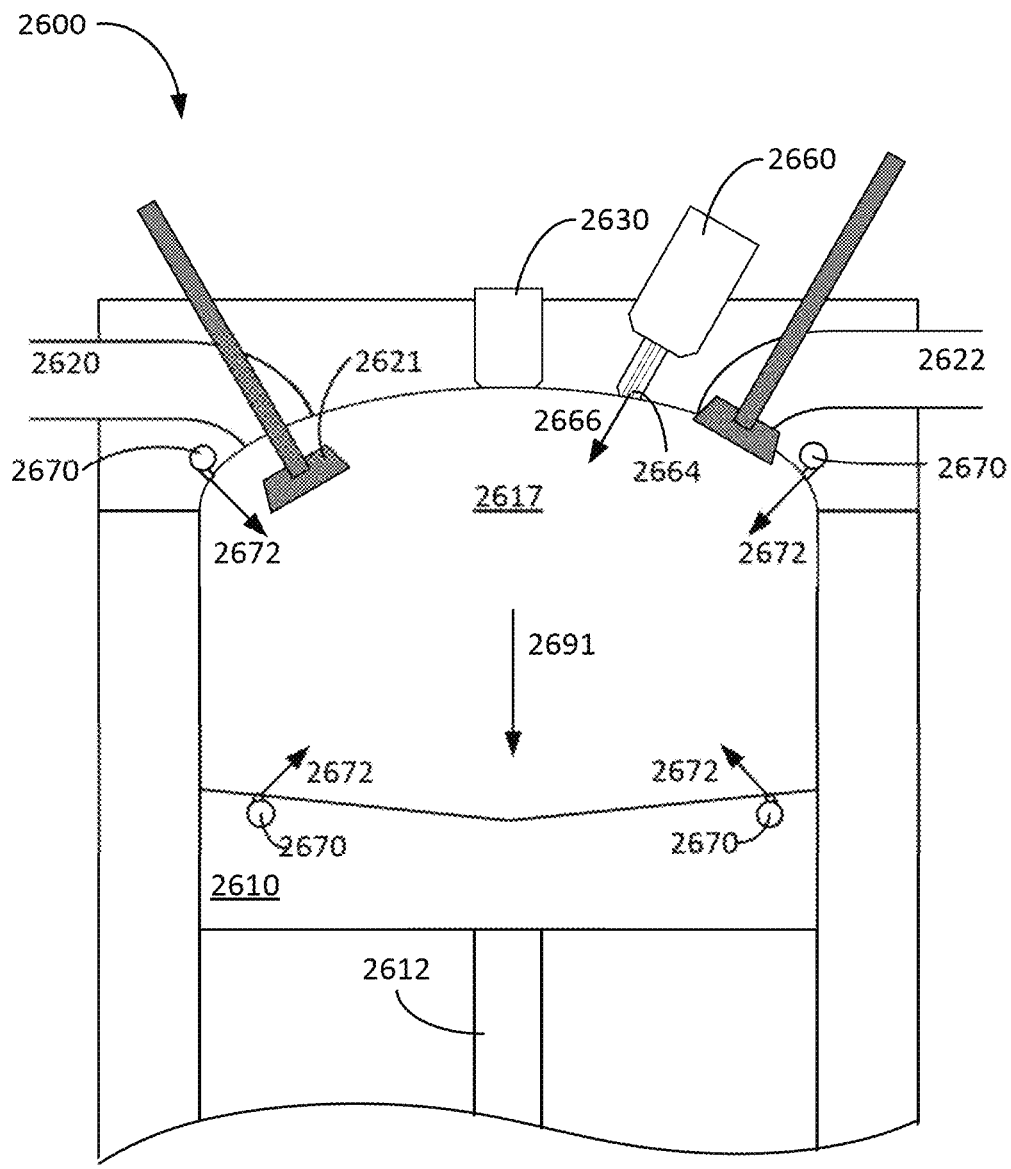
FIGS. 23A-23E illustrate an operation of the four-stroke internal combustion engine during an ignition cycle, according to embodiments.
Figure 23B:
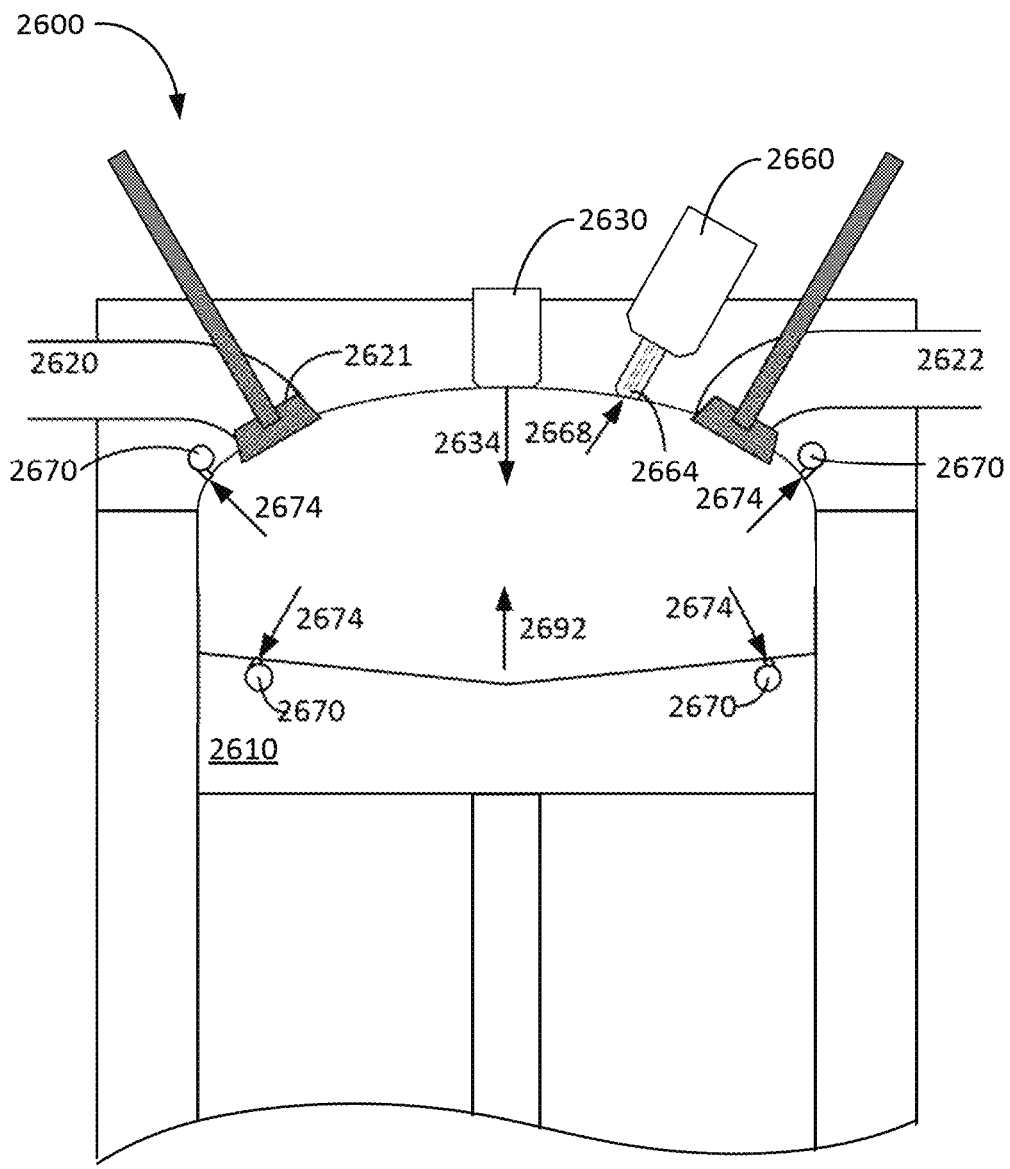
Figure 23C:
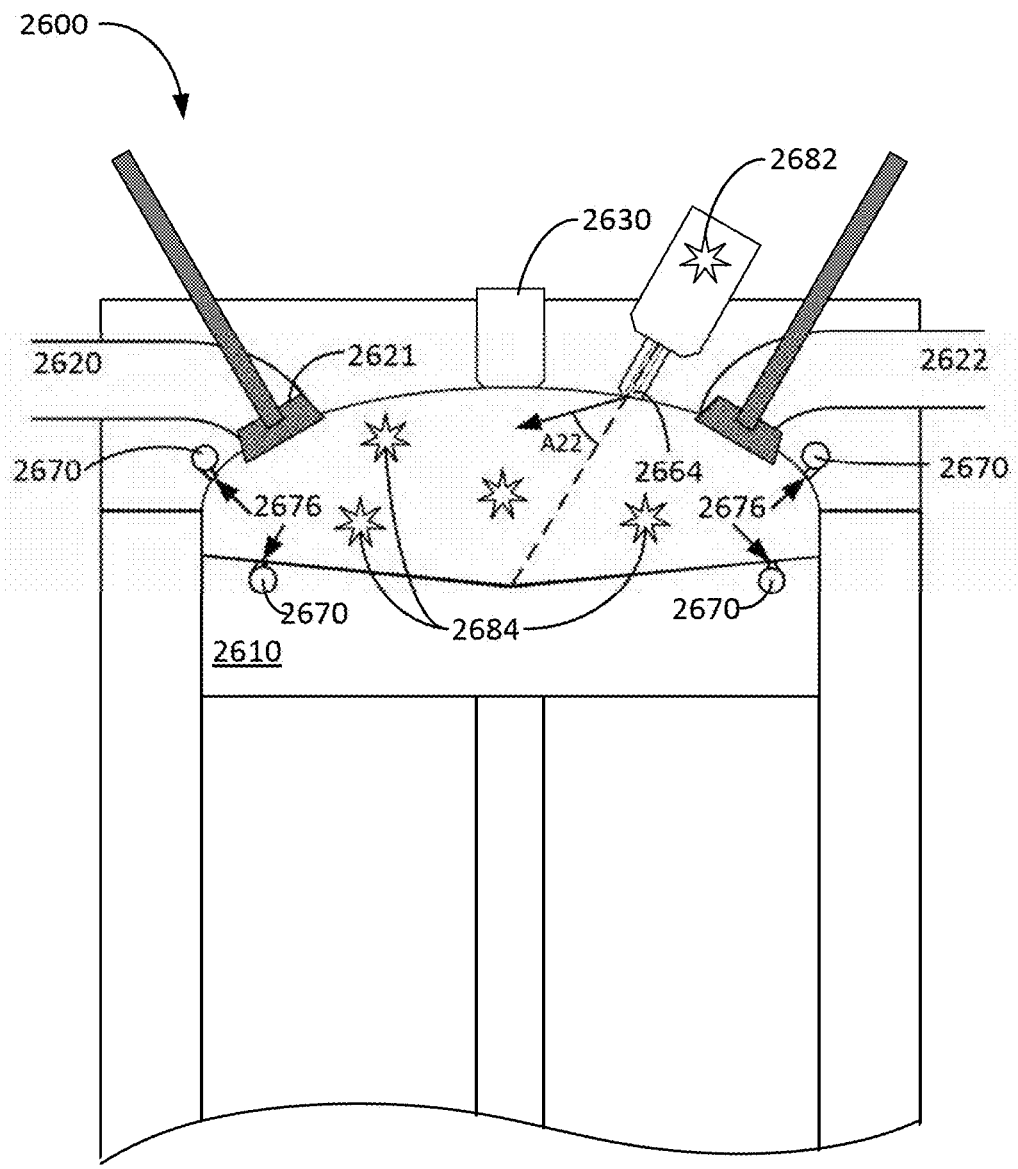

In FIG. 23B, the piston 2610 can be moving in a compression phase, e.g., toward TDC, as represented by arrow 2692. The intake valve 2621 can be closed. The present of RS in the MCC 2617 during the phase can cause early generation or production of additional RS. Such early build-up of RS can enhance and enable an altered chemistry in a flame-front propagation process of the engine 2600 when ignited. As compression continues in the direction 2692, the RS and the gases in the MCC 2617 undergo additional mixing. Compression can cause pressure rises and pressure-induced temperature rises.

At a point prior to a middle of the compression, fuel can be injected into the RCG 2260. During mid to late main compression, fuel can be injected into the MCC 2617, as schematically depicted using arrow 2634. During late main compression, the injected fuel can mix with the RS in the MCC 2617. During late to end of main compression, the previous cycle RS from the RCG 2660 and the M-Cs 2670 and retained in the MCC 2617 can induce pre-ignition activity, thereby preparing the mixture in the MCC 2617 for the jet of RS from the RCG 2660 to induce ERI. During compression, if the engine 2600 included a second RCG for fumigation, the second RCG can ignite and inject a first amount of RS into the MCC 2617, further seeding the fuel-air charge in the MCC 2617 with RS for enhancing ERI.

In FIG. 23C, the RCG 2660 undergoes spark ignition 2682, which causes a quenched jet of RS to disperse from the RCG 2660 and into the MCC 2617. The quenched jet can enter the MCC 2617 at high velocities through a QS 2664 of the RCG 2600. The QS 2664 an be configured to quench the jet. The jet of RS can induce ERI or a combustion event within the MCC 2617. The combustion can initiate at one or more locations 2684 throughout the MCC 2617.

Figure 23D:
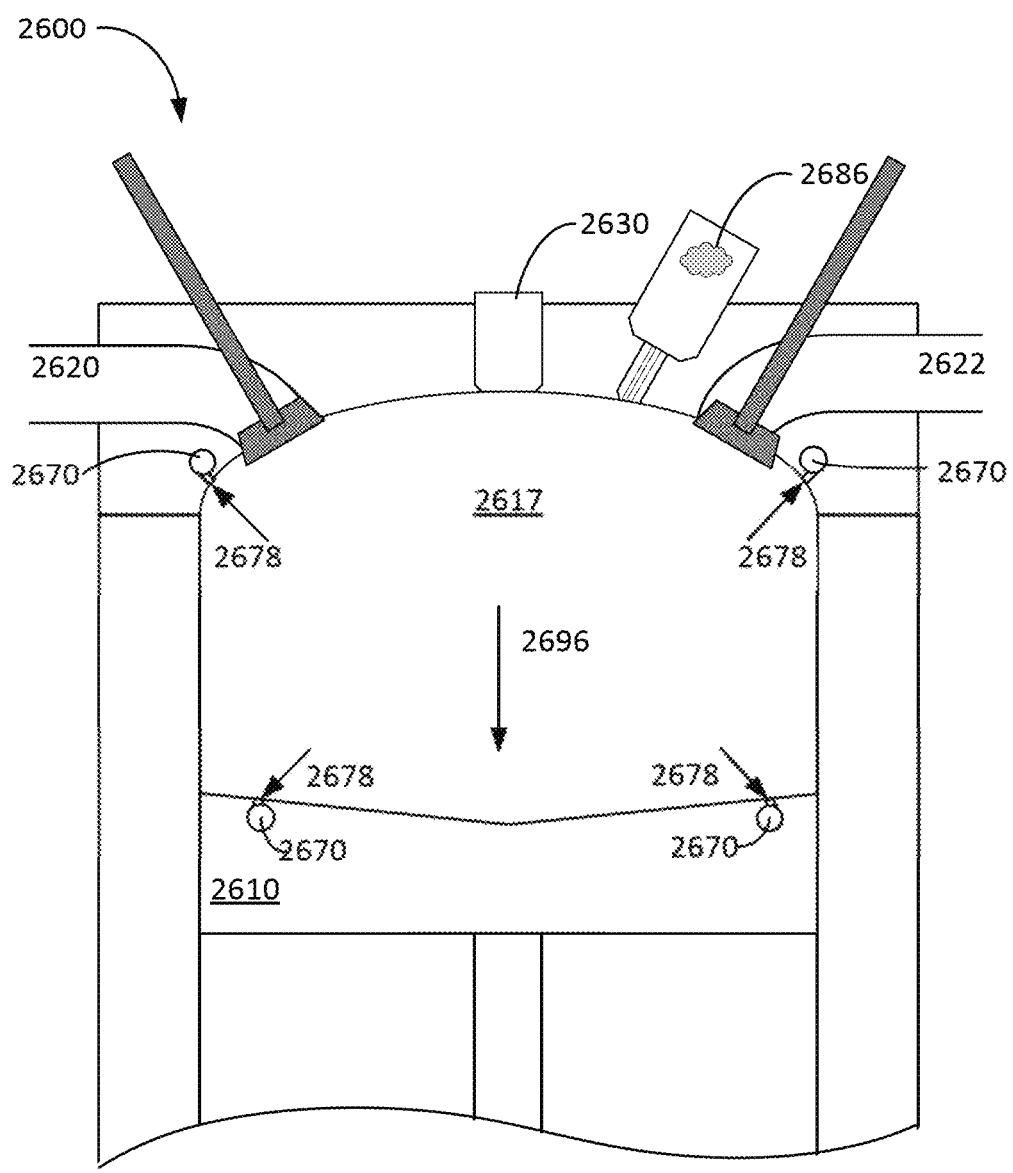
Figure 23E:
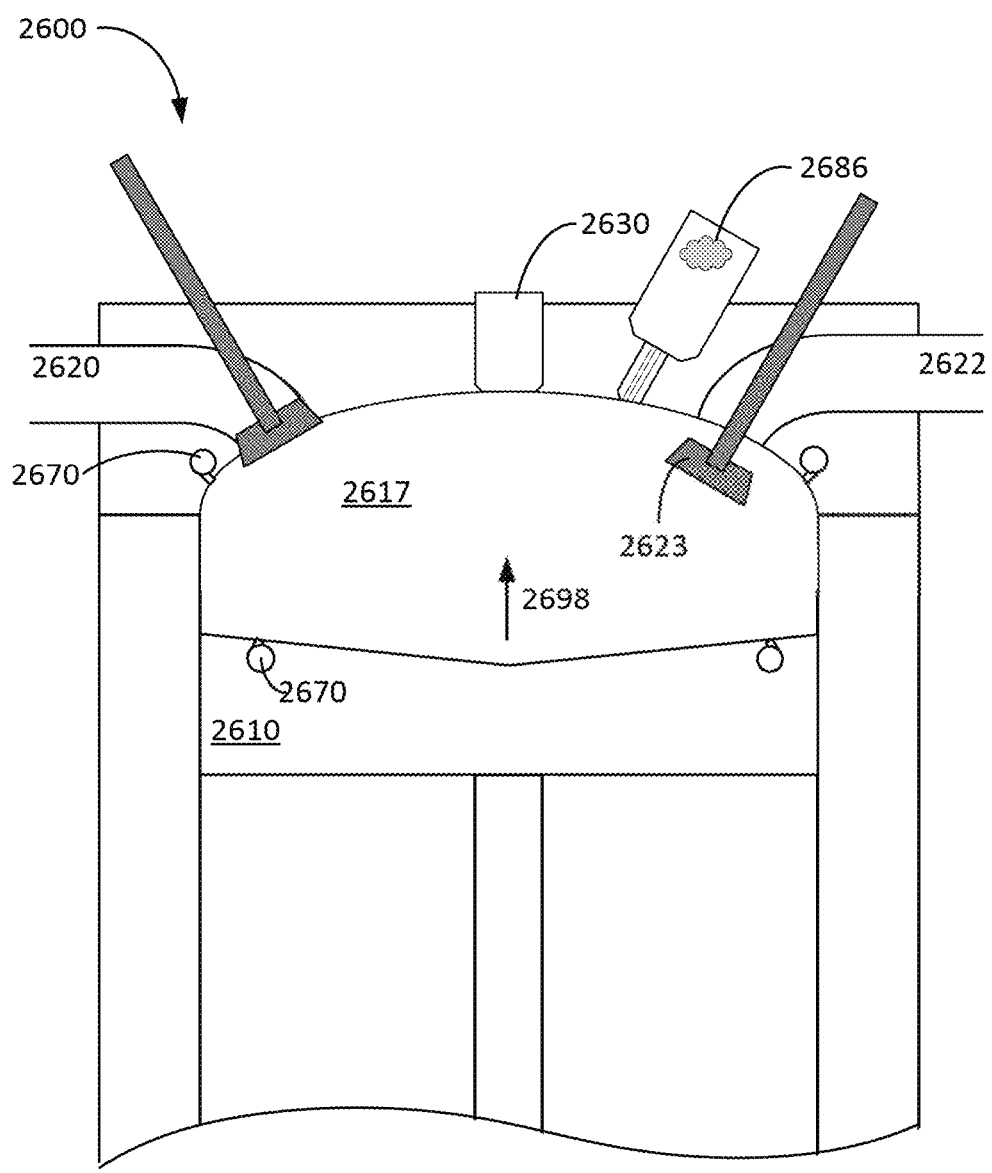

FIG. 23D illustrates mid-to-late portions of an expansion phase, e.g., as the piston 2610 moves downwards along the arrow 2696. Due to the rapid pressure rise in the MCC 2617 during the expansion phase of the cycle, OH and energy are driven into the RCG 2660 and the M-Cs 2670, as represented by arrows 2676, 2678, thereby setting the stage for additional RS generation that can enhance the next combustion cycle. During mid-to-late portions of the expansion phase, new RS can be generated 2686 in the RCG 2660 and M-Cs 2670. FIG. 23E then illustrates a second compression phase of the piston 2698, as represented by arrow 2698, where the exhaust valve 2623 is opened and gases within the MCC 2617 are transferred out of the MCC 2617 via exhaust outlet 2622. The cycle can then repeat, starting at FIG. 23A.

Figure 26:
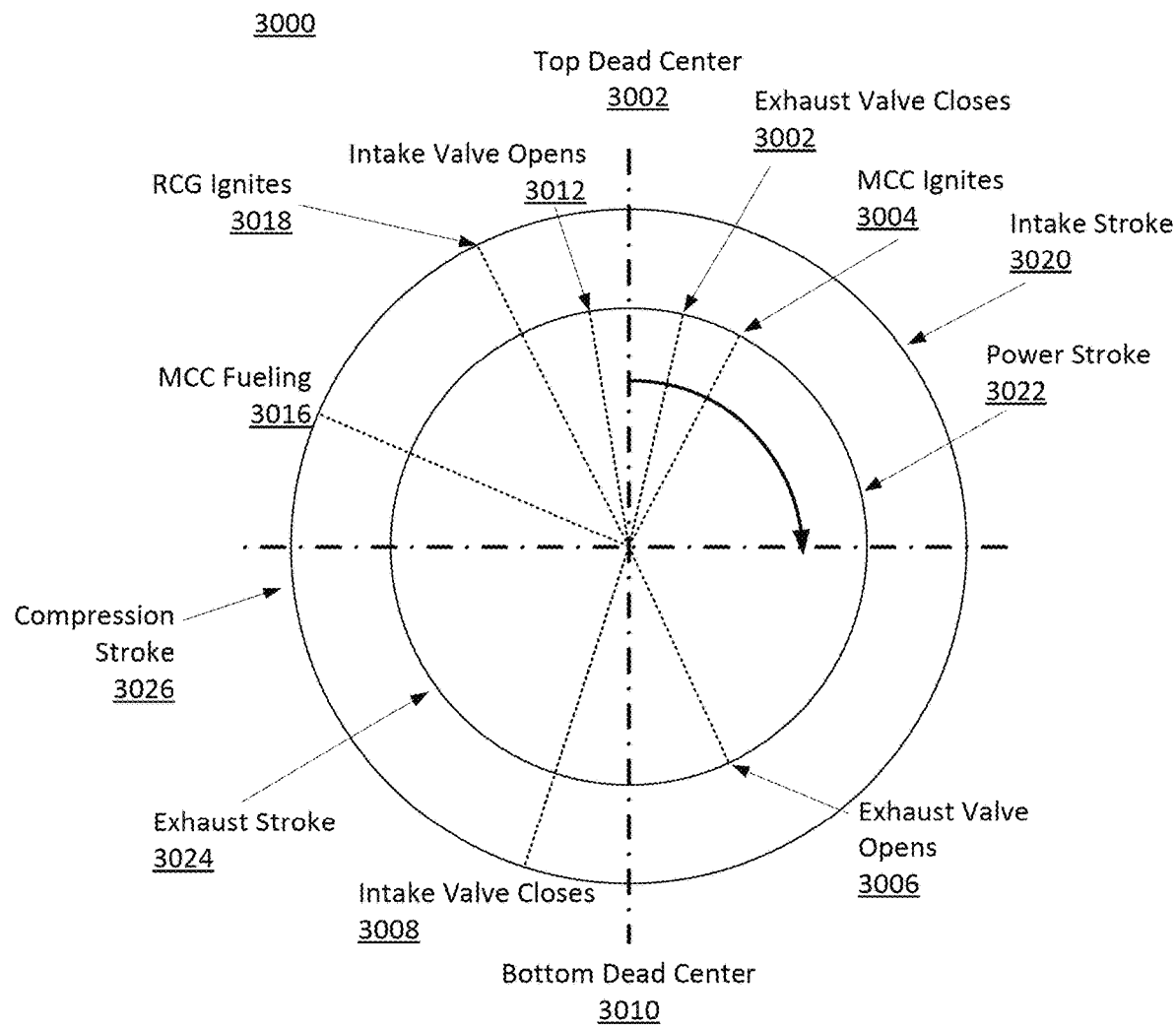
FIG. 26 depicts events during an ignition cycle of an example four-stroke internal combustion engine, according to embodiments.

FIG. 26 schematically illustrates events during a combustion cycle of a four-stroke engine, according to embodiments herein (e.g., engine 2600). As depicted in FIG. 26, a MCC fuel-air charge of the engine can ignite, at 3004, after a piston moves past TDC 3002 and into a power stroke phase 3022. Similar to a two-stroke engine, as described herein, the MCC fuel-air charge can ignite with LOPP within a desirable range or at a desirable value. The exhaust valves can be closed at 3002 and can open at 3006. The piston then moves past BDC 3010 and the cycle enters the exhaust stroke phase, during which exhaust gases can exit from the MCC of the engine via the exhaust ports. After the piston moves past TDC 3002 and enters the intake stroke phase 3020, the intake valves, which are opened at 3012, can allow air to enter into the MCC. After the piston again moves base BDC 3010, the cycle can move into the compression stroke phase 3026 and the intake valves can close at 3008. MCC fueling then occurs, at 3016, and a fuel-air charge in an RCG of the engine can be ignited, at 3018. While not depicted in FIG. 26, during exhaust, intake, and early main-compression, naturally occurring pressure differences between the MCC and RCG (and optionally M-Cs of the engine) can cause RS transfer and build-up in the MCC. This RS buildup, along with the main RS charge from the RCG ignition, at 3018, can then induce ERI, at 3004.

Improvements to Engines Using ERI

As described above, ERI initiates combustion through chemical mechanisms, i.e., by introducing partial combustion products that are rich in highly reactive RS. While some existing engines may destroy these RS during a combustion cycle, the RCGs and M-Cs in an ERI-configured engine, such as those described herein, can control and enhance the production, storage, and transfer of RS for adapted augmentations (seeding) of each combustion cycle (i.e., a current and follow-on cycle) in the MCC. These augmentations are responsive to changing engine operating conditions.

In some embodiments, ERI can be induced using one or more RCGs without the use of M-Cs. For example, the use of M-Cs in some small-medium bore engine types and configurations may not be required because the RCG device can induce stable ERI and combustion propagation under leaner fuel conditions for reduced engine STDEV and COV.

In some embodiments, ERI can be induced using one or more RCGs with one or more passive M-Cs (e.g., M-Cs 170, 270). The passive M-Cs can be connected to a MCC, and can assist in production and inter-cycle storage of RS and their transfer to the MCC for use in augmenting ERI ignition of the fuel-air charge in the MCC. The use of M-Cs in the ignition process can shift the initiation of combustion from a thermally initiated, fuel-oxidation process to a hydroxyl radical (OH and other RS), chemical fuel-decomposition process. Such can lower the energy required for ignition and sustained combustion, enabling leaner and more stable combustion of an internal combustion engine.

The controlled presence of RS in an ERI-configured engine can increase the ignitability of the fuel-air mixture by modifying and augmenting the chemistry of a flame-front driven combustion process. ERI chemistry causes the initial combustion in the advancing flame front to occur, e.g., via hydroxyl radical (OH) fuel decomposition, at lower temperatures and under leaner fuel-to-air conditions (e.g., lower fuel-to-air ratios) when compared to existing fuel oxidation processes.

In engines using spark plugs, PCC sparks, or flame ignition, combustion typically occurs in the center of the clearance volume (CV) of the MCC and propagates radially outward. This expanding combustion process can push unburned fuel into the crevice volume around the periphery of the piston and cylinder wall of the engine, which presents a major source of CH2O and other UHC (e.g., methane) emissions. In some embodiments, two RCGs can be used where one RCG acts to fumigate the MCC with RS in advance of the ignition event initiated by the other RCG. This RS fumigation event can seed the MCC fuel-air charge improving its ignitability, enhancing combustion, and reducing emissions. FIGS. 20 and 21, further described below, depict the timing of the fumigation and ignition by the two RCGs. If the engine configuration is augmented with one or more M-C(s) (e.g., located in the periphery of the head and/or piston bowl) or a second RCG for fumigation, this can induce ERI with a combustion process that initiates in a more distributed manner throughout the CV. In some embodiments, M-Cs can be incorporated into the head or piston using 3-D printed screw-in plugs that fit into machined threaded cavities in the head or piston (e.g., as depicted in FIG. 6). These M-C screw-in plugs incorporate an M-C nozzle and chamber, as further described with reference to FIG. 6. Desirably, the M-Cs can be arranged around a periphery of the piston and/or head to further enhance ERI. This configuration of M-Cs along with the RCG(s) facilitates a more volumetric and distributed mode of combustion; e.g., the combustion process can begin more around the periphery of the cylinder and proceed inward and/or begin at multiple locations throughout the CV. This results in more complete combustion of the fuel-air charge in the MCC and result in a reduction in UHC such as CH4 which can significantly reduce GHG emissions of the engine.

HPC SIM has shown that existing PCC designs can exhibit poor mixing of fuel-air charges within a chamber of the PCC. Poor mixing of fuel-air charges can result in incomplete and inefficient combustion within the PCC chamber and can contribute to higher NOx generation and degradation of MCC ignition and combustion. With RCG devices described herein, greater mixing of fuel-air charges can be achieved, e.g., using RCG QS orifices that are angled as they lead into the RCG mini-volume, as further described with reference to FIG. 10. For example, HPC SIM shows that angled RCG QS orifices can produce a swirling of air as it is forced through the RCG QS during a piston upstroke, which can lead to more mixing of the air with the fuel and enable more precise control of the RCG ER (e.g., ratio of actual fuel-to-air ratio relative to the stoichiometric fuel-to-air ratio), which in turn can result in a more homogeneous combustion process and control over the production of RS necessary for inducing ERI in the MCC.

In tests, several RCG designs have been demonstrated to work in a legacy-class slow speed Cooper Bessemer 14" bore natural gas engine (herein referred to as the "Test Engine") without a spark device other than the ignition source mounted in the RCG, e.g., without a MCC spark plug or PCC ignition source. During the tests, the Test Engine was configured to start and run with the RCGs providing ignition and initiation of combustion and without other sources of ignition and/or initiation of combustion. The tests were performed with the Test Engine at full rated speed (i.e., 300 RPM) and 100% load (i.e., 440 horsepower (HP)) and at 110% speed (i.e., 330 RPM) and 110% load (i.e., 484 HP). For performance comparison, the baseline engine configuration with original equipment manufacturer (OEM) PCCs was run with the same settings. The results of the tests demonstrated that the Test Engine equipped with RCGs can produce lower NOx emissions across all operating conditions, e.g., to amounts as low as 0.03 grams per brake horsepower-hour (gr/bhp-hr). The results of the tests also demonstrated that the Test Engine equipped with RCGs can reduce formaldehyde to amounts as low as 8 parts per million (ppm). The results of the tests also demonstrated that the Test Engine equipped with RCGs provided increased fuel economy compared to baseline by over 6.9% with engine COVs (e.g., a measure of engine stability) being below 5.0%.

Figure 31:
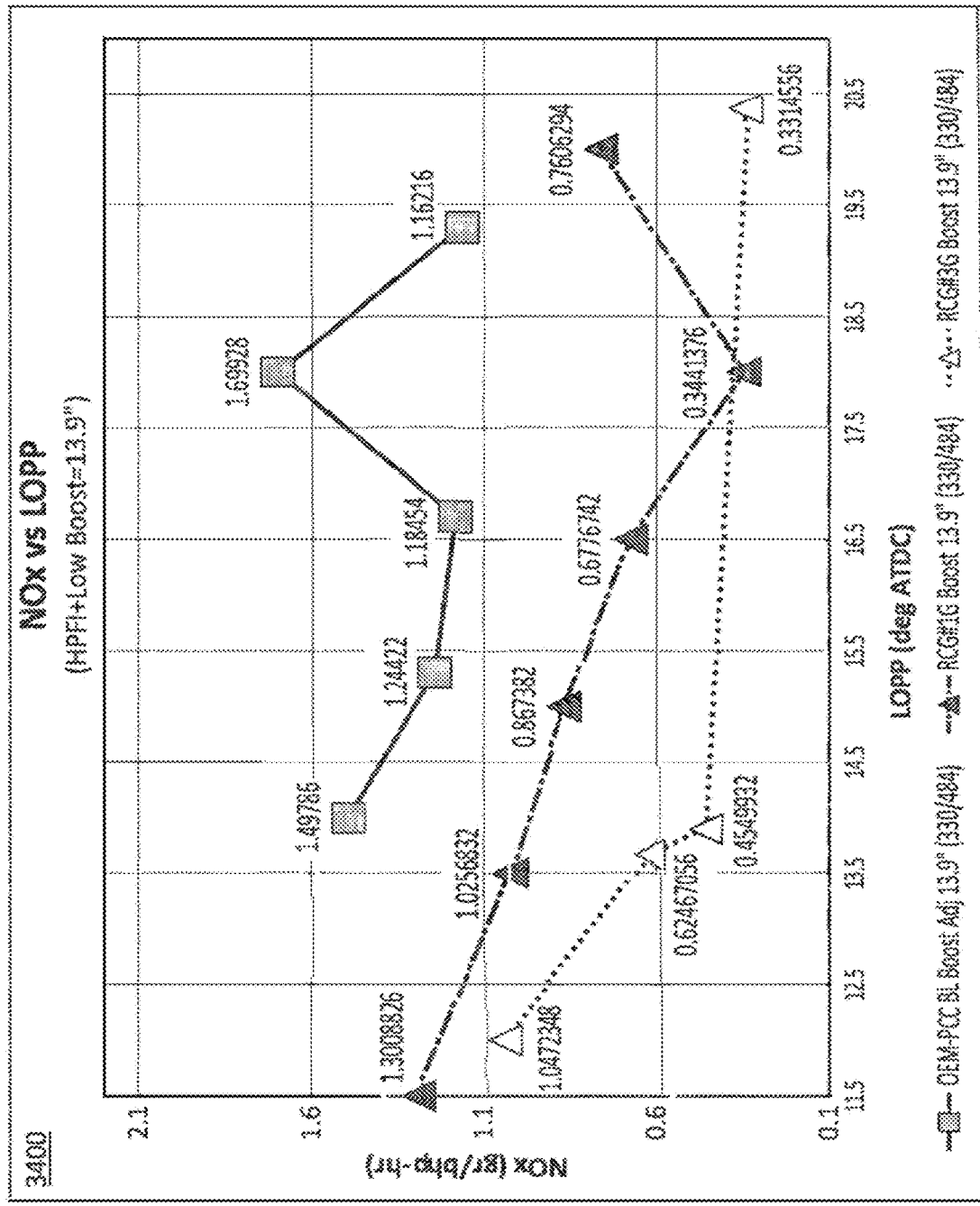
FIG. 31 illustrates a plot of NOx vs. Location of Peak Pressure (LOPP) test data of internal combustion engines operating under high-pressure fuel injection (HPFI) and low boost conditions, according to embodiments described herein.
Figure 32:
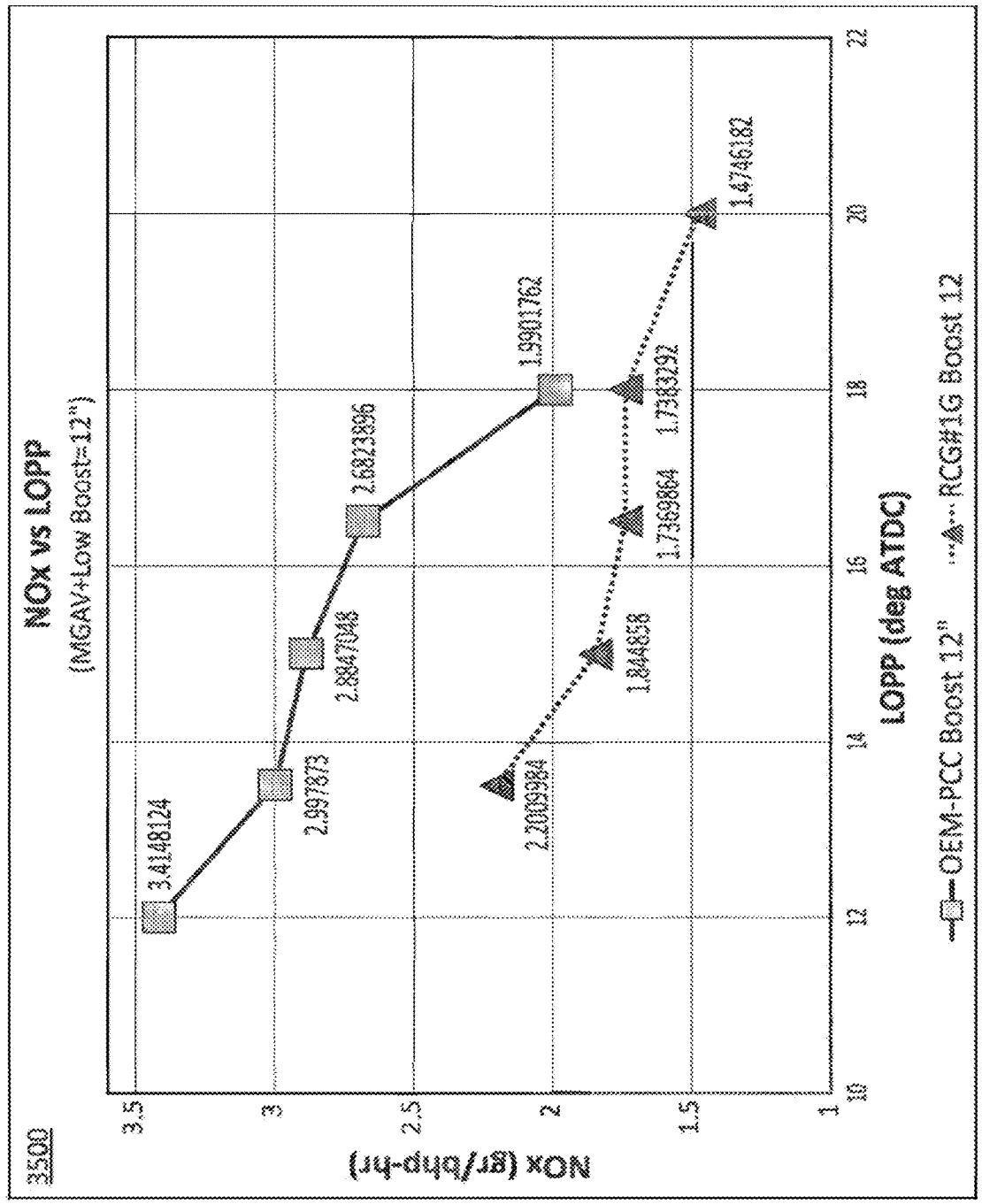
FIG. 32 illustrates a plot of NOx vs. LOPP test data of internal combustion engines operating under standard low-pressure mechanical gas admission valve and low boost conditions, according to embodiments described herein.
Figure 33:
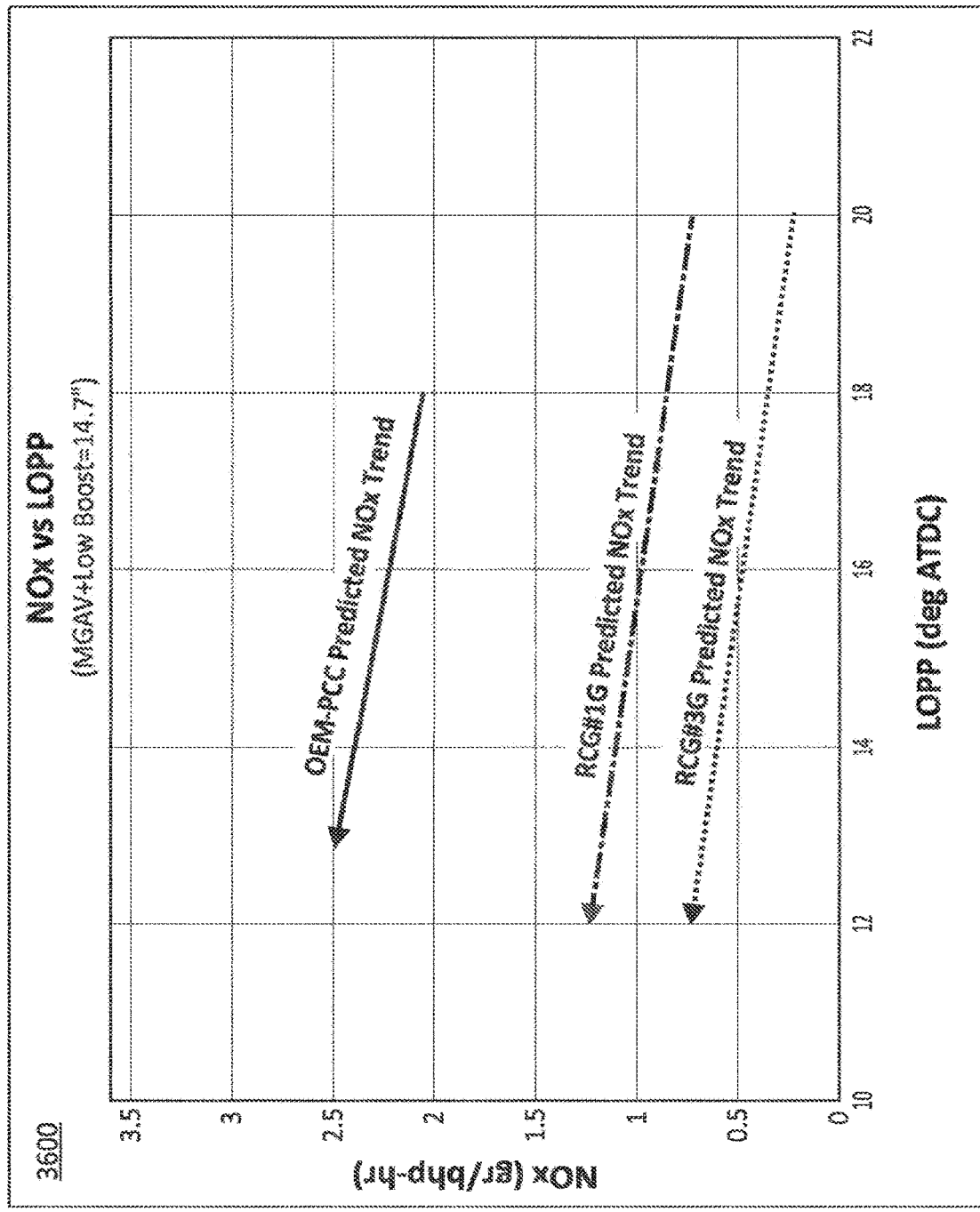
FIG. 33 illustrates a plot of NOx vs. LOPP predicted data of internal combustion engines operating under mechanical gas admission valve and medium boost conditions, according to embodiments described herein.

FIGS. 31-33 are plots 3400, 3500, 3600 depicting NOx test data from the tests conducted with the Test Engines described above. Specifically, FIGS. 31-33 depict NOx within the engines at different LOPP for the following engines: (1) the baseline engine equipped with a PCC (OEM-PCC), (2) a Test Engine equipped with a RCG having a QS with a longitudinal length of 37.5 mm (e.g., as depicted in FIGS. 29A-29D) (RCG #1G), and (3) a Test Engine equipped with a RCG having a QS with a longitudinal length of 15 mm (e.g., as depicted in FIGS. 30A-30D) (RCG #3G). In the tests, each engine was run at different LOPP and the resulting NOx within the engine was measured using a sensor and averaged over a number of cycles.

For the data in plot 3400 (FIG. 31), the engines were run under high-pressure fuel injection (500 psi) and low boost (13.9") operating conditions. Compared to the baseline engine, the Test Engines equipped with RCG #1G and RCG #3G produced lower levels of NOx. Specifically, the Test Engine equipped with RCG #1G had about 30-50% reduction in NOx compared to baseline, and the Test Engine equipped with RCG #3G had about 50-70% reduction in NOx compared to baseline. For the data in plot 3500 (FIG. 32), the engines were run under mechanical gas admission valve (e.g., 30 psi) and low boost (12") conditions. As depicted in plot 3500, the Test Engine equipped with RCG #1G had about 25-35% reduction in NOx compared to the baseline engine. Plot 3600 (FIG. 33) depicts projected data for the engines operating at mechanical gas admission valve (e.g., 30 psi) and medium boost (14.7") conditions, to further show how the Test Engines equipped with RCG #1G and RCG #3G produced lower levels of NOx compared to the baseline engine. With lower LOPP, the NOx levels were observed to increase in all engines, but the RCG-equipped engines significantly reduced NOx relative to the baseline engines such that the NOx levels remained within desirable levels.

Engines equipped with the RCGs, such as the Test Engines described above, are capable of producing lower levels of NOx in part due to the lower combustion temperatures within the MCC of the engines. RS-induced ERI can produce combustion at temperatures less than 2000 degrees K, while traditional spark ignition can lead to temperatures of greater than 2000 degrees K, which leads to greater production of NOx.

Based on SIM data and test data, the following benefits of ERI-configured engines, as compared to existing or baseline engine designs (e.g., spark ignition engines), can be seen:

1. Emissions Reduction: Improvements over the baseline in the following (e.g., at low-load/speed and at full-load with improvement across operating range), with 3-5% improvement from combustion thermal efficiency and greater turbocharger efficiency improvements with no increase in greenhouse gases (GHGs), unburned hydrocarbons (UHCs):

NOx—reduction from 70% to over 95%

CO—Comparable to baseline with lower NOx as above.

$CO_2$ Equivalent (GHG including methane and UBH)—Lower with fuel economy improvement compared to baseline with lower NOx as above.

Formaldehyde)—Lower with fuel economy improvement compared to baseline with lower NOx as above.

2. Increased Combustion Stability:

Reduces combustion COV and STDEV by 50-75%

Restores LOPP, e.g., to original manufacturer specifications

Reduces PFP (e.g., the power cylinder peak pressure) requirements

Relaxes Boost Pressure requirements

Removes Need for High Pressure Fuel Injection Systems, e.g., can work with OEM low pressure fuel valves 3. Improved Thermal Efficiency, e.g., by 3-5%, resulting in:

Fuel savings over baseline of 5-12%

Improved Engine Lean-Combustion Limit

Reduced ER, e.g., by 10%

Lowers Mean and Peak Temperatures in MCC

4. Reduction in costs to re-design existing engines, e.g., to meet stricter emissions regulations or requirements for lower carbon footprint 5. Agnostic to fuel composition (e.g., any liquid or gaseous fuel composition), thereby enabling operation on variety of gaseous and liquid fuels 6. Improved reliability and reduced maintenance costs In some embodiments, ERI-configured engines can improve fuel ignitability. ERI is capable of igniting a wide range of fuels, including those that are historically difficult to ignite. Through physical testing and SIM, ERI has been demonstrated to significantly increase the ignitability of a large variety of fuels over an engine's entire operating range.

In some embodiments, ERI-configured engines can improve combustion stability and control. For example, ERI enables control of underlying chemical reactions. With spark ignition, combustion control can be lost when the flame front starts to propagate. Combustion may shift to oxidation at higher temperatures, but the presence of RS produces a flame front that is more uniform and stable. In oxidation-based flame fronts, rapid volumetric expansion causes some of the unburned fuel at the flame front to be expelled in one or more directions including into the crevice volume (i.e., the area around the piston periphery between the cylinder wall and the side of the piston), resulting in incomplete combustion of the fuel-air charge in the MCC. This unburned methane that passes through the MCC and out through the exhaust is referred to as "methane slip". Methane slip is a contributor to Greenhouse Gas (GHG) emissions from natural gas-fueled engines. In addition, ERI's greater stability and consistency provides control at the start of combustion. Such can translate into, for example, reduced STDEVs, COV of the PFPs, variance in the location of the peak pressure crank angles, etc.

In some embodiments, ERI-configured engines can reduce emissions. ERI chemistry can result in more efficient combustion that can reduce emissions such as, for example, NOx emissions, to near-zero amounts.

In some embodiments, ERI-configured engines can reduce pre-ignition and detonation. For example, these phenomena are commonly called "knock" and are a general characteristic of spark ignition (e.g., premixed charge spark ignition (PCSI), direct-injection spark ignition (DISI)) in internal combustion engines that operate at high fuel loads or fuel mixtures with high octane values.

The presence of RS in the MCC fuel-air charge can reduce pre-ignition and detonation. First, the RS can increase the ignitability of the fuel-air charge which can eliminate the need for fuel-rich conditions on start-up. Second, the RS can cause the flame front to move more stably because ignition along the moving path of the front can start at substantially lower temperatures since such ignition is via a hydroxyl radical (OH) fuel decomposition process instead of an oxidation process. Third, because the newly encountered mixtures along the flame front path are igniting at lower temperatures and under leaner fuel conditions, the rate of combustion of the fuel-air mixture within the flame front is less likely to lose control, resulting in stable and more complete combustion at the lower starting and peak temperatures. Fourth, there is a greater measure of control over the speed of the flame front and front propagation can be more regular from cycle-to-cycle. Fifth, the ERI augmentation process can reduce many of the other losses that are common to flame-front combustion, resulting in reductions in UHC.

FIGS. 37A-37G depict an internal combustion engine 4000, as well as RS injection and temperature distribution diagrams, according to various embodiments. As shown, the internal combustion engine 4000 includes coolant jackets 4004a, 4004b, a cylinder 4014 with a head 4016, an MCC 4017, QSs 4064a, 4064b of RCGs, and sleeves 4080a, 4080b. In some embodiments, the coolant jackets 4004a, 4004b, the RCGs, and the sleeves 4080a, 4080b can be the same or substantially similar to the coolant jacket 3904, the RCG 3960, and the sleeve 3980, as described above with reference to FIGS. 36A-36H. In some embodiments, the cylinder 4014, the head 4016, and the MCC 4017 can be the same or substantially similar to the cylinder 114, the head 116, and the MCC 117, as described above with reference to FIG. 2. Thus, certain aspects of the coolant jackets 4004a, 4004b, the cylinder 4014, the head 4016, the MCC 4017, the QSs 4064a, 4064b, and the sleeves 4080a, 4080b are not described in greater detail herein.

Figure 37A:
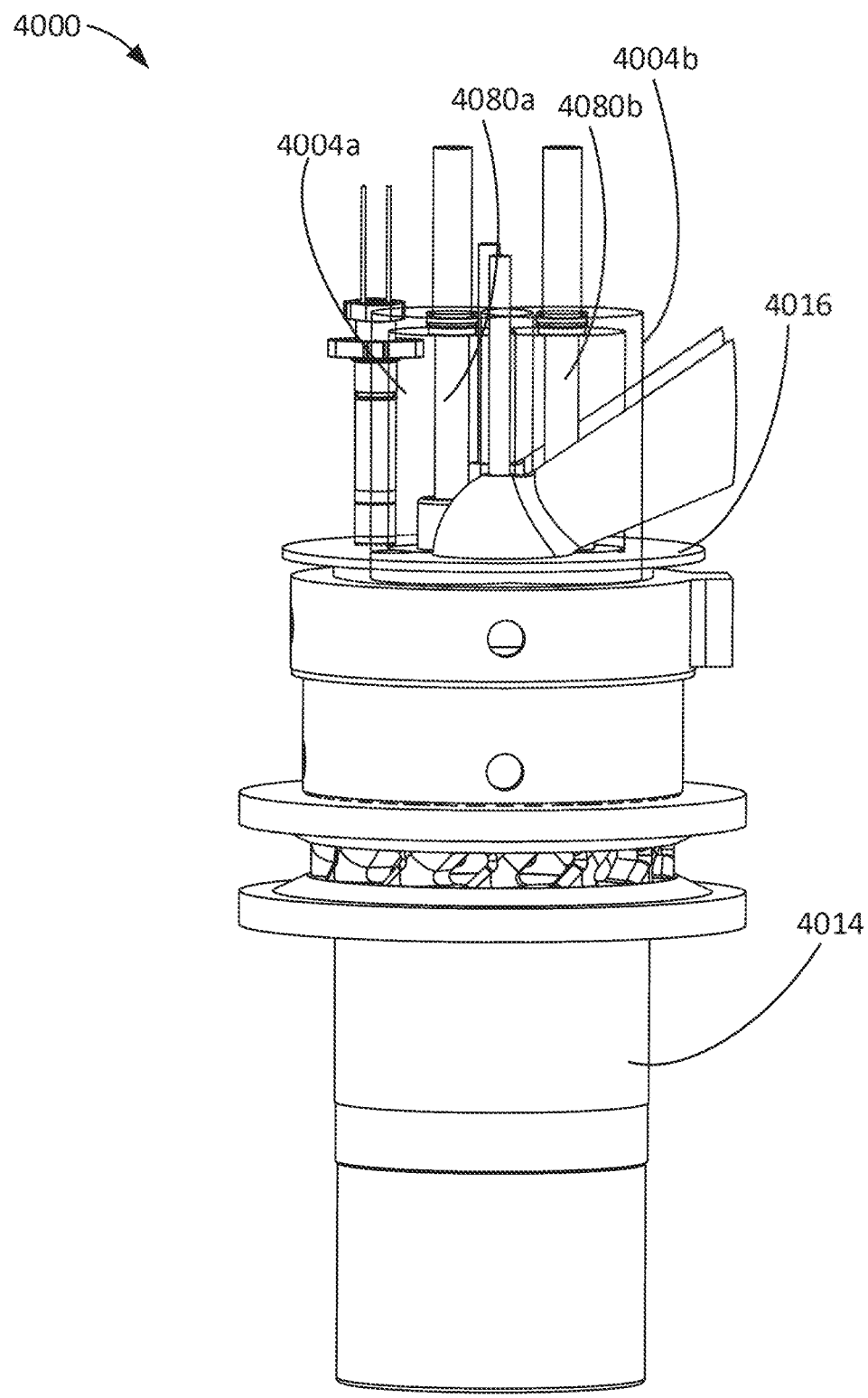
FIG. 37A depicts a perspective view of an internal combustion engine, according to embodiments.

FIG. 37A shows an external view of the internal combustion engine 4000. As shown, the internal combustion engine 4000 includes two RCGs that are configured to inject RS jets into the MCC 4017 within the cylinder 4016. In some embodiments, the internal combustion engine can include 3, 4, 5, 6, 7, 8, 9, or 10, or at least about 10 RCGs, inclusive of all values and ranges therebetween.

Figure 37B:
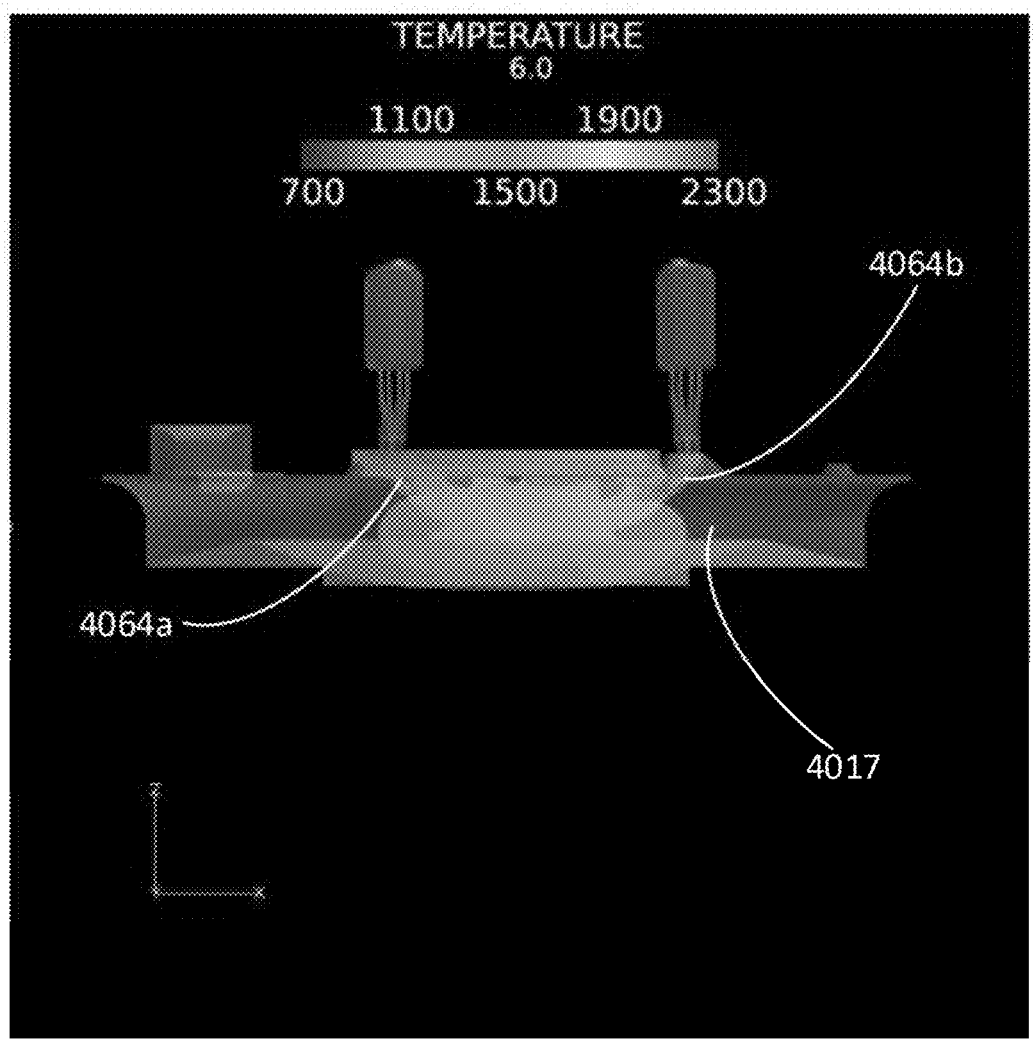
FIGS. 37B-37E depict jet penetration and temperature distribution diagrams within a main combustion chamber of the internal combustion engine of FIG. 37A.
Figure 37C:
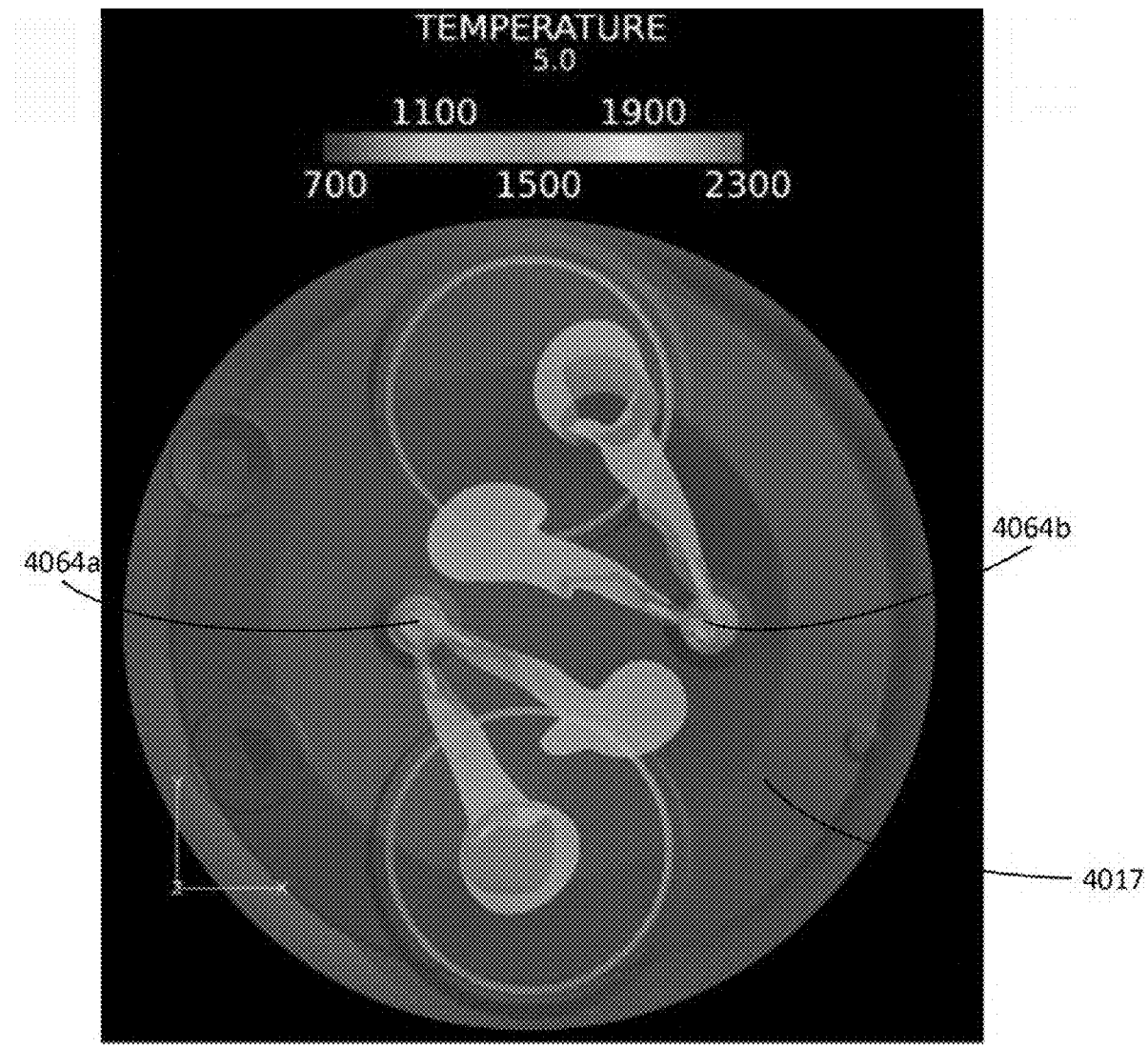

FIGS. 37B-37C show penetration of the RS jets, as reflected by temperature distributions, upon entering the MCC 4017. FIG. 37B shows the penetration from a side view of the MCC 4017, while FIG. 37C shows the penetration from a bottom view of the MCC 4017. As depicted, temperatures are shown in Kelvin. As shown via the temperature distributions in FIGS. 37B-37C, the RS jets from the two orifices of each QS 4064a, 4064b are angled in different directions to distribute the RS throughout the MCC 4017.

Figure 37D:
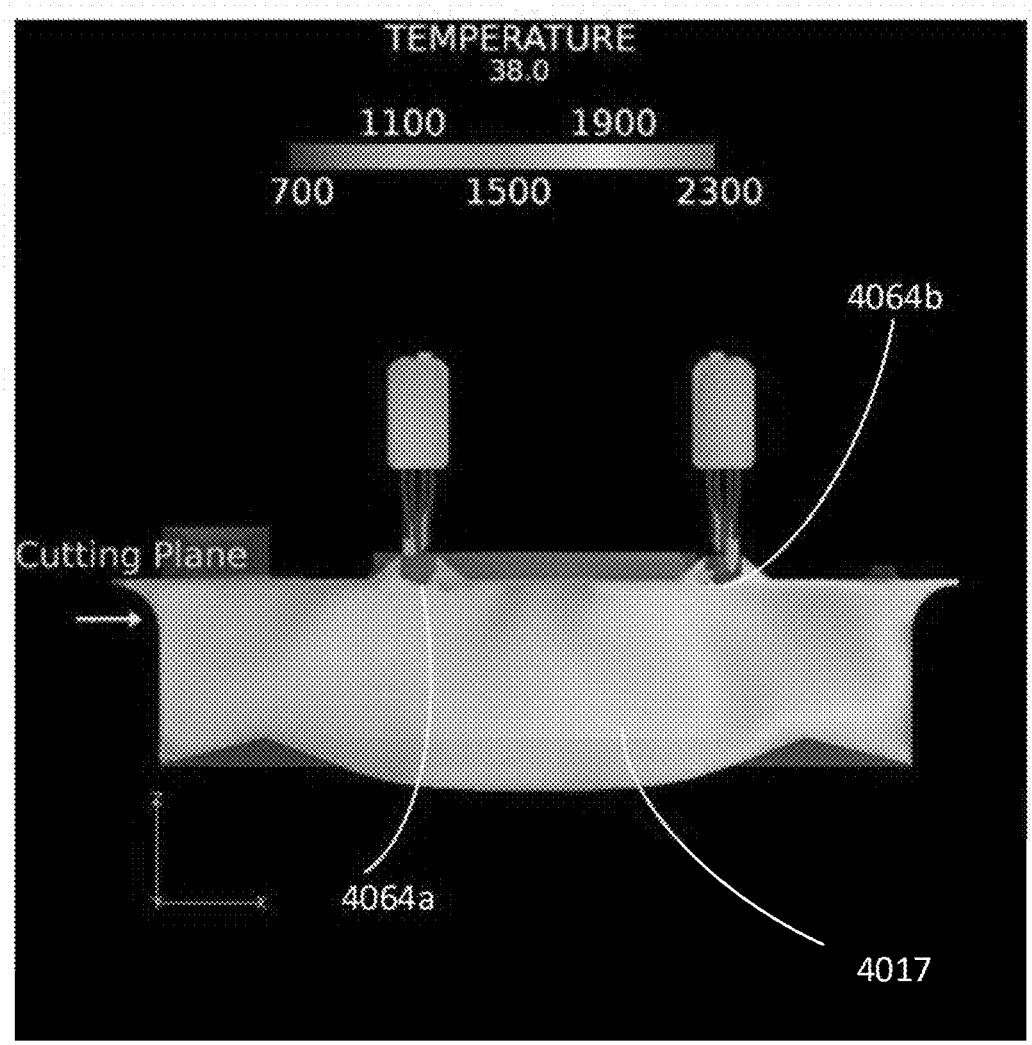
Figure 37E:
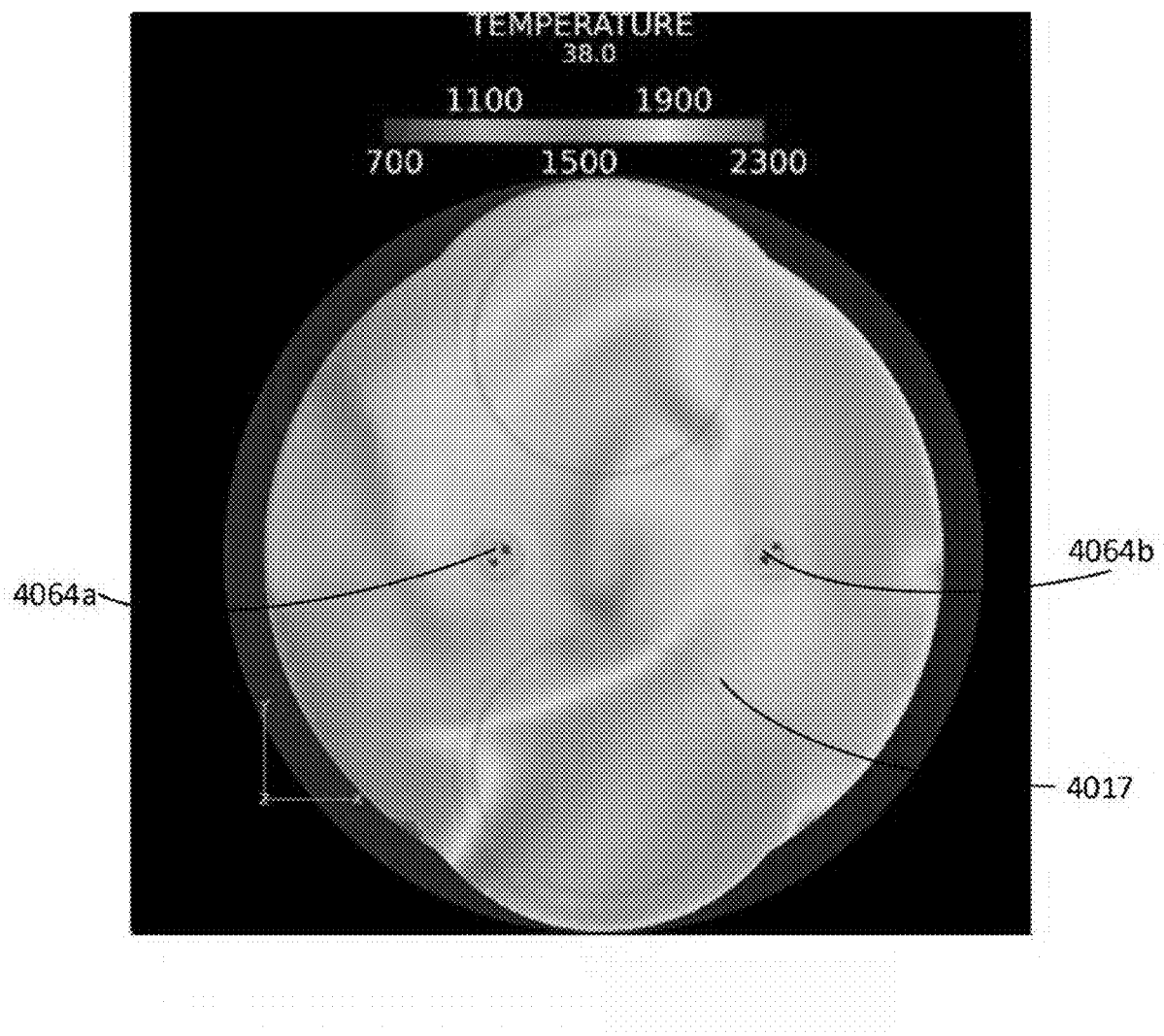
Figure 38A:
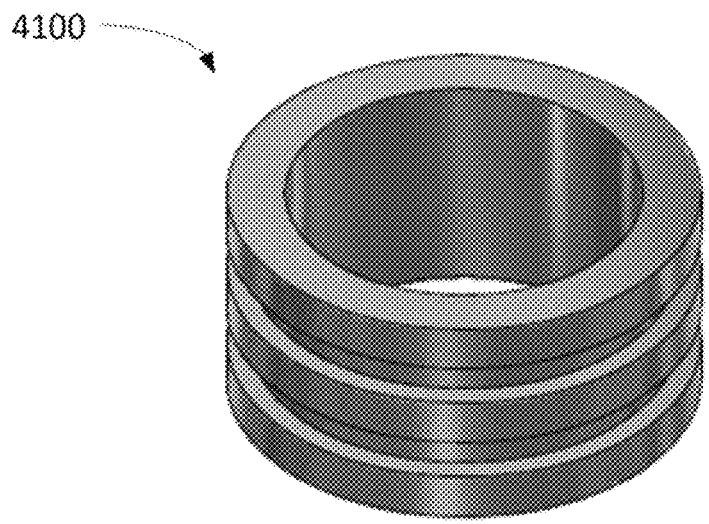
FIGS. 38A-38C depict an example of a connector for stabilizing or supporting a RCG in an engine head, according to embodiments.
Figure 38B:
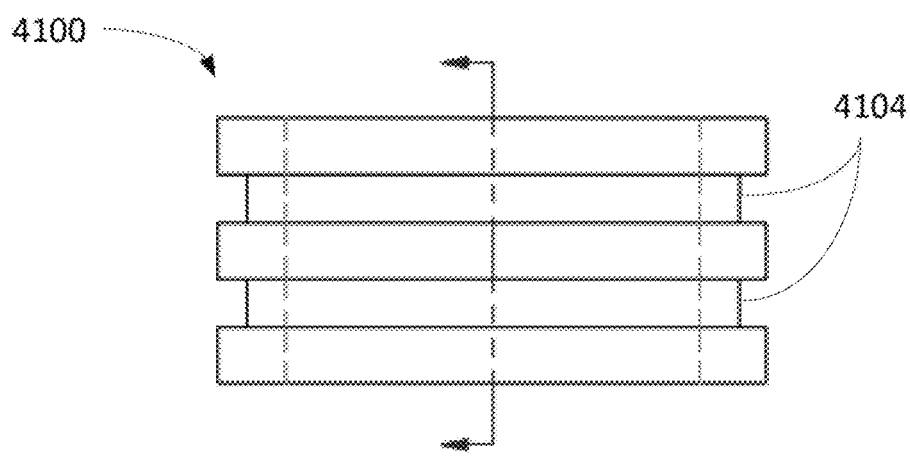
Figure 38C:
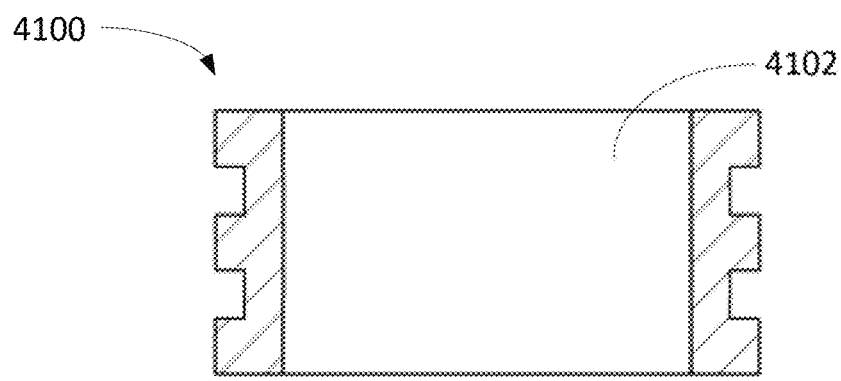
Figure 39B:
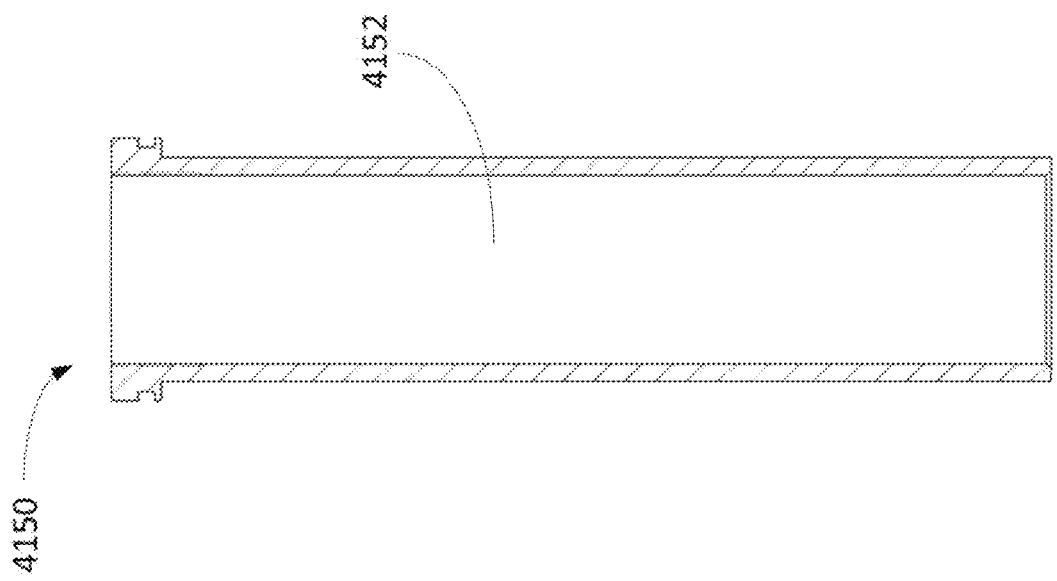
FIGS. 39A-39B depict an example of a sleeve for stabilizing or supporting a RCG in an engine head, according to embodiments.
Figure 39A:
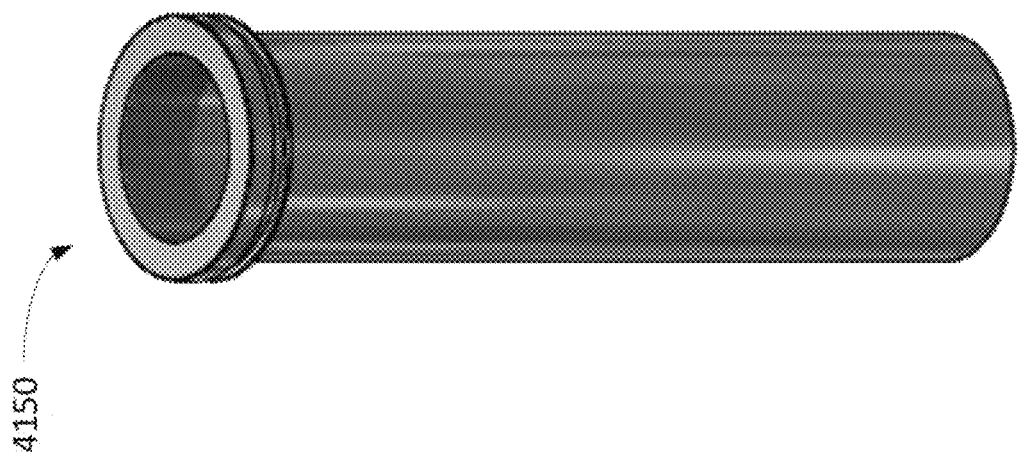

FIGS. 37D-37E show temperature distributions of the gas in the MCC 4017 upon ignition. FIG. 37D shows the temperature distribution from a side view of the MCC 4017, while FIG. 37E shows the temperature distribution from a bottom view of the MCC 4017. As shown, peak temperatures upon ignition are between about 1,500K and about 2,300K. Such temperatures are significantly lower than with traditional spark ignition, which can lead to peak temperatures exceeding 2,300 K. As described here, these lower temperatures can improve ignition and growth of the combustion kernel.

In ERI processes, timing of energy release in an engine (e.g., engine 100, 200) is an important factor. Systems, devices, and methods described herein can include a controller that is configured to control the timing of the ignition of a fuel-air charge in the RCG such that the combustion takes place with LOPP (e.g., the degrees after TDC (ATDC) at which peak firing pressure (PFP) occurs) at or substantially near 50% of mass fraction burn (MFB), which corresponds to the location in crank angle degrees ATDC that is desirable for engines and their operating design (e.g., as specified by OEMs). In some embodiments, a desirable range (e.g., a predefined range) for the LOPP can be about 10 to about 20 degrees (including all subranges and values in-between), and specifically about 12 to about 18 degrees ATDC. Systems, devices, and methods can control engine timing to achieve this LOPP, while traditional two-stroke engines have LOPP that is typically between 16-18 crank angle degrees ATDC.

Another important factor in ERI processes is the charge dispersion of the hot RS-rich jet. This dispersion can be affected by a number of parameters, e.g., air density, MCC ER, ratio of compression (Rc), and engine Cr, which can be affected by turbocharger boost. For example, while a naturally aspirated engine has a constant Rc, in a turbo boosted engine, Rc is variable and constantly changing. Due to this change in Rc, other parameters that become important to track include the effective compression ratio (ECr) (e.g., a measure of actual or real compression being applied to an air charge from outside atmospheric pressure to in-cylinder pressure, which takes into account compression being applied by a boost in the cylinder and air density present), which affects the LOPP, the rate of burn, and the MFB percentage. In turbo boosted engines, the ECr can be directly proportional to the Rc. To maintain LOPP at a desirable location (e.g., MFB percentage at about 50%), it is desirable to track these parameters and their associated changes throughout a combustion process.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods. The acts performed as part of the methods may be ordered in any suitable way. Accordingly, embodiments may be constructed in which acts are performed in an order different than described, which may include performing some acts simultaneously, even though shown as sequential acts in illustrative embodiments.

The invention claimed is:

1. An apparatus, comprising:
a housing defining a radical chemicals generator volume (RCGv);
a fuel delivery control device coupled to a passageway extending into the RCGv, the fuel delivery control device configured to control delivery of a portion of fuel into the RCGv via the passageway;
a spark device configured to ignite a mixture of air and the portion of fuel in the RCGv to generate a flame that produces combustion intermediates and combustion products; and
a quenching system (QS) including a plurality of orifices, the plurality of orifices having a predetermined length-to-diameter ratio of at least five such that the plurality of orifices is configured to quench the flame to produce a jet of partial combustion products containing radical species (RS),
the plurality of orifices further configured to inject the jet of partial combustion products into a main combustion chamber (MCC) of an engine containing a fuel-air charge to induce ignition of the fuel-air charge.

2. The apparatus of claim 1, wherein the predetermined length-to-diameter ratio of the plurality of orifices is at least ten.

3. The apparatus of claim 1, wherein each orifice from the plurality of orifices has a circular cross-sectional area with a cross-sectional diameter of between 0.5 mm and 5 mm.

4. The apparatus of claim 1, wherein each orifice from the plurality of orifices has a length of at least 10 mm.

5. The apparatus of claim 1, wherein the housing is configured to attach to the engine such that a longitudinal axis of the QS is angled relative to a centerline of the engine.

6. The apparatus of claim 5, wherein each orifice from the plurality of orifices has an end opening into the MCC that is angled with respect to the longitudinal axis of the QS.

7. The apparatus of claim 1, wherein each orifice set from the plurality of orifice sets includes a section that extends along a longitudinal axis of the QS toward a centerline of the engine, such that the jet of the partial combustion products can penetrate across the MCC when injected into the MCC.

8. The apparatus of claim 1, wherein the housing further includes a coolant jacket configured to cool the RCGv.

9. The apparatus of claim 1, wherein the housing further includes a threaded surface configured to attach to a threaded opening in a head of the engine.

10. The apparatus of claim 1, wherein the RS include at least one of: a hydroxyl radical (OH), a hydroperoxyl radical or perhydroxyl radical (HO2), formaldehyde (CH2O), hydrogen peroxide (H2O2), methyl radical (CH3), methylidyne radical (CH), monotomic oxygen radical (O), or monotomic hydrogen radical (H).

11. The apparatus of claim 1, further comprising a sleeve configured to fit within an opening in a head of the engine and to attach to the head of the engine, the sleeve defining an opening for receiving the housing.

12. The apparatus of claim 1, wherein the housing is configured to attach to the engine such that a longitudinal axis of the QS is angled relative to a centerline of the engine.

13. The apparatus of claim 1, wherein a first radical chemical generator (RCG) includes the housing, the fuel delivery control device, the spark device, and the QS, the apparatus further comprising a second RCG, each of the first and second RCGs configured to couple to a different opening in a head of the engine.

14. The apparatus of claim 13, wherein the second RCG includes a QS, the QSs of the first and second RCGs configured to inject jets of partial combustion products into the MCC of the engine at the same time to induce ignition of the fuel-air charge in the MCC.

15. The apparatus of claim 14, wherein the jets of partial combustion products are angled or offset from one another to avoid overlapping with one another and to increase volumetric distribution of RS within the MCC.

16. The apparatus of claim 13, wherein the QS of the second RCG is configured to inject a first set of jets of partial combustion products into the MCC before the QS of the first RCG injects a second set of partial combustion products into the MCC.

17. The apparatus of claim 16, wherein the QS of the second RCG is configured to inject the first set of jets of partial combustion products into the MCC to increase a quantity of RS in the MCC, and the QS of the first RCG is configured to inject the second set of jets of partial combustion products into the MCC to induce ignition of the fuel-air charge in the MCC.

18. The apparatus of claim 13, further comprising a plurality of mini-chambers (M-Cs) configured to:
receive a portion of gases from the MCC during a combustion event or a compression phase of a first combustion cycle from a plurality of combustion cycles;
allow generation and storage of RS in the portion of gases; and
release the portion of gases including the generated RS into the MCC during a second combustion cycle from the plurality of combustion cycles immediately subsequent to the first combustion cycle.

19. An apparatus, comprising:
a housing defining a radical chemicals generator volume (RCGv);
a fuel delivery control device coupled to a passageway extending into the RCGv, the fuel delivery control device configured to control delivery of a portion of fuel into the RCGv via the passageway;
a spark device configured to ignite a mixture of air and the portion of fuel in the RCGv to generate a flame that produces combustion intermediates and combustion products; and
a quenching system (QS) coupled to a head of an engine, the QS including a plurality of orifices, the plurality of orifices having a predetermined length-to-diameter ratio of at least three such that the plurality of orifices is configured to quench the flame to produce a jet of partial combustion products containing radical species (RS),
the plurality of orifices further configured to inject the jet of partial combustion products into a main combustion chamber (MCC) of the engine containing a fuel-air charge to induce ignition of the fuel-air charge.

20. The apparatus of claim 19, wherein the predetermined length-to-diameter ratio of the plurality of orifices is at least ten.

21. The apparatus of claim 19, wherein each orifice from the plurality of orifices has a circular cross-sectional area with a cross-sectional diameter of between 0.5 mm and 5 mm.

22. The apparatus of claim 19, wherein the housing is configured to attach to the engine such that a longitudinal axis of the QS is angled relative to a centerline of the engine.

23. The apparatus of claim 22, wherein each orifice from the plurality of orifices has an end opening into the MCC that is angled with respect to the longitudinal axis of the QS.

24. The apparatus of claim 19, wherein each orifice set from the plurality of orifice sets includes a section that extends along a longitudinal axis of the QS toward a centerline of the engine, such that the jet of the partial combustion products can penetrate across the MCC when injected into the MCC.

25. The apparatus of claim 19, wherein the housing further includes a coolant jacket configured to cool the RCGv.

26. The apparatus of claim 19, wherein the housing further includes a threaded surface configured to attach to a threaded opening in the head of the engine.

27. The apparatus of claim 19, wherein the RS include at least one of: a hydroxyl radical (OH), a hydroperoxyl radical or perhydroxyl radical (HO2), formaldehyde (CH2O), hydrogen peroxide (H2O2), methyl radical (CH3), methylidyne radical (CH), monotomic oxygen radical (O), or monotomic hydrogen radical (H).

28. The apparatus of claim 19, further comprising a sleeve configured to fit within an opening in the head of the engine and to attach to the head of the engine, the sleeve defining an opening for receiving the housing.

29. The apparatus of claim 19, wherein the housing is configured to attach to the engine such that a longitudinal axis of the QS is angled relative to a centerline of the engine.

30. The apparatus of claim 19, wherein a first radical chemical generator (RCG) includes the housing, the fuel delivery control device, the spark device, and the QS, the apparatus further comprising a second RCG, each of the first and second RCGs configured to couple to a different opening in a head of the engine.

* * * * *